US009361700B2

(12) United States Patent
Stein et al.

(10) Patent No.: US 9,361,700 B2
(45) Date of Patent: *Jun. 7, 2016

(54) CONSTRAINT RELATIONSHIP FOR USE IN AN IMAGE SEGREGATION

(71) Applicant: Tandent Vision Science, Inc., San Francisco, CA (US)

(72) Inventors: Andrew Neil Stein, San Francisco, CA (US); Kshitiz Garg, Nashville, TN (US)

(73) Assignee: Tandent Vision Science, Inc., San Francisco, CA (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/273,184

(22) Filed: May 8, 2014

(65) Prior Publication Data

US 2015/0324993 A1 Nov. 12, 2015

(51) Int. Cl.
*G06K 9/52* (2006.01)
*G06T 7/40* (2006.01)
*G06T 7/00* (2006.01)
*G06K 9/46* (2006.01)

(52) U.S. Cl.
CPC ............... *G06T 7/0079* (2013.01); *G06K 9/46* (2013.01); *G06K 9/4652* (2013.01); *G06K 9/52* (2013.01); *G06T 7/408* (2013.01); *G06K 2009/4666* (2013.01)

(58) Field of Classification Search
USPC .................................................. 382/164, 173
See application file for complete search history.

(56) References Cited

U.S. PATENT DOCUMENTS

| | | | |
|---|---|---|---|
| 7,596,266 B2 | 9/2009 | Maxwell et al. | |
| 7,672,530 B2 | 3/2010 | Friedhoff et al. | |
| 7,865,031 B2 | 1/2011 | Bushell et al. | |
| 7,873,219 B2 | 1/2011 | Friedhoff et al. | |
| 8,139,850 B2 | 3/2012 | Maxwell et al. | |
| 8,139,867 B2 | 3/2012 | Maxwell et al. | |
| 8,175,390 B2 | 5/2012 | Maxwell et al. | |
| 8,478,029 B2 | 7/2013 | Tolliver et al. | |
| 8,542,917 B2 | 9/2013 | Smith et al. | |
| 8,805,066 B2 | 8/2014 | Friedhoff et al. | |
| 9,158,973 B1 * | 10/2015 | Garg | G06K 9/00765 |
| 2006/0177149 A1 | 8/2006 | Friedhoff et al. | |
| 2007/0176940 A1 | 8/2007 | Maxwell et al. | |
| 2014/0050395 A1 | 2/2014 | Lalonde | |

OTHER PUBLICATIONS

P. Felzenszwalb and D.Huttenlocher, Distance Transforms of Sampled Functions, Cornell Computing and Information Science Technical Report TR2004-1963, Sep. 2004.
Abdi, H.(2007), Z-scores, in N.J. Salkind (Ed.), Encyclopedia of Measurement and Statistics, Thousand Oaks, CA: Sage.
Peter J. Rousseeuw,Least Median of Squares Regression, Journal of the American Statistical Association, vol. 79, No. 388 (Dec. 1984), pp. 871-880.
Zvi Galil and Giuseppe F. Italiano. Data structures and algorithms for disjoint set union problems, ACM Computing Surveys, vol. 23, Issue 3 (Sep. 1991), pp. 319-344.
M. A. Fischler, R. C. Bolles. Random Sample Consensus: A Paradigm for Model Fitting with Applications to Image Analysis and Automated Cartography. Comm. of the ACM, vol. 24, pp. 381-395, 1981.

* cited by examiner

*Primary Examiner* — Duy M Dang
(74) *Attorney, Agent, or Firm* — Davidson, Davidson & Kappel, LLC; Felix L. D'Arienzo, Jr.

(57) ABSTRACT

A soft, weighted constraint imposed upon image locations can be used to provide a more accurate segregation of an image into intrinsic material reflectance and illumination components. The constraint is arranged to constrain all color band variations between the image locations into one integral constraining relationship.

14 Claims, 37 Drawing Sheets

Computer System Configured to Operate on Images

Pixel Array for Storing Image Data

P(1, 1)  P(1, 2) · · ·                · · · P(1, M)
P(2, 1)  P(2, 2)                                ⋮
P(3, 1)  P(3, 2)                                ⋮
   ⋮
   ⋮

⋮                                           ⋮
P(N, 1)  · · ·                       · · · P(N, M)

Image File
        ⌊18

FIG. 2

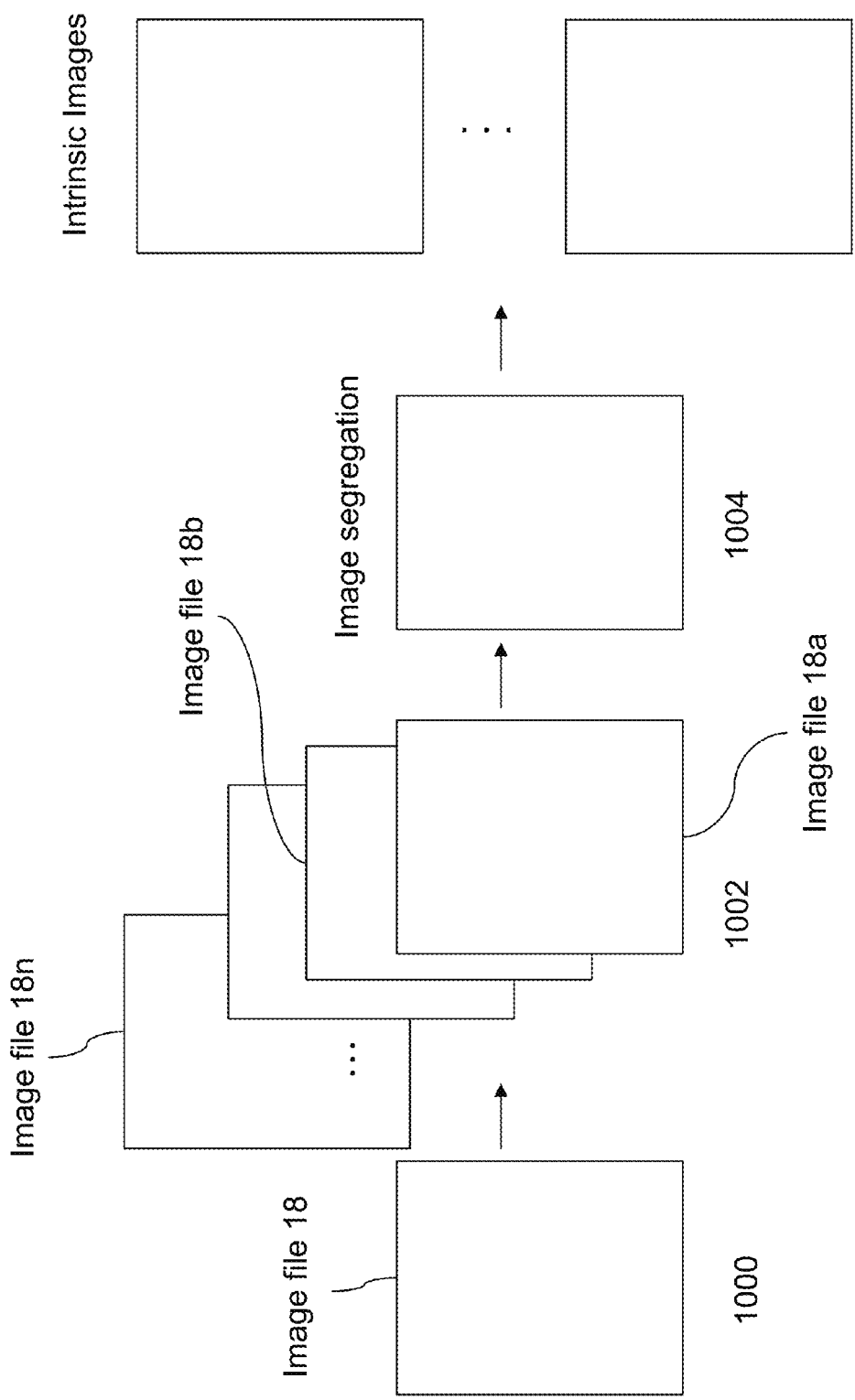

Examples of Identifying Token Regions in an Image

Original Image

Token Regions

Figure 13: Log Color Space Chromaticity Plane

Figure 14: Selecting colors from an image

Figure 15: Determining the log chromaticity orientation

Figure 16: Determining log chromaticity coordinates

Figure 17: Optionally augmenting log chromaticity coordinates

Figure 18: Clustering log chromaticity coordinates

Figure 19: Assigning coordinates to clusters

Figure 20: Detecting regions of uniform reflectance based on log chromaticity clustering $$\begin{bmatrix} 1 & -1 & 0 \\ 1 & 0 & -1 \\ 0 & 1 & -1 \end{bmatrix} \begin{bmatrix} m_a \\ m_b \\ m_c \end{bmatrix} = \begin{bmatrix} i_a - i_b \\ i_a - i_c \\ i_b - i_c \end{bmatrix}$$

[A]　　　　[x]　=　[b]

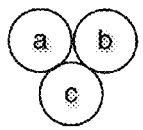

$$\begin{bmatrix} w_{ab} & -w_{ab} & 0 \\ w_{ac} & 0 & -w_{ac} \\ 0 & w_{bc} & -w_{bc} \end{bmatrix} \begin{bmatrix} M_a \\ M_b \\ M_c \end{bmatrix} = \begin{bmatrix} w_{ab} * ((1-\alpha_{ab})\vec{B}_{ab} + \alpha_{ab}\vec{V}_{ab}) \\ w_{ac} * ((1-\alpha_{ac})\vec{B}_{ac} + \alpha_{ac}\vec{V}_{ac}) \\ w_{bc} * ((1-\alpha_{bc})\vec{B}_{bc} + \alpha_{bc}\vec{V}_{bc}) \end{bmatrix}$$

$$[\,A\,] \quad [\,x\,] \;=\; [\,b\,]$$

where, $i, j \in \{a,b,c\}$, $\vec{V}_{ij} = I_i - I_j$ and $\vec{B}_{ij} = \vec{V}_{ij} - (\vec{V}_{ij} \cdot \hat{N})$ $\alpha_{ij}$ is a scalar, given by general scalar function $\alpha$ $w_{ij}$ is weighted constraints

Fig. 22

CONSTRAINT RELATIONSHIP FOR USE IN AN IMAGE SEGREGATION

BACKGROUND OF THE INVENTION

Many significant and commercially important uses of modern computer technology relate to images. These include image processing, image analysis and computer vision applications. In computer vision applications, such as, for example, object recognition and optical character recognition, it has been found that a separation of illumination and material aspects of an image can significantly improve the accuracy and effectiveness of computer performance. Significant pioneer inventions related to the illumination and material aspects of an image are disclosed in U.S. Pat. No. 7,873,219 to Richard Mark Friedhoff, entitled Differentiation Of Illumination And Reflection Boundaries and U.S. Pat. No. 7,672,530 to Richard Mark Friedhoff et al., entitled Method And System For Identifying Illumination Flux In An Image (hereinafter the Friedhoff Patents).

SUMMARY OF THE INVENTION

The present invention provides a method and system comprising image processing techniques that utilize spatio-spectral information relevant to an image, derived from multiple sets of selectively varied representations of the image to accurately and correctly identify illumination and material aspects of the image. In an exemplary embodiment of the present invention, a soft, weighted constraint imposed upon image locations can be used to provide a more accurate segregation of an image into intrinsic material reflectance and illumination components. The constraint is arranged to constrain all color band variations between the image locations into one integral constraining relationship.

In a first exemplary embodiment of the present invention, an automated, computerized method is provided for processing an image. According to a feature of the present invention, the method comprises the steps of providing an image file depicting the image, including image locations, in a computer memory, selecting image locations i and j, setting a constraint between the image locations according to a log color space equation: $w_{ij}*(Mi-Mj)=w_{ij}*(\alpha_{ij}V_{ij}+(1-\alpha_{ij})B_{ij})$, wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal, $\alpha_{ij}$ is a scalar value based upon a smooth scalar function $\alpha$ that varies from 0 to 1, as a function of a degree of change expressed by $I_i-I_j$ corresponding to one of an illumination change or a material reflectance change, and $w_{ij}$ is a constraint confidence weight and solving the log color space equation to identify an intrinsic component of the selected image locations.

In a second exemplary embodiment of the present invention, a device is provided. The device comprises a computer and a memory storing an image file containing an image having image locations. According to a feature of the present invention, the computer is arranged and configured to execute a routine to select image locations i and j, set a constraint between the image locations according to a log color space equation: $w_{ij}*(Mi-Mj)=w_{ij}*(\alpha_{ij}V_{ij}+(1-\alpha_{ij})B_{ij})$, wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal, $\alpha_{ij}$ is a scalar value based upon a smooth scalar function $\alpha$ that varies from 0 to 1, as a function of a degree of change expressed by $I_i-I_j$ corresponding to one of an illumination change or a material reflectance change, and $w_{ij}$ is a constraint confidence weight and solve the log color space equation to identify an intrinsic component of the selected image locations.

In a third exemplary embodiment of the present invention, a computer program product is provided. The computer program product is disposed on a non-transitory computer readable media, the product including computer executable process steps operable to control a computer to: receive an image file depicting an image having image locations, select image locations i and j, set a constraint between the image locations according to a log color space equation: $w_{ij}*(Mi-Mj)=w_{ij}*(\alpha_{ij}V_{ij}+(1-\alpha_{ij})B_{ij})$, wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal, $\alpha_{ij}$ is a scalar value based upon a smooth scalar function $\alpha$ that varies from 0 to 1, as a function of a degree of change expressed by $I_i-I_j$ corresponding to one of an illumination change or a material reflectance change, and $w_{ij}$ is a constraint confidence weight and solve the log color space equation to identify an intrinsic component of the selected image locations.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

BRIEF DESCRIPTION OF THE DRAWINGS

FIG. 2 shows an n×m pixel array image file for an image stored in the computer system of FIG. 1.

FIG. 3a is a data flow block diagram for an image segregation operation performed according to an exemplary embodiment of the present invention including a set of selectively varied representations of the image of the image file of FIG. 2.

FIG. 3b shows a graphic representation of a scale-spaced pyramid as the set of selectively varied representations of FIG. 3a.

FIG. 22 is a representation of an [A] [x]=[b] matrix relationship according to a further exemplary embodiment of the present invention.

DETAILED DESCRIPTION OF THE PREFERRED EMBODIMENTS

Figure 1:
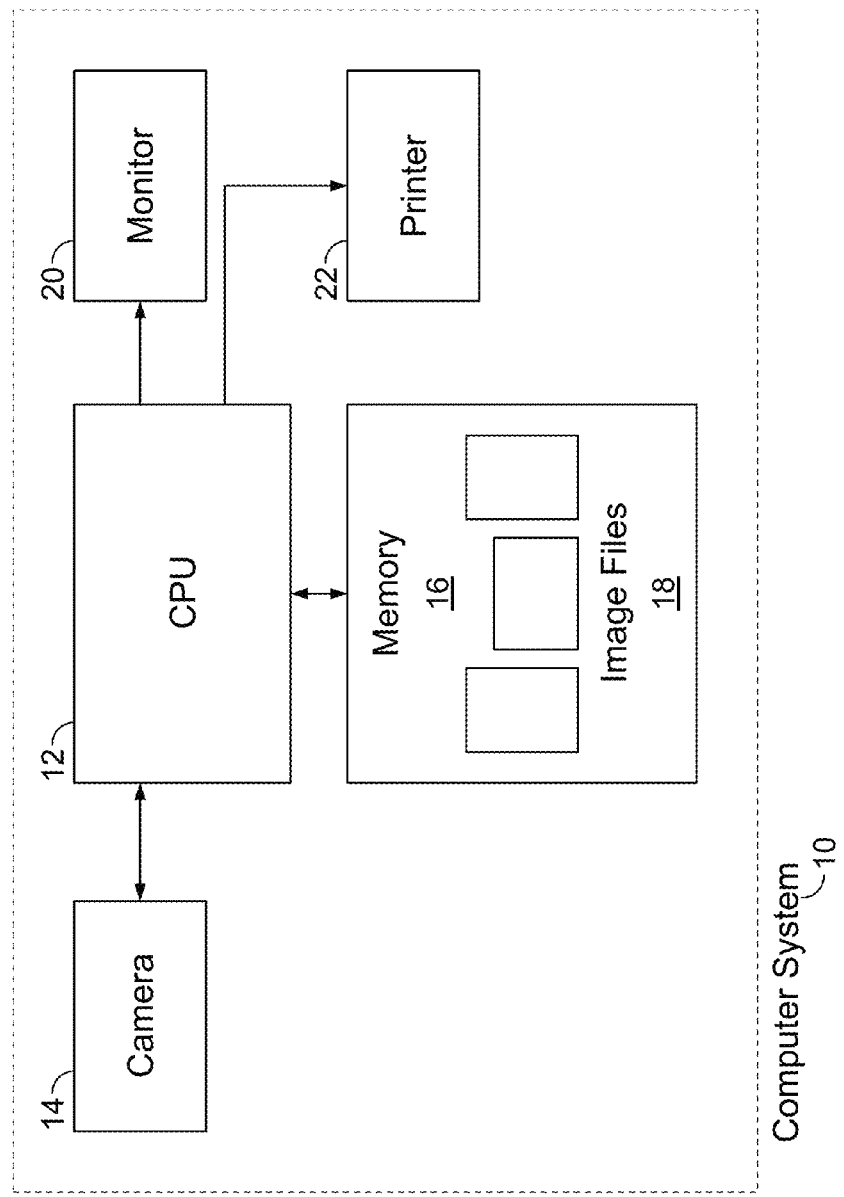
FIG. 1 is a block diagram of a computer system arranged and configured to perform operations related to images.

Referring now to the drawings, and initially to FIG. 1, there is shown a block diagram of a computer system 10 arranged and configured to perform operations related to images. A CPU 12 is coupled to a device such as, for example, a digital camera 14 via, for example, a USB port. The digital camera 14 operates to download images stored locally on the camera 14, to the CPU 12. The CPU 12 stores the downloaded images in a memory 16 as image files 18. The image files 18 can be accessed by the CPU 12 for display on a monitor 20, or for print out on a printer 22.

Alternatively, the CPU 12 can be implemented as a microprocessor embedded in a device such as, for example, the digital camera 14 or a robot. The CPU 12 can also be equipped with a real time operating system for real time operations related to images, in connection with, for example, a robotic operation or an interactive operation with a user.

As shown in FIG. 2, each image file 18 comprises an n×m pixel array. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electro-magnetic spectrum. The pixel array includes n rows of m columns each, starting with the pixel p (1,1) and ending with the pixel p(n, m). When displaying or printing an image, the CPU 12 retrieves the corresponding image file 18 from the memory 16, and operates the monitor 20 or printer 22, as the case may be, as a function of the digital values of the pixels in the image file 18, as is generally known.

According to a feature of the present invention, in an image process, the CPU 12 operates to analyze and process information, for example, the RGB values of the pixels of an image stored in an image file 18, to achieve various objectives, such as, for example, a segregation of illumination and material aspects of a scene depicted in the image of an image file 18, to generate corresponding intrinsic images. The intrinsic images include, for example, an illumination image, to capture the intensity and color of light incident upon each point on the surfaces depicted in the image, and a material reflectance image, to capture reflectance properties of surfaces depicted in the image (the percentage of each wavelength of light a surface reflects). The separation of illumination from material in the intrinsic images provides the CPU 12 with images optimized for more effective and accurate further processing in such applications as computer vision.

To that end, FIG. 3a shows a data flow diagram for an image segregation operation performed according to an exemplary embodiment of the present invention. In block 1000, an image file 18 is selected and input to the CPU 12. In block 1002, the CPU 12 operates to form a set of selectively varied representations of the image, depicted in image files 18a, 18b, . . . 18n, from the selected image file 18. The variations among the representations can be based upon any preselected spacial, spectral and/or temporal groupings of the original image. The variations are selected so as to provide image representations most suitable for efficient and accurate analysis of illumination and material aspects of the image.

In one preferred embodiment of the present invention, computer operation for illumination and material image segregation can be performed at a relatively coarse scale representation of the image, and then used to constrain a solution at a relatively finer scale resolution. By enforcing a segregation that is consistent across different scales of resolution, performance of a segregation operation is not only more speedy and efficient, but also more accurate.

In another preferred embodiment, a segregation of illumination and material aspects of the image is selectively divided among representations at differing scales of image resolution. Different features of a scene depicted in an image can have different intrinsic scales. For example, edges in an image have an intrinsic scale most effectively analyzed at a fine scale of resolution, while non-edged regions, such as regions of uniform material, can be accurately analyzed at relatively coarse scales of resolution. Thus, an image is divided by edge and non-edge regions, segregating the edge regions at a fine scale of resolution, and the remaining non-edge regions at a relatively coarse scale of resolution. More generally, pixels of the image (or other preselected regions of the image) can each be divided according to the intrinsic scale of the respective pixel, and processed at a representation of the image at an appropriate scale. The division of segregation operations in this manner provides a sequence of simple solution systems, rather than one relatively large complex system to solve.

Figure 3B:
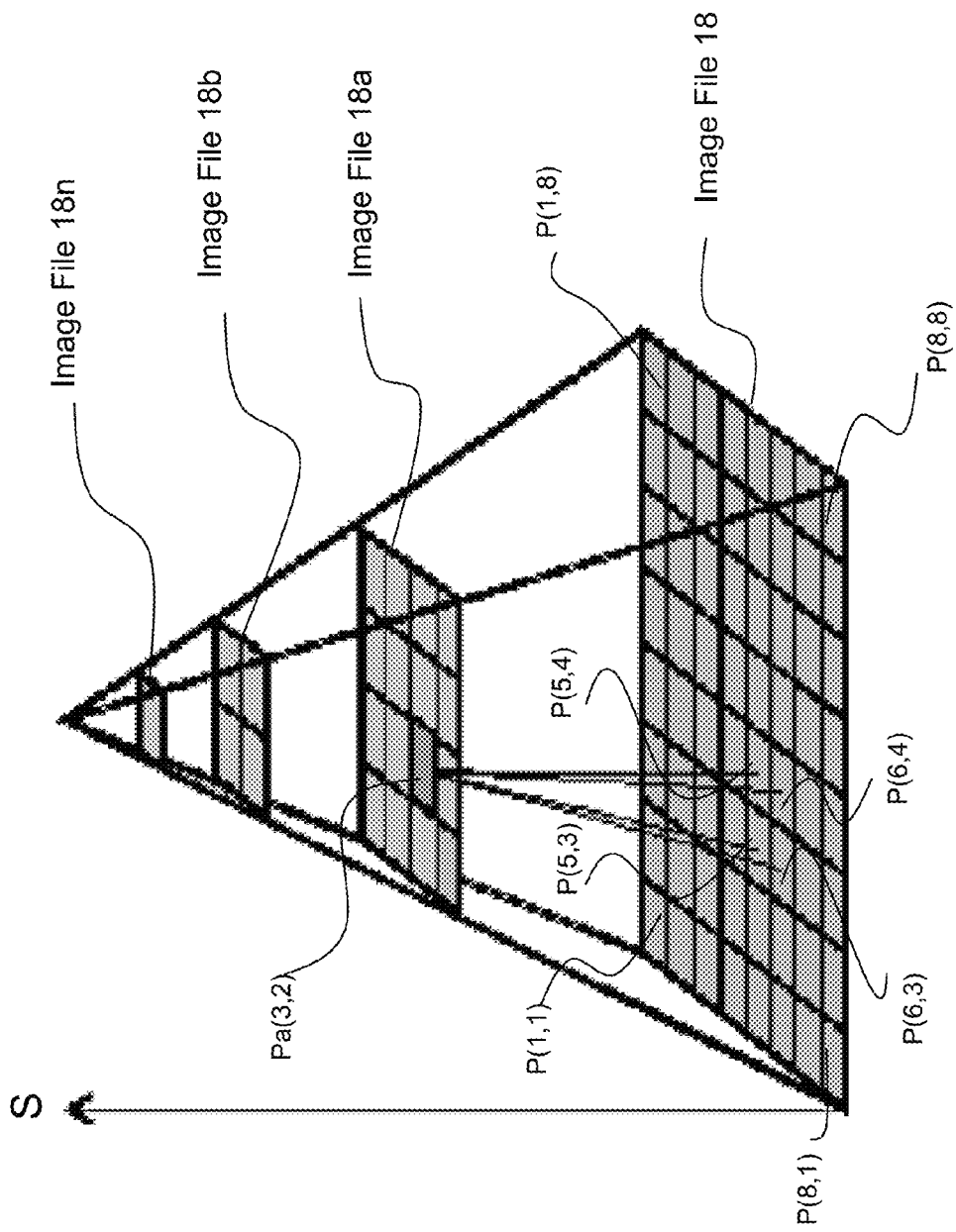

Accordingly, for example, in one exemplary embodiment of the present invention, the CPU 12 can form multi-resolution representations such as a scale-spaced pyramid of representations of the image. As shown in FIG. 3b, in a scale-spaced pyramid, the set of image files 18a, b, c . . . n, are generated, each at a different scale of resolution relative to the resolution of the original image, from a finest resolution (defined as the resolution of the original image in image file 18) to relatively coarser resolutions, at each upper level of the pyramid. Each of image files 18, 18a, . . . 18n of FIG. 3b is an array of pixels, as generally shown in FIG. 2. Image file 18a is a coarser resolution version of the original image file 18, and image file 18b is a coarser resolution version of image file 18a, and so on. For example, as illustrated in FIG. 3b, pixels P(5,3), P(6,3), P(5,4) and P(6,4) of fine resolution image file 18 map to, and therefor correspond to, a single pixel, $P_a(3, 2)$ in the relatively coarse resolution image file 18a. A downsampling scale D indicates the difference in scale between levels of the pyramid such that a higher level, low resolution representation of the image has $1/D^2$ fewer pixels than the lower, high resolution level.

A scale-spaced pyramid(s) is formed via well known Gaussian and/or Laplacian pyramid formation techniques. In a Gaussian pyramid, the original image file 18 is convolved with a Gaussian kernel g, for a low pass filtered, subsampled version of the original image (image file 18a), having a cut off frequency set by the parameter σ. A full Gaussian pyramid is formed when each coarse scale (e.g. image file 18a) is convolved with the Gaussian kernal to form a next level (image file 18b), and so on (to image file 18n). A Laplacian pyramid provides a series of bandpass filtered versions of the original image, wherein each scale of the pyramid corresponds to a different band of image frequencies.

If a series of selectively varied images represented by image files 18, 18a, . . . 18n is stated as a Gaussian pyramid of low passed filtered versions of the original image, and expressed by original image $i_0$, and scales $i_1$, $i_2$, . . . $i_n$, respectively, then any level of the pyramid is related to a downsampled next lower (finer) level by: $i_n = \downarrow(g * i_{n-1})$, where $\downarrow$ denotes a downsampling, g represents a low pass filter, such as, for example, the Gaussian low pass filter and * denotes a spatial convolution.

For a Laplacian pyramid, in the series of images represented by image files 18, 18a, . . . 18n, each level of the pyramid $l_n$ can be expressed in terms of a difference between levels of the Gaussian pyramid: $l_n = i_n - \uparrow i_{n+1}$, where $\uparrow$ denotes upsampling.

Moreover, starting with a multiplicative model for the image: I=M×L, where I is the original image, M is the material component of the image and L is the illumination component, it can be shown that each level of the pyramid can be decomposed into a material pyramid and an illumination pyramid. For an additive model, the log color values are log I=log M+log L. In terms of the Gaussian pyramid, the decomposition into material and illumination components can be expressed as: $g_o * \log I = g_o * \log M + g_o * \log L$.

In block 1004, the CPU 12 operates to perform an image segregation operation on at least one of the representations of the pyramid, for example, original image file 18 and image file 18a, to generate intrinsic images including, for example, each of an illumination image and a material reflectance image for each selected scale of the image. Each of the intrinsic images corresponds to the image depicted at the resolution scales of image file 18 and image file 18a, respectively. According to a feature of the present invention, the image segregation operation performed by the CPU 12 at each scale of resolution, is implemented according to a spatio-spectral operator/constraint/solver model to identify the illumination and material reflectance components of the original image or any representation of the original image.

Figure 3C:
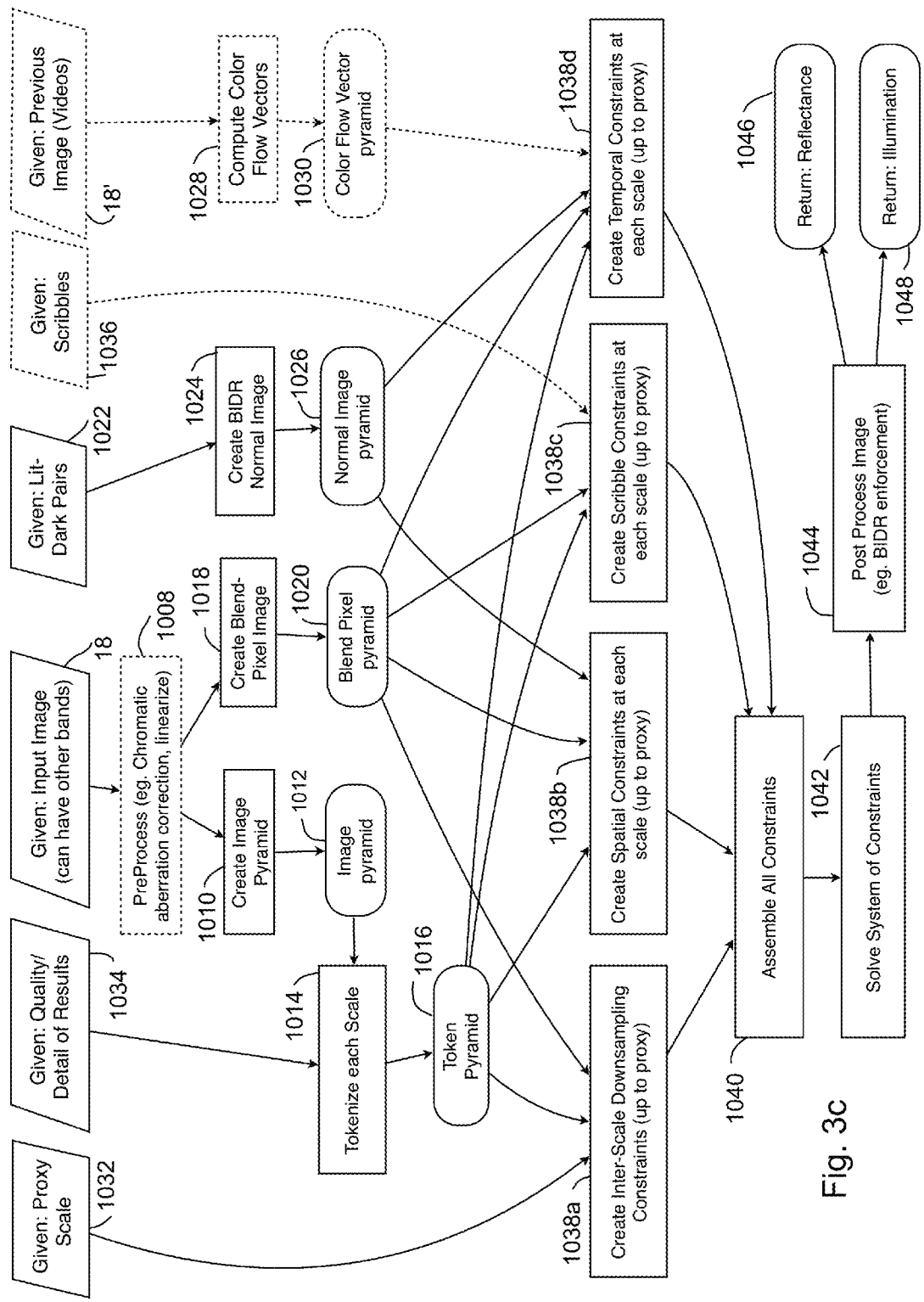
FIG. 3c is a data flow block diagram for an image segregation operation according to a further exemplary embodiment of the present invention including multiple sets of selectively varied representations of the image of the image file of FIG. 2.

FIG. 3c illustrates a further exemplary embodiment of the present invention. As shown, the concept of selectively varying the image file 18, as illustrated in FIGS. 3a & b, is implemented in a manner to organize image representations based upon multiple, different preselected image characteristics, for example, spacial, spectral and temporal groupings of the original image. In an exemplary embodiment of the present invention, an input image 18, as shown in FIG. 2, is pre-processed (block 1008). The pre-processing can include such optional operations as the correction of chromatic aberration according to the techniques taught in U.S. Pat. No. 7,865,031, and a step to linearize image data, for more accurate processing.

Figure 27:
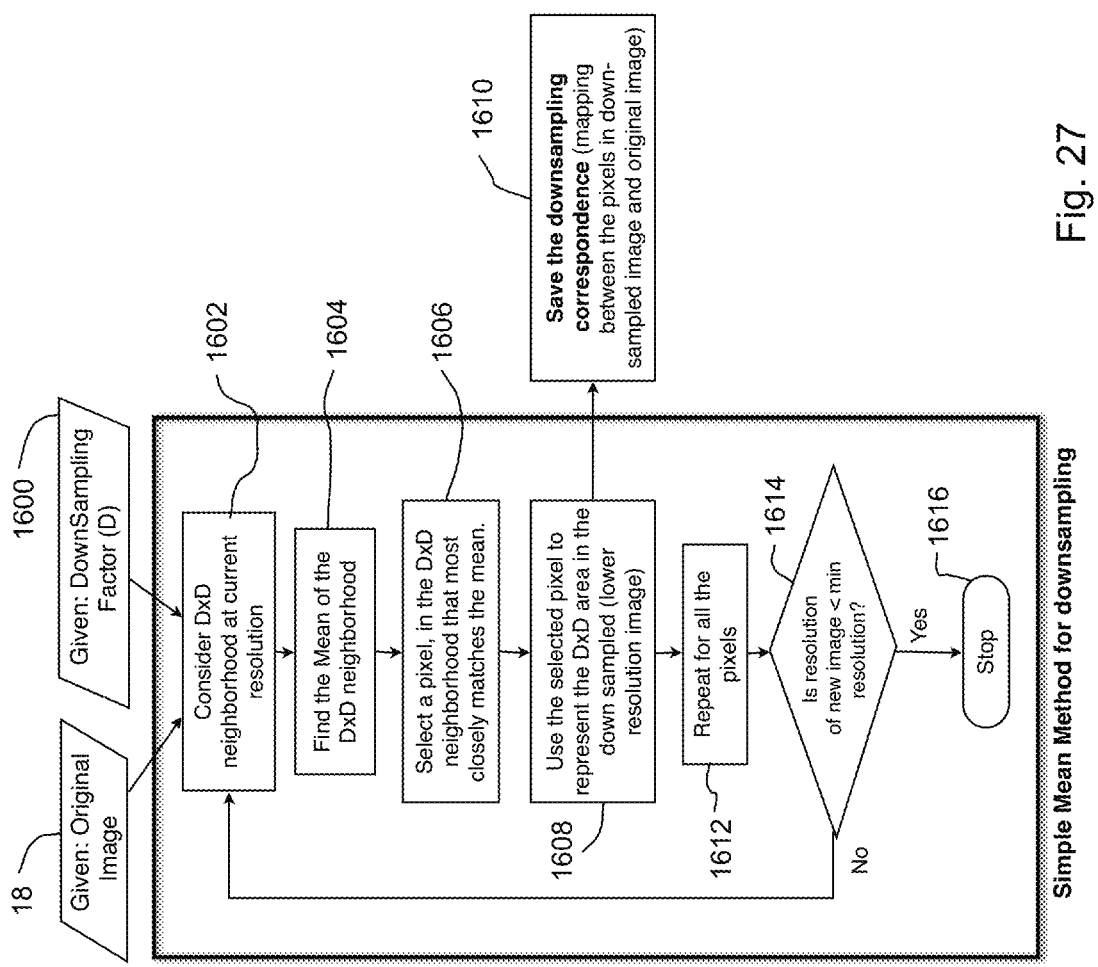
FIG. 27 is a flow chart for a simple mean method for creating a scale-spaced pyramid according to a feature of the present invention.

Thereafter, an image pyramid, as shown in FIG. 3b is created, for example, using either a Gaussian or Laplacian pyramid formation technique, as described above (blocks 1010, 1012). According to a further exemplary embodiment of the present invention, blocks 1010 and 1012 are implemented using a simple mean method. Each of the known Gaussian or Laplacian pyramid formation techniques for creating the pyramids, as described above, tend to average or blur colors from a high resolution to the next, lower resolution level. In some instances, an image analysis, according to a feature of the present invention, relies upon purity of color values for an accurate measure of color change. In those instances, a pyramid arrangement that preserves the purity of color from scale to scale is needed to insure the accuracy of solve results. Thus, according to a feature of the present invention, to increase accuracy in a solve based upon color change, a simple mean method, as described below with reference to FIG. 27, is used to assure color purity between the pyramid levels. Each scale representation of the image 18, 18a, . . . 18n, is then processed to divide each image representation into Type C tokens, as will be described in detail, below with reference to FIG. 6a (blocks 1014, 1016).

As will be discussed in detail, a Type C token comprises a connected image region of similar image properties among the contiguous pixels of the token, for example, similar color and intensity, where similarity is defined with respect to a noise model for the imaging system used to record the image. The use of Type C tokens improves processing efficiency.

According to a feature of the present invention, after the pre-processing of block 1008, the CPU 12 is operated to create, as a second grouping of pixels, a blend pixel image from the image depicted in the input image file 18 (block 1018). Blend pixels are generally positioned at material boundaries, and depict a blend of the different colors of the adjacent different materials forming the boundary. As such, each blend pixel depicts a color that does not actually exist in the scene depicted in the image file 18, and thus, can degrade the accuracy of image processing to segregate the image file 18 into corresponding intrinsic illumination and material reflectance images.

Figure 3D:
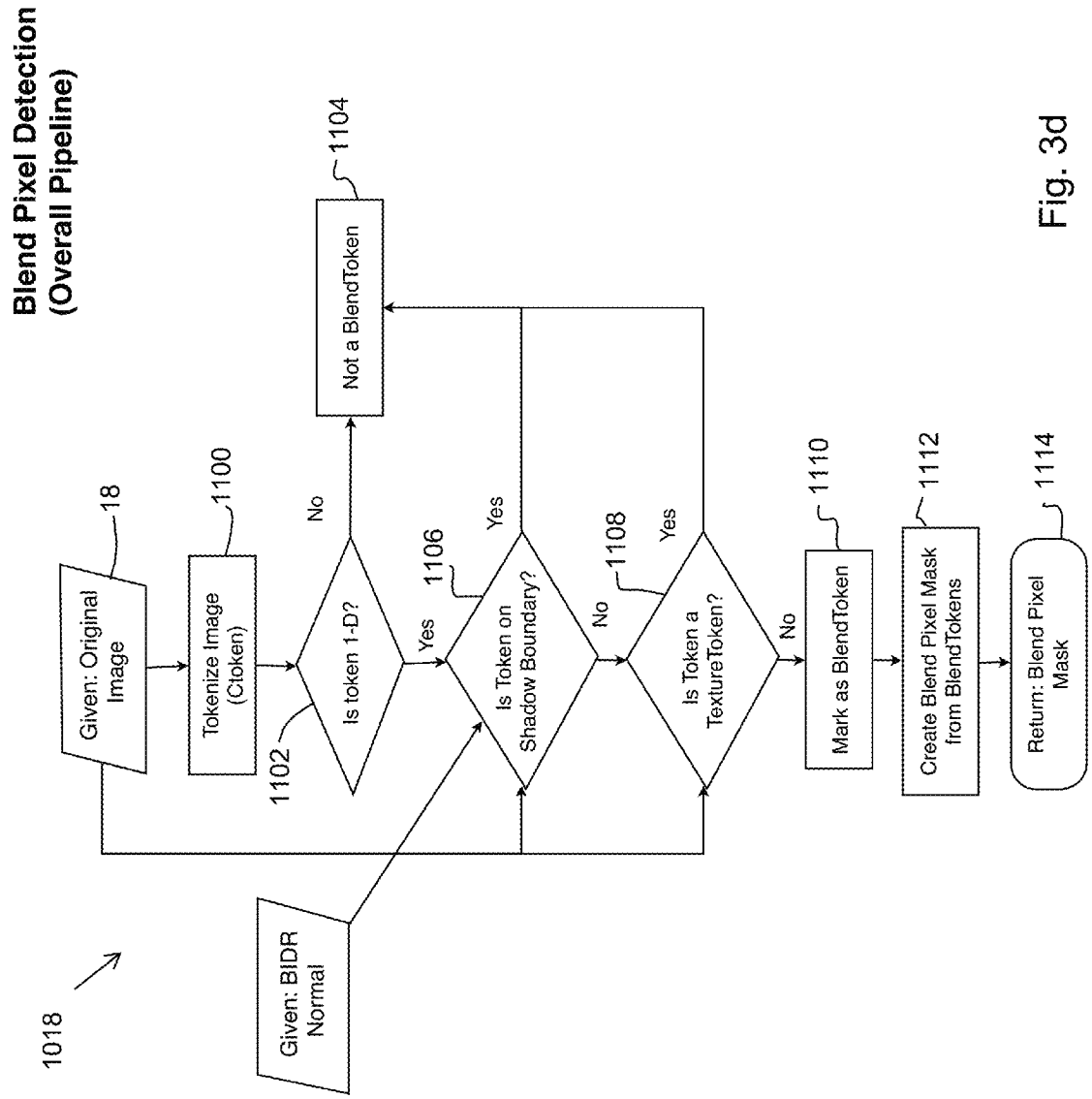
FIG. 3d is a flow chart for identifying blend pixels in an image.

Referring now to FIG. 3d, there is shown a flow chart for identifying blend pixels in an image. An original image file 18 is processed to identify Type C tokens, for example, according to the process steps shown in FIG. 6a, as will be described below (block 1100). In step 1102, the CPU 12 is operated to examine each Type C token, to identify all one dimensional (1-D) Type C tokens (that is a Type C token consisting of a single string of pixels). This is because tokens consisting of blend pixels are created by a mixing of different material colors at a material boundary, and tend to be one dimensional.

Figure 3E:
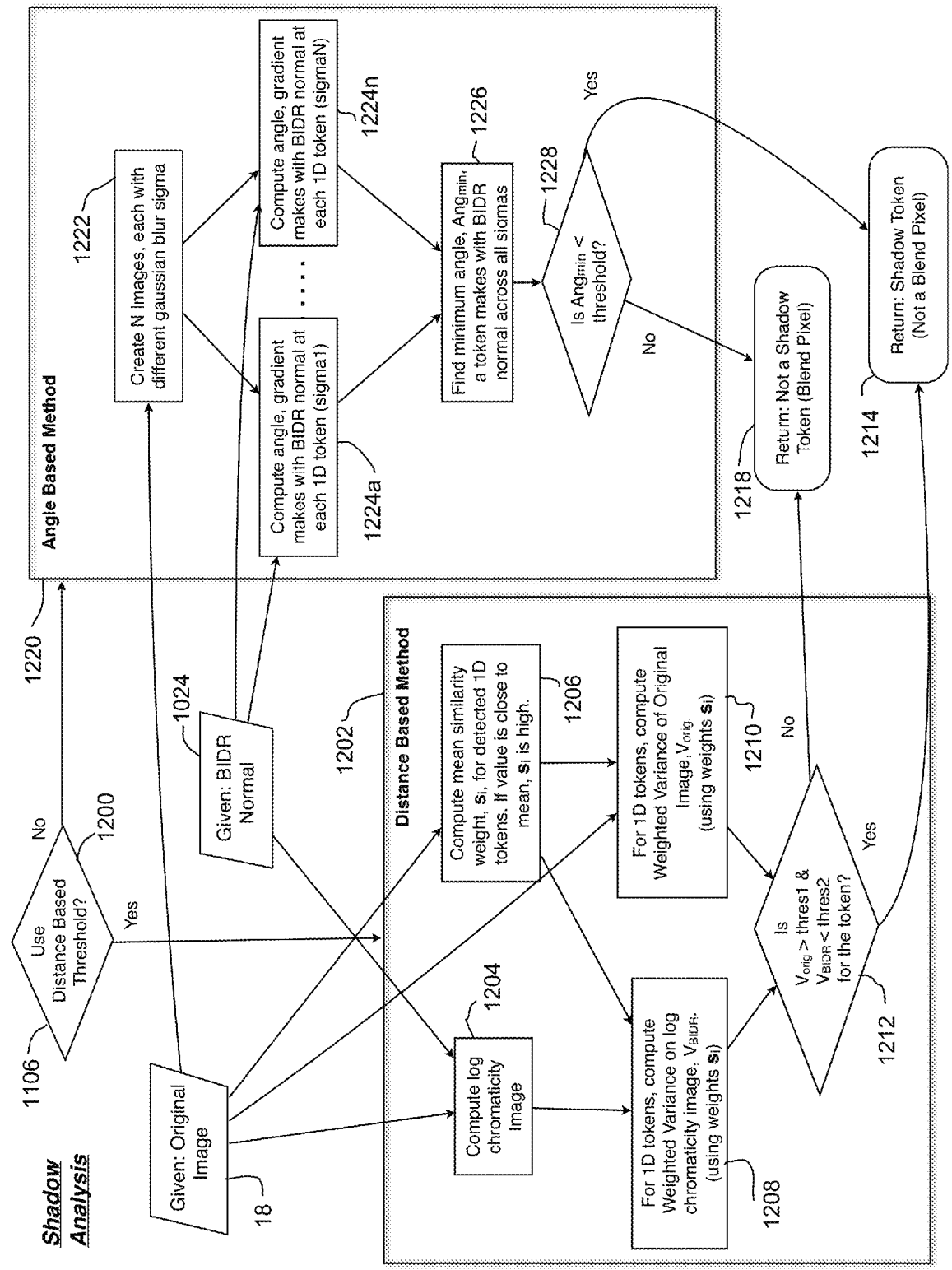
FIG. 3e is a flow chart showing a shadow boundary detection step, from the flow chart of FIG. 3d.

If a current Type C token being examined by the CPU 12 is not a 1-D token, the token is not labeled as a blend pixel token (block 1104). If the current Type C token is a 1-D token, the token is added to a list of 1-D tokens, and the CPU 12 proceeds to step 1106. In step 1106, the CPU 12 operates to examine the current 1-D Type C token to determine if the token is on a shadow boundary caused by an illumination change, or still a candidate for a material based blend pixel token. FIG. 3e shows a flow chart for each of a distance-based method and an angle-based method, for executing a shadow boundary analysis on a candidate 1-D token.

In step 1200, an indication is set, for example, by a user, to indicate execution by the CPU 12 of either the distance-based or angle-based methods. If step 1200 is set to the distance-based method, the CPU 12 proceeds to the distance-based method 1202. In the distance-based method 1202, the CPU 12, in series or parallel, computes each of a log chromaticity image (1204) and a mean similarity weights $s_1$ (1206).

A method and system for separating illumination and reflectance using a log chromaticity image is disclosed in U.S. Pat. No. 7,596,266, which is hereby expressly incorporated by reference. In step 1204, the CPU 12 executes the methods taught in U.S. Pat. No. 7,596,266, to compute an illumination invariant log chromaticity image based upon the image depicted in the image file 18, being processed. The processing can also include the determination of a BIDR normal (block 1024), as required for the computation of the log chromaticity image, according to the methods described in U.S. Pat. No. 7,596,266.

If the candidate 1-D token is caused by an illumination change, a corresponding gradient for each pixel in the candidate 1-D token will have a large value in the original image of the image file 18. However, the gradients for the pixels of the candidate 1-D token will have a relatively small value in the corresponding illumination invariant, log chromaticity image.

According to the distance-based method feature of the present invention, the gradient relationship, as between the original image and the corresponding, illumination invariant log chromaticity image, is used to detect whether the candidate 1-D token is caused by a shadow. To that end, in step 1206, the CPU 12 computes weighted variance values (V) for tokens in a small neighborhood on either side of a candidate 1-D token, as follows: $V = \Sigma^{N}_{i,j=1} s_{ij}(I_{ij}-M)^2 / \Sigma^{N}_{i,j=1} s_{ij}$, where N is the selected size of the neighborhood used to perform the analysis, M is the mean variance for a token i,j relative to the small neighborhood defining a potential fully lit and fully shadowed regions around the candidate 1-D token, $I_{ij}$ is the recorded color and intensity for the respective token of the local neighborhood, and $s_{ij}$ is a similarity weight, expressed as follows: $s_{ij} \propto 1/\max(\min Val, (I_{ij}-M)^2)$ with minVal being set at a value to avoid division by zero or a value close to zero.

In steps 1208 and 1210, respectively, the CPU 12 computes weighted variances in each of the log chromaticity image, $V_{BIDR}$ and the original image, $V_{ORIG}$ of the image file 18 for the selected small neighborhood surrounding the candidate 1-D token.

In step 1212, the CPU 12 compares $V_{ORIG}$ to a first threshold value, thres1 and compares $V_{BIDR}$ to a second threshold value, thres2. If $V_{ORIG}$ is greater than the thres1, a threshold set to indicate a relatively large change in gradient values for the pixels of the candidate 1-D token, in the original image, and $V_{BIDR}$ is less than thres2, a threshold set to indicate a relatively small change in gradient values for the pixels of the candidate 1-D token in the illumination invariant log chromaticity image, then the CPU 12 finds an indication for a token at a boundary caused by an illumination change, and returns an indication of not a blend pixel token (step 1214). If the opposite is true, the CPU 12 returns an indication of a blend pixel token candidate (step 1216).

If step 1200 is set to the angle-based method, the CPU 12 proceeds to the angle-based method 1220. In step 1222, the CPU 12 operates to generate N images, each based upon the image depicted in the image file 18, and each of the N images being generated with a different gaussian blur sigma, sigma 1 to sigma N, respectively. In steps 1224a to 1224n, the CPU 12 computes an angle between a gradient for the candidate 1-D token, in each one of the blurred versions of the image, and the BIDR normal (1024).

As fully described in U.S. Pat. No. 7,596,266, a bi-illuminant, dichromatic reflection (BIDR) model predicts that differing color measurement values fall within a cylinder in RGB space, from a dark end (in shadow) to a bright end (lit end), along a positive slope, when the color change is due to an illumination change forming a shadow over a single material of a scene depicted in the image. The BIDR normal corresponds to the orientation in, for example, the RGB color space, of the positive slope for the color variation caused by the illumination change across the single material. Accordingly, if the candidate 1-D token has a gradient that has an orientation in the color space that is close to the orientation of the BIDR normal (small angle), it is likely formed at a shadow boundary, rather than at a material boundary.

In step 1226, the CPU 12 operates to identify the minimum angle found in steps 1224a to 1224n, $Ang_{min}$. In step 1228, the CPU 12 compares $Ang_{min}$ to a threshold value. The threshold is set at a value to reflect an angle that shows substantial alignment to the BIDR normal, and thus, color change due to illumination. Thus, if $Ang_{min}$ is less than the threshold, the CPU 12 returns an indication of not a blend pixel token (step 1214). If the opposite is true, the CPU 12 returns an indication of a blend pixel token candidate (step 1216).

In alternative embodiments of the present invention, instead of a minimum angle in step 1226, the CPU 12 identifies a different statistical metric, such as, for example, a median or variance. Also, instead of a hard, fixed threshold, a soft threshold function is implemented.

Figure 3F:
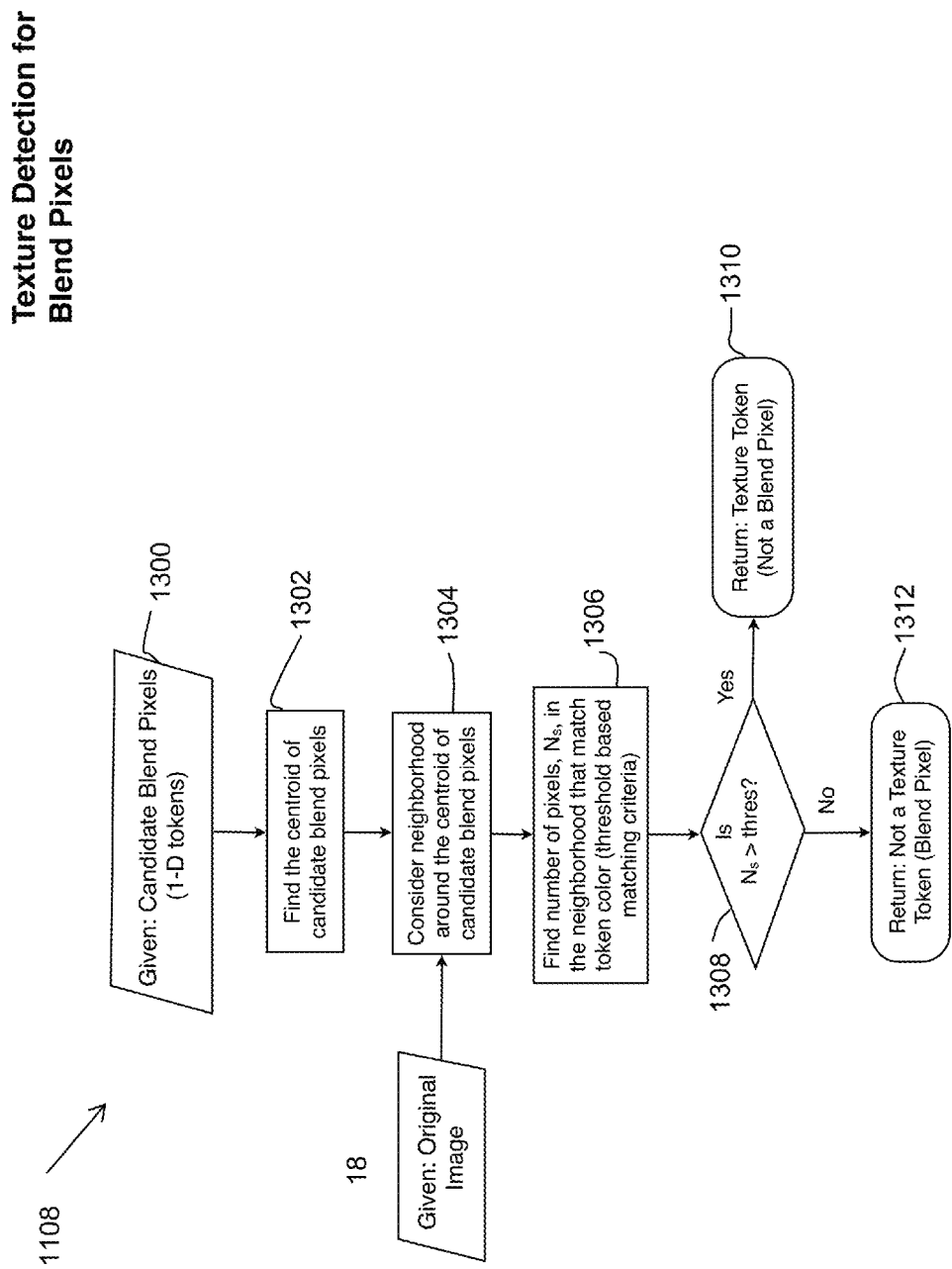
FIG. 3f is a flow chart for a texture detection step, from the flow chart of FIG. 3d.

When the CPU 12 enters return step 1214, the CPU then proceeds to step 1104 (FIG. 3d), and removes the candidate 1-D token from the list of 1-D tokens. When the CPU 12 enters a return step 1216, the CPU 12 proceeds to step 1108 (FIG. 3d). In step 1108, the CPU 12 operates to examine the current 1-D Type C token to determine if the token is a texture token, or is in fact, a material based blend pixel token. FIG. 3f is a flow chart for a texture detection step, (step 1108 from the flow chart of FIG. 3d).

In step 1300, the CPU 12 receives the candidate 1-D token, from the shadow analysis routine (1106). In step 1302, the CPU 12 operates to calculate the centroid of the candidate 1-D token. In steps 1304 and 1306, the CPU 12 operates to calculate the average color for the pixels of the candidate 1-D token, and compares that color to pixels of a pre-selected neighborhood surrounding the candidate 1-D token, to determine the number of pixels in the neighborhood, Ns, that match the color of the candidate 1-D token.

A texture in an image consists of a repeating pattern of colors. If the candidate 1-D token is within a texture, rather than at a material boundary, Ns will have a value greater than a threshold value set at a level that reflects a repeating pattern on either side of the candidate token, as opposed to two different materials at a material boundary. If Ns is greater than the threshold, thres, the CPU 12 returns an indication of a texture token (step 1310). If Ns is lower than the threshold, the CPU 12 returns an indication of a blend pixel token (step 1312).

When the CPU 12 enters return step 1310, the CPU then proceeds to step 1104 (FIG. 3d), and removes the candidate 1-D token from the list of 1-D tokens. When the CPU 12 enters a return step 1312, the CPU 12 proceeds to step 1110 (FIG. 3d).

In step 1110, the CPU 12 marks the candidate 1-D token as a blend pixel token in the 1-D token list. After executing steps 1100-1110 of the routine of FIG. 3d for each token of the image file 18, being processed, the CPU 12 proceeds to step 1112. The CPU applies the list of blend tokens identified through execution of the routine of FIG. 3d, to create a blend pixel mask (1114). The blend pixel mask completes block 1018 (FIG. 3c) and provides a representation of the image depicted in the image file 18, the representation set by the CPU 12 to depict the recorded intensity values, for example, RGB values, for each pixel location in the image identified as a blend pixel, with a nil value at each other pixel location.

Referring once again to FIG. 3c, in block 1020, the CPU 12 operates to create a scale-spaced pyramid of the blend pixel representation of the image, executing the same routines described above used to create the scale-spaced pyramid for the original image (step 1012).

As noted above, a BIDR Model predicts that differing color measurement values fall within a cylinder in RGB space, from a dark end (in shadow) to a bright end (lit end), along a positive slope, when the color change is due to an illumination change forming a shadow over a single material of a scene depicted in the image. The BIDR normal corresponds to the orientation in, for example, the RGB color space, of the positive slope for the color variation caused by the illumination change across the single material. BIDR normal information can be used to define constraints between, for example, Type C tokens, as a basis for segregating the illumination and material reflectance components of an image, as will be described.

According to a feature of the present invention, BIDR normal information is identified for each pixel in an image depicted in an image file 18. U.S. Patent Publication US 2014/0050395 teaches various techniques to identify spatially varying BIDR normals, for use in an image process. One technique taught in U.S. Patent Publication US 2014/0050395 calculates a BIDR normal information value for each pixel of the image file 18. Each normal information value is associated with corresponding pixel positions for the pixels used to calculate the respective normal, N, for example, from among pixels $p(1, 1)$ to $p(n, m)$ of an image file 18 being processed, as shown in FIG. 2. For example, a user can enter a set of lit-dark pairs that each include a patch of lit pixels and a corresponding patch of dark pixels, from a same material (block 1022). In an exemplary embodiment of the present invention, a user designates, for example, via a touch screen action, one or more sets of lit-dark pairs of pixel blocks, the pairs each corresponding to lit and shadowed regions of a same material, respectively, depicted in the image of the image file 18 being processed. Each pixel block includes, for example, an $n \times n$ array of pixels.

According to a feature of the present invention, the CPU 12 is operated to calculate a BIDR normal information value for each pixel of an image file, and create a BIDR normal image, with each pixel location, as shown, for example, in FIG. 2, indicating a respective BIDR normal information value, as calculated by the CPU 12 as a function of the user-selected lit-dark pairs, according to the teachings of U.S. Patent Publication US 2014/0050395 (block 1024). In alternative exemplary embodiments of the present invention, BIDR normal information values can be calculated based upon an automatic calculations, as also taught in U.S. Patent Publication US 2014/0050395.

In step 1026, the CPU 12 operates to create a scale-spaced pyramid of the BIDR normal representation of the image, by mapping the BIDR normal information values from one resolution to another. In the creation of the scale-spaced pyramid for the image file 18, as described above (step 1012), there is a mapping of pixels, from one resolution to the next resolution of the pyramid, as for example, via the color purity routine of FIG. 27. The mapping is used to map a pixel in a lower resolution to a corresponding pixel, in the next higher resolution of the pyramid.

Figure 3G:
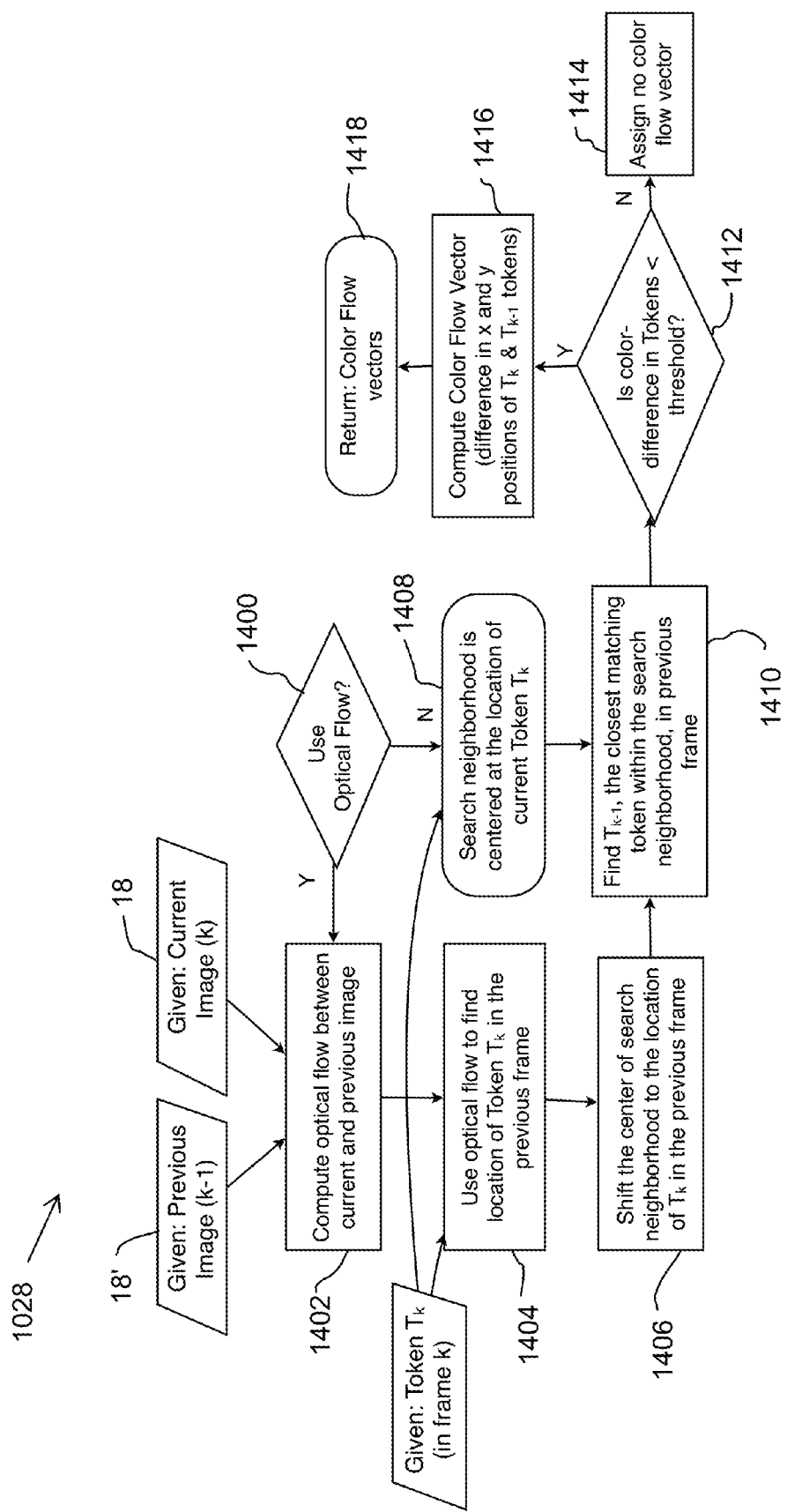
FIG. 3g is a flow chart for a color flow vector step of FIG. 3c.

According to a feature of the present invention, another grouping of the image is created when the image file 18 is a frame of a video recording. In the case of a video, the CPU 12 operates to calculate temporal information relevant to pixel locations. The temporal information can also be used to define constraints as a basis for segregating the illumination and material reflectance components of an image, as will be described. In an exemplary embodiment of the present invention, for the temporal information, the CPU 12 computes color flow vectors as a function of Type C tokens identified in the image file 18 being processed, and an image file 18' that is the previous frame of the video (block 1028). FIG. 3g is a flow chart for the color flow vector step of FIG. 3c.

In some videos, the camera used to record the scene, and the scene itself, are static, or depict slow moving objects. In other videos, the camera and/or objects in the scene undergo rapid movement. When the video depicts rapid motion, a rough estimate of motion is required for further processing. A known optical flow algorithm can be executed by the CPU 12 to provide the rough estimate of motion. In step 1400, a user can select whether the CPU 12 executes an optical flow algorithm. In an alternative exemplary embodiment, an automatic selection of optical flow can be made based upon an initial estimate of scene motion. If yes, the CPU 12 executes the optical flow algorithm to calculate optical flow information between current and previous frames of the video (k and k−1, corresponding to the image file 18 and the image file 18', respectively) (block 1402).

In step 1404, the CPU 12 uses the rough estimate of the optical flow information to ascertain the approximate location of a selected Type C token Tk, from image file 18 (frame k), in the image file 18' (frame k−1). In step 1406, the CPU 12 shifts a center of a search field within the previous frame k−1 to the location indicated by the optical flow information.

When the user selects not to use the optical flow information, as in the case of a video with static or slow moving objects, the CPU 12 executes step 1408. In step 1408, the CPU 12 centers the search location in frame k−1 based upon the location of the token Tk in the frame k. The use of the same location should be accurate due to the slow moving objects or static conditions of the video.

In step 1410, the CPU 12 locates token Tk−1, the token in the search location of frame k−1, that is the closest match to token Tk. In step 1412, the CPU 12 compares the color difference between Tk and Tk−1 to a threshold value. The threshold is set to a value, for example, comparable to the noise variation of the equipment used to record the video. If the color difference is not less than the threshold, the CPU 12 does not assign any color flow vector to the token (step 1414). If the color difference is less than the threshold, the CPU 12 proceeds to step 1416.

In step 1416, due to the close similarity of color values between the tokens, Tk and Tk−1, as established in step 1412, the CPU 12 computes a color flow vector for the movement of the token, from frame k−1 to frame k. The color flow vector is expressed as the difference in x,y positions of the centroid of the tokens Tk and Tk−1, relative to an x,y frame of reference placed upon the P(1, 1) to P(N, M) pixel array, as shown in FIG. 2. Upon completion of step 1416, the CPU 12 assigns the computed color vector for the current Tk, Tk−1 pair (step 1418).

Referring once again to FIG. 3c, to complete step 1028, the CPU 12 executes the routine of FIG. 3g for each token of the frame k, resulting in a listing of all tokens assigned a color flow vector and the corresponding color flow vectors. The CPU 12 then creates an image representation, with a computed color flow vector at each pixel corresponding to the centroid of each token analyzed and assigned a color flow vector during the execution of the routine of FIG. 3g.

In step 1030, the CPU 12 operates to create a scale-spaced pyramid of the color flow vector representation of the image, by mapping the color flow vectors from one resolution to another, for example, according to the mapping from FIG. 27. In the case of color flow vectors, the value of the color vector mapped from a higher resolution is divided by the amount of reduction in resolution, from one level of the pyramid to the next, lower resolution level. For example, if D pixels of a higher resolution level correspond to one pixel at the lower resolution of the next level, the color flow vector value is divided by a factor of 1/D. Again, the pixel mapping can be implemented according to the color purity routine of FIG. 27, as will be described.

According to a feature of the present invention, a user can indicate various parameters and/or information relevant to the image process. For example, a user can enter a proxy scale (block 1032). The proxy scale can limit the processing to a certain resolution, less than the full resolution level of the pyramid. This can be used to increase the speed of execution, particularly when the original image is large. The proxy setting can be used to obtain fast results as a preview, before full processing. A user can also specify parameters relevant to the tokenization process (block 1034). In addition, a user can, via a touch screen action, draw scribble lines on a display of the image. The scribbles can include, for example, a fully lit scribble to indicate an area of the image that is fully illuminated, a same reflectance scribble, to indicate an image region of a same material, and a same illumination scribble, to indicate a region of the image that is at the same level of illumination. The scribbles supply accurate information for the CPU 12 to impose on constraints.

In steps 1038a to 1038d, the CPU 12 operates to create constraints based upon the set of pyramids created in steps 1016, 1020, 1026 and 1030. The constraints are concatenated in a matrix array, for example, a matrix equation of the form [A] [x]=[b], as shown, for example, in FIGS. 21 and 22 (block 1040). The CPU 12 operates to solve the matrix equation (block 1042), and after performing optional post processing, as will be described in more detail (block 1044), outputs each of a material reflectance intrinsic image (1046) and an illumination intrinsic image (1048). The material reflectance image captures the reflectance properties of surfaces depicted in the image (the percentage of each wavelength of light a surface reflects). The illumination image captures the intensity and color of light incident upon each point on the surfaces depicted in the image.

All of the constraints of steps 1038a to 1038d, and the arrangement of the matrix equation [A] [x]=[b], are computed pursuant to a spatio-spectral operator/constraint/solver model for an image segregation, according to the present invention. As shown in FIG. 3a, in step 1004 the image file 18, and/or any selected one or more of the alternative representations image files 18a-n, are subject to an image segregation. As shown in FIG. 3c, multiple other groupings of the image, for example, blend pixels, BIDR normals and color flow vectors, can be created by the CPU 12 to supplement the image segregation.

A fundamental observation underlying a basic discovery of the present invention, is that an image comprises two components, material reflectance and illumination. All changes in an image are caused by one or the other of these components.

Spatio-spectral information is information relevant to contiguous pixels of an image depicted in an image file 18, such as spectral relationships among contiguous pixels, in terms of color bands, for example RGB values of the pixels, and the spatial extent of the pixel spectral characteristics relevant to a characteristic of the image, such as, for example, a single material depicted in the image or illumination effecting the image. The BIDR model discussed above is an example of spatio-spectral information, predicting color change among contiguous pixels across a single material.

As recognized by the BIDR model, the illumination includes an incident illuminant and an ambient illuminant. The spectra for the incident illuminant and the ambient illuminant can be different from one another. Thus, a spectral shift is caused by a shadow, i.e., a decrease of the intensity of the incident illuminant. The spectral shift can cause a variance in color of material depicted in the scene, from full shadow, through the shadow penumbra, to fully lit. Pursuant to a feature of the present invention, spectral shift phenomena is captured in spatio-spectral information, such as, for example a BIDR normal. The spatio-spectral information includes a spectral ratio: a ratio based upon a difference in color or intensities between two areas of a scene depicted in an image, which may be caused by different materials (an object edge), an illumination change (illumination boundary) or both.

According to a further feature of the present invention, spatio-spectral operators are generated to facilitate the image segregation process performed in step 1004, for the segregation of illumination and material aspects of a scene depicted in the retrieved image file 18, and any other representations of the image, such as image file 18a. Spatio-spectral operators comprise representations or characteristics of an image that encompass spatio-spectral information usable in the processing of material and illumination aspects of an image. The spatio-spectral operators are subject to constraints that define constraining spatio-spectral relationships between the operators, for input to a solver. The operators can be identified at any one of the selectively varied representations of the original image, and the constraints defined in terms of operators within a single representation or between operators in different representations.

A constraint can be imposed among the different levels of the pyramid, for example, to improve and expedite segregation at the finer scale (image file 18). To that end, as described above, a segregation into illumination and material is first quickly and efficiently performed by the CPU 12 (according to the spatio-spectral operator/constraint/solver model, described in detail below) for the relatively coarse image (for example, image file 18a). Thereafter, for more consistent and accurate results, during segregation at the finer scale, material color at each local area of the relatively finer scale image (for the material image generated for image file 18) is constrained such that a weighted average of the color at a local area of the fine scale equals the color of a corresponding local area of the coarse scale.

Such a weighted average constraint can be expressed, in a simplified analysis for a three pixel local area of the fine scale representation, as follows: if the log intensities are related as: $i2(x, y)=0.5*i1(x, y)+0.25*i1(x-1, y)+0.25*i1(x+1, y)$, wherein i2 (corresponding, for example, to the log of image file 18a) is a blurred version of i1 (corresponding to the log of image file 18); then the log material values are related as: $m2(x,y)=0.5*m1(x,y)+0.25*m1(x-1,y)+0.25*m1(x+1,y)$, wherein m1 and m2 are the material components of i1 and i2, respectively. Typically, the analysis is performed for a local area of the fine scale that is larger than the area corresponding to the pixel of the coarse scale representation, to avoid aliasing. For example, in pyramid wherein the coarse scale has half the pixels of the fine scale, a 5×5 pixel square would be used to calculate the weighted average for the color at the fine scale, and then constrained to be the color of a single pixel in the coarse scale representation.

In the exemplary embodiment of the present invention, the solver includes a mathematical processing engine that operates to obtain an optimized solution for the generation of an intrinsic image, such as a material image and/or an illumination image derived from the original image stored in the retrieved image file 18 or any other representation of the image, as a function of the constraining relationships between the spatio-spectral operators.

Spatio-spectral operators include, for example, tokens, token map information, log chromaticity representation values, X-junctions, BIDR model representations, a boundary representation, and a texton histogram based pixel representation. Each of the spatio-spectral operators can be computed and applied at the image file 18, and/or at any of the image files 18a, . . . 18n, and any solution at any level can be related to any solution at any other level each via the upsampling and downsampling relationships described above.

Pursuant to a feature of the present invention, a token is a connected region of an image wherein the pixels of the region are related to one another in a manner relevant to identification of image features and characteristics such as identification of materials and illumination. The use of tokens recognizes the fact that a particular set of material/illumination/geometric characteristics of an image extends beyond a single pixel, and therefore, while the image processing described herein can be done on a pixel level, tokens expedite a more efficient processing of image properties. The pixels of a token can be related in terms of either homogeneous factors, such as, for example, close correlation of color values among the pixels, or nonhomogeneous factors, such as, for example, differing color values related geometrically in a color space such as RGB space, commonly referred to as a texture.

Exemplary embodiments of the present invention provide methods and systems to identify various types of homogeneous or nonhomogeneous tokens for improved processing of image files. The present invention utilizes spatio-spectral information relevant to contiguous pixels of an image depicted in an image file 18, or contiguous pixels of any selectively varied representation (image files 18a, . . . 18n) to identify token regions within the original image and/or within any of the variations thereof. Such tokens identified in different selectively varied representations of the image can be used in, for example, the weighted average color constraint discussed above.

According to one exemplary embodiment of the present invention, homogeneous tokens are each classified as either a Type A token, a Type B token or a Type C token. A Type A token is a connected image region comprising contiguous pixels that represent the largest possible region of the image encompassing a single material in the scene. A Type B token is a connected image region comprising contiguous pixels that represent a region of the image encompassing a single material in the scene, though not necessarily the maximal region corresponding to that material. A Type C token comprises a connected image region of similar image properties among the contiguous pixels of the token, for example, similar color and intensity, where similarity is defined with respect to a noise model for the imaging system used to record the image. The weighted average constraint discussed above, can be implemented at a Type C token level, constraining the weighted average color of a token(s) at the fine scale to the color of a corresponding token(s) at a coarse scale.

A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by the BIDR model, according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image.

For purposes of describing, identifying and using linear tokens, the BIDR model can be stated as: $I_{(x, y, z, \theta, \phi, \lambda)} = c_b(\lambda) I_d(\lambda) \gamma_b + M_a(\lambda) c_b(\lambda)$, where: $I_{(x, y, z, \theta, \phi, \lambda)}$ is the radiance of a surface point at (x, y, z) in the direction $\theta, \phi$ for the wavelength $\lambda$, $c_b(\lambda)$ is the geometry independent body reflectance of a surface for the wavelength $\lambda$, $I_d(\lambda)$ is the incident illuminant for the wavelength $\lambda$. $\gamma_b$ is the product of a shadow factor $s_{x, y, z}$ and a geometric factor $m_b(\theta i)$, and $M_a(\lambda)$ is the integral of the ambient illuminant and geometric body reflectance over a hemisphere, excluding the incident illuminant. For more detailed information on the BIDR model, reference should be made to U.S. application Ser. No. 11/341,751, filed Jan. 27, 2006, entitled: "Bi-illuminant Dichromatic Reflection Model For Image Manipulation," published as US 2007/0176940 on Aug. 2, 2007.

Token map information indicates locations of tokens within an image, relative to one another. The map information is used to identify neighboring tokens for performing an analysis of token neighbor relationships relevant to constraining spatio-spectral relationships between tokens, for input to the solver. A token map can be generated for each selectively varied representation of the original image in respect of tokens identified at each respective variation.

Log chromaticity representation values provide illumination invariant values for pixels of the image. Logarithmic values of the color band values of the image pixels are plotted on a log-color space graph. The logarithmic values are then projected to a log-chromaticity projection plane oriented as a function of the BIDR model. The chromaticity plane values are substituted for the color band values (for example, RGB values) of each pixel. For more detailed information on log chromaticity representation values, reference should be made to U.S. Pat. No. 7,596,266.

An X-junction is an area of an image where a material edge and an illumination boundary cross one another. An X-junction is an optimal location for an accurate analysis of material and illumination aspects of an image.

A boundary representation is an arrangement of pixels, on each side of a boundary, formed by, for example, adjacent Type B tokens. The arrangement is used to facilitate an analysis of the boundary to classify the boundary as a material boundary on a smooth surface (as opposed to another type of boundary, for example, an illumination edge, depth boundary or simultaneous illumination and material change). The pixel representation is configured to provide samples of pixels within each of the Type B tokens forming the boundary. The pixels of the samples are subject to spatio-spectral analysis, and the results are compared to determine the likelihood that the respective boundary corresponds to a material change.

A texton is a homogeneous representation for a region of an image that comprises a texture. Image texture can be defined as a function of spatial variation in pixel intensities. Image texture patterns are frequently the result of physical or reflective properties of the image surface. Commonly, an image texture is associated with spatial homogeneity and typically includes repeated structures, often with some random variation (e.g., random positions, orientations or colors). Image textures are also often characterized by certain visual properties such as regularity, coarseness, contrast and directionality. An example of image texture is the image of a zebra skin surface as it appears to be spatially homogenous and seems to contain variations of color intensities which form certain repeated patterns. Some image textures can be defined by geometric characteristics, such as stripes or spots. A texton based operator, such as a texture token, as will be described, transforms patterns of differing reflectance caused by a textured material into a homogeneous representation that captures the spectral and spatial characteristics of the textured region in the image.

Constraints between spatio-spectral operators comprise, for example, an anchor constraint, a same illumination constraint, a smooth illumination constraint, a Type B token or same material constraint, a Linear token constraint, a BIDR enforcement constraint, a same texton histogram constraint, a log chromaticity similarity constraint, an X junction constraint, and a boundary representation constraint. Other constraints can be formed as between spatio-spectral operators, or other indicia, from different ones of the selectively varied representations of the image, such as, for example, the weighted average color constraint described above. Each constraint is configured as a constraint generator software module that defines the spatio-spectral operators utilized by the respective constraint and provides an expression of the constraining relationship imposed upon the constituent operators.

An anchor constraint utilizes, for example, a number of brightest/largest Type C tokens in an image. The constraining relationship is that the material of the selected brightest/largest Type C tokens is constrained to be an absolute value for the color/brightness observed in the image. The constraint anchors a material map for the image at an absolute brightness to avoid relative brightness constraints.

A same illumination constraint utilizes Type C tokens and Type B tokens identified in an image and token map information. The constraining relationship is that adjacent Type C tokens, as indicted by the token map information, are at the same illumination, unless the adjacent Type C tokens are part of the same Type B token. The term "same" in connection with the term "illumination" is used to mean an average value with respect to a noise model for the imaging system used to record the image. This constrains any observed differences in appearance between adjacent Type C tokens, that are not part of the same Type B token, to be a material change, as will appear.

A smooth illumination constraint is similar to the same illumination constraint. However, rather than constraining all pixels of adjacent Type C tokens to be of the same illumination, as in the same illumination constraint, in the smooth illumination constraint, the constraint is based upon the average illumination of the pixels near a shared boundary between adjacent Type C tokens. This constrains the illumination field to be somewhat smooth, as opposed to piecewise constant (the same, as defined above) throughout a token.

A Type B token or same material constraint also utilizes Type C tokens and Type B tokens. However, the constraining relationship is that all Type C tokens that are part of the same Type B token are constrained to be of the same material. This constraint enforces the definition of a Type B token, that is, a connected image region comprising contiguous pixels that represent a region of the image encompassing a single material in the scene, though not necessarily the maximal region corresponding to that material. Thus, all Type C tokens that lie within the same Type B token are by the definition imposed upon Type B tokens, of the same material, though not necessarily of the same illumination. The Type C tokens are therefore constrained to correspond to observed differences in appearance that are caused by varying illumination.

Accordingly, the Type B token constraint is complementary to the same and smooth illumination constraints, which, as opposed to illumination change, constrain observed differences to correspond to material change, as described above. This is due to the fact that in each of the same and smooth illumination constraints, Type C tokens that are adjacent and not part of the same Type B token, are constrained to the same illumination. These Type C tokens should comprise different materials, since by the constraint, they are not in the same Type B token and therefore, by the definition of Type B tokens enforced by the constraint, do not encompass a single material, so illumination should be a constant, and any observed difference is considered as attributable to a material change.

To summarize, pursuant to a feature of the present invention, the Type C and Type B token spatio-spectral operators are defined to provide characteristics of an image that enable segregation of illumination and material. Type C tokens each comprise a connected image region of similar image properties, for example similar color, as recorded and stored in an image file 18. Thus, adjacent Type C tokens indicate some form of change in the image or else they would form the same Type C token. Type B tokens encompass a single material. The complementary constraints of the same/smooth illumination constraints and the Type B token constraint enforce relationships between the tokens that indicate either a material change or an illumination change.

If the adjacent Type C tokens are within the same type B token, as in the Type B token constraint, the differences between them should correspond to illumination change due to the same material property of the common Type B token. If the adjacent Type C tokens are not within the same Type B token, as in the same/smooth illumination constraints, the difference between them should then correspond to a material change since they are not both defined by a common, single material Type B token.

A Linear token constraint utilizes Type C tokens and Linear tokens. The constraining relationship is that a difference between two Type C tokens, spaced by a Linear token, approximately equals a characteristic illuminant spectral ratio for the image. As defined, a Linear token follows a cylinder configuration along a positive slope, through color space. The BIDR model predicts that the positive slope equals a characteristic illuminant spectral ratio for the image. Thus, the color difference between two Type C tokens, one at each of the dark end and bright end of a Linear token, should reflect the value of the respective characteristic illuminant spectral ratio for the image.

A BIDR enforcement constraint utilizes Type C tokens and a BIDR model defined normal vector for the log-chromaticity projection plane. The constraining relationship is that the illumination for all Type C tokens in a local patch of the image forms a set of parallel lines in log-color space, the orientation of the parallel lines being defined by the BIDR model defined normal vector. The constraint therefore enforces the illumination field present in the image to explicitly fit the BIDR model prediction for the illumination.

Thus, each of the Linear token constraint and the BIDR enforcement constraint utilize BIDR model predictions as a basis to segregate illumination and material aspects of an image. The BIDR model predicts a color change in an image when the color change is due to an illumination change forming a shadow (i.e. a decrease in the intensity of the incident illuminant as the interplay between the incident or direct illuminant and the ambient illuminant in the illumination field) over a single material of a scene depicted in the image. The color change prediction of the BIDR model accurately constrains all color band variations among Type C tokens to illumination field effects occurring in an image by operating as a function of the interplay between the spectral variations occurring between incident illuminant and ambient illuminant components of the illumination field. Thus, BIDR model based constraints couple all color band variations into one integral constraining relationship.

A same texton histogram constraint utilizes Type C tokens and texton histogram operators identified for texture regions, such as texture tokens, within an image. A texton analysis is utilized wherein each pixel of the image (or pixels of those regions of an image identified as comprising a texture) from the recorded color band representation of the respective image file 18, such as, for example, RGB color band values, is converted to a two band representation wherein the two bands comprise a texton label and a texton histogram label. The two band representations are then used to identify texture tokens, as will be described below. A constraint can be imposed that all Type C tokens within the same texture token are of the same mean material.

A log chromaticity similarity constraint utilizes Type C tokens and log chromaticity representation values. The constraining relationship is that those Type C tokens having pixels with similar log chromaticity representation values are constrained to a same color value, with observed differences being attributed to variations in the illumination field.

An X-junction constraint utilizes Type C tokens and X-junction operators. As noted above, an X-junction is an area of an image where a material edge and an illumination boundary cross one another. X-junctions are typically identified by four Type C tokens, two pairs of same material Type C tokens forming the material edge, with each same material pair including an illumination boundary dividing the respective same material into lit and shadowed pairs of Type C tokens. The constraining relationship: 1) a Type B token constraint is imposed between each same material pair of Type C tokens forming the X-junction (those with an illumination boundary between them), and 2) a same illumination constraint is imposed between each pair of Type C tokens forming the material edge of the X-junction. For a more detailed description of X-junctions and the relationships of constituent tokens, reference should be made to U.S. application Ser. No. 11/341,742, filed Jan. 27, 2006, entitled: "Method And System For Identifying Illumination Flux In An Image," published as US 2006/0177149 on Aug. 10, 2006.

A boundary representation constraint is defined by a standard ratio constraint. An analysis performed on a boundary representation, when indicating a material change, provides an estimate of the ratio of colors between two adjacent regions defined by the boundary, for example, the adjacent Type B tokens, even when the illumination varies over the regions. The constraint states that the ratio of the colors of two adjacent regions is X. The boundary representation analysis is executed at the level of Type B tokens, to classify a boundary as being caused by a material change, then propagated down to the level of the constituent Type C tokens. For a more detailed description of a boundary analysis, at the Type B token level, reference should be made to U.S. application Ser. No. 12/079,878, filed Mar. 28, 2008, entitled "System and Method For Illumination Invariant Image Segmentation."

According to a feature of the present invention, the boundary representation constraint states that all adjacent pairs of Type C tokens along the boundary, (one Type C token on each side of the boundary, and all of the Type C tokens being within the Type B tokens forming the respective boundary), have colors that satisfy the ratio X, as indicated by the boundary representation analysis.

According to a preferred embodiment of the present invention, each of the above described constraints can be classified into one of three basic types of constraints, an absolute material color constraint, a same material constraint and a relative reflectance constraint. The absolute material constraint constrains the material at a particular location of an image to be a certain color, as implemented in, for example, the anchor constraint. The same material constraint constrains operators relevant to an image (for example, two pixels or Type C tokens) to be of the same material. The same material type of constraint can be implemented in, for example, Type B, X-junction, log chromaticity similarity, same texton histogram and linear token constraints. The relative reflectance constraint constrains operators relevant to an image (for example, two pixels or Type C tokens) to have a similarity of reflectance characteristics, such as defined by smooth illumination and same illumination constraints, and which can be specified by X-junction, and boundary representation constraints.

In another example of the selectively varied representation embodiment of the present invention, such as the multi-resolution embodiment, groupings provided by the spatio-spectral operators, such as Type C tokens, Type B tokens and texture tokens, are identified at one scale, such as a fine scale (for example image file 18) and constraining relationships among those groupings are projected to a coarse scale (for example image file 18a). In this exemplary embodiment of the present invention, a constraint implemented at a fine scale representation, such as, for example, the same material constraint of a Type B token constraint, is arranged to constrain pixels or Type C tokens to be within in the same Type B token, and further, to be within a relatively limited neighborhood of the fine scale representation. The neighborhood is limited to an extent somewhat less than the extent of a typical relevant Type B token, for example, a neighborhood comprising a 50×50 pixel array. The limited neighborhood restriction has the advantage of assuring a sparse matrix for an accurate solution, with operating efficiencies for speedy processing, resulting from the limited extent of the image subject to analysis according to the constraint. However, the implementation across multiple scales also assures a solution according to a long range constraint since a short range within a coarse scale representation corresponds to a relatively long range in the fine scale representation.

A projection of the constraining relationship imposed on a grouping, from one scale, to another scale, is implemented, for example, by upsampling the grouping identified and used in the constraint at the fine scale representation, to a next coarse scale representation. The performance of the constraint is repeated at the coarse scale, again limiting the neighborhood processed at the coarse scale, and subject to the inter-scale relationship defined by the filtering/downsampling operation, and so on throughout the various scales of the pyramid. The limit at the coarse scale is a multiple of the same limit of the relatively fine scale. For example, as shown in FIG. 3b, a single pixel, $P_a(3, 2)$ in the relatively coarse resolution image file 18a corresponds to pixels P(5, 3), P(6, 3), P(5, 4) and P(6, 4) of fine resolution image file 18. The grouping can be identified at any of the scales of resolution, and projected via upsampling or downsampling to the other scales.

An exemplary solver according to a feature of the present invention comprises a mathematical processing engine for executing an optimizing function, for example, optimization of results in an equation expressed by: [A] [x]=[b], where [A] is a matrix of values that are to be satisfied by (and therefore, taken as solved for by) the definitions of the operator(s) and the constraining relationship(s) for the operator(s), as indicated by selected constraint(s), [x] is a matrix of variables for which the equation is finding an optimal solution, for example, one of an illumination or material component of an image component, for example, a pixel or token, and [b] is a matrix of values observed in an image selected for processing, for example, the recorded values for the RGB color bands of each pixel of an image file 18 or color values of pixels within a selectively varied representation of the original image depicted in image file 18 (e.g. image files 18a . . . 18n). The optimizing equation can be implemented in a mathematical optimizing function selected from a set of known optimization solvers such as, for example, known convex optimization operations such as a least squares solver, or a preconditioned conjugate gradient solver.

According to the selectively varied representation embodiment of the present invention, a solution according to the [A][x]=[b] matrix equation can be accomplished at each representation, for example, at each scale of the scale-spaced pyramid, either simultaneously or sequentially. The inter-scale relationship constrains the multi-scale solution, while introducing efficiencies in operation execution for increased speed. By dividing processing across different scales, solutions are found for a set of smaller systems rather than one large complex system. Thus, the solutions are more accurate and the CPU 12 can execute in faster computation times while utilizing substantially less memory.

Figure 4:
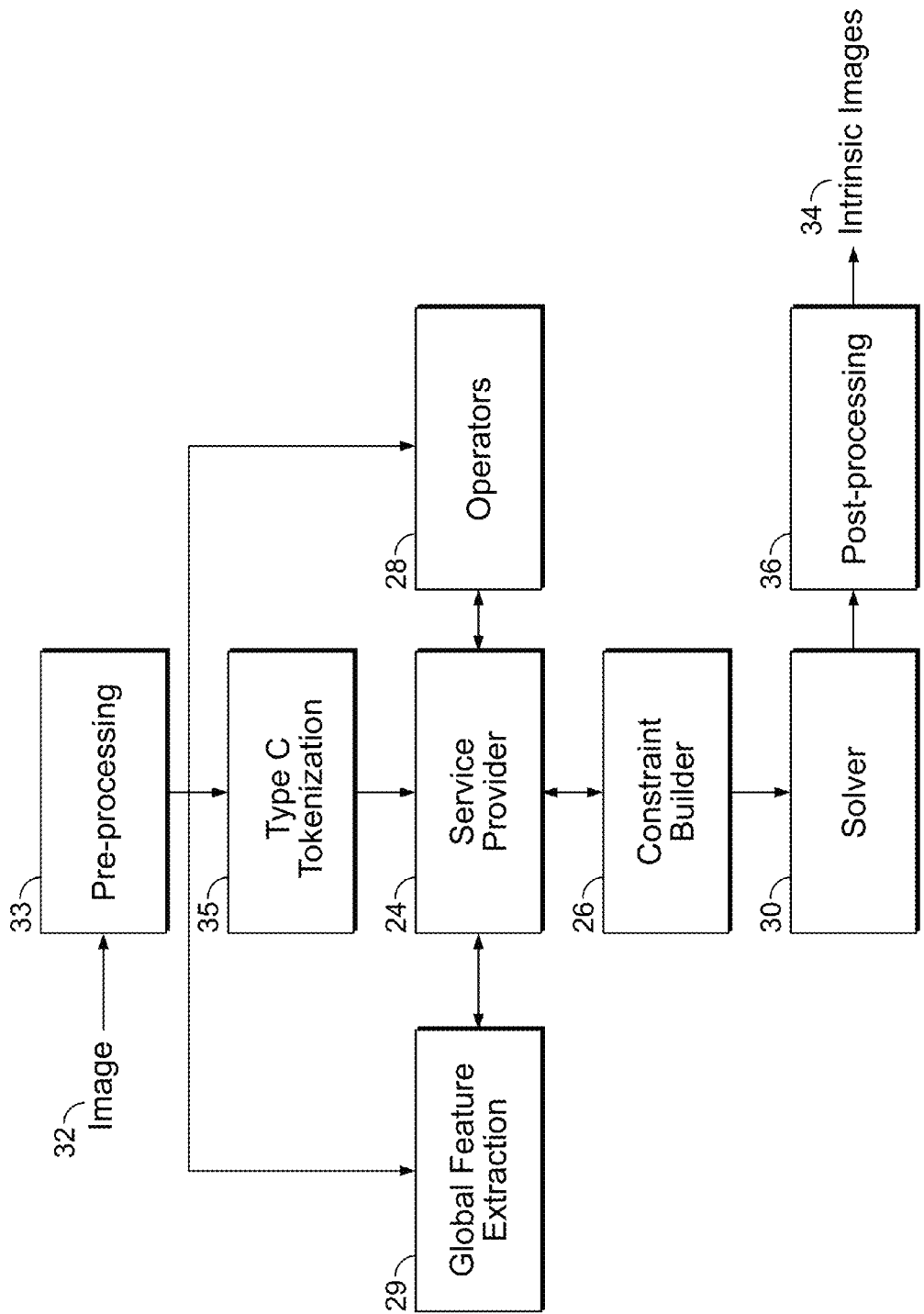
FIG. 4 is a functional block diagram for an image segregation system architecture for performing the data flow of FIG. 3a, implemented in the computer system of FIG. 1, according to a feature of the present invention.

FIG. 4 shows a functional block diagram of an image segregation system architecture, implemented in, for example, the computer system of FIG. 1, according to a feature of the present invention. Alternatively, the functional blocks of FIG. 4 can be implemented in a dedicated hardware circuit arranged to perform the functionality of the blocks of FIG. 4. An image 32 (as depicted in an image file 18, or one of the selectively varied representations in image files 18a, . . . 18n) is input to a preprocessing block 33. The preprocessing block 33 can perform such functions as correction of chromatic aberration in the image 32, combining multiple images to provide a high dynamic range image, linearize pixel data for the image, and so on, for an image optimized for processing. The pre-processed image is then input to a Type C tokenization block 35 which operates to identify Type C tokens in the pre-processed image, in the manner described below with reference to FIG. 6a. Type C tokens are common to many of the constraints utilized in exemplary embodiments of the present invention, thus, an initial identification of Type C tokens for an input image 32 expedites further processing.

In an exemplary embodiment of the present invention, the CPU 12 executes code to implement both the preprocessing block 33 and the Type C tokenization block 35, as well as a service provider 24, that functions as a central agent and caching structure (configured in the memory 16), to handle an image for processing according to the teachings of the present invention. The service provider 24 receives and stores the pre-processed image and related Type C token information from the Type C tokenization block 35, and is coupled to an operators block 28 (executed by the CPU 12) arranged to generate any other operators for the image required by selected constraints, as will appear. The service provider 24 is also coupled to a global features extraction input 29. The global features extraction input 29 can be used to provide the system with information relevant to an image being processed, such as an indication of light source when the image was taken (sunlight, fluorescent light, incandescent light), time of day, location, domain knowledge, such as information relevant to the nature of the image, such as interior, exterior, buildings, lawns with green grass, trees with leaves in bloom, etc., and any other parameters relevant to image processing. The service provider 24 stores the global features extraction input 29 with a related input image 32.

A constraint builder 26 is coupled to the service provider 24. The constraint builder 26 uses a constraint generator library (configured within the memory 16) that stores the constraint generator software modules for the various constraints described above. The service provider 24 and constraint builder 26 operate to arrange spatio-spectral operators relevant to the pre-processed image, according to selected ones of the constraint generator software modules, in for example, the [A] [x]=[b] matrix equation.

A solver 30 (executed by the CPU 12) is coupled to the constraint builder 26, and implements an optimization operation, as described above, for an optimal solution for the [A] [x]=[b] matrix equation, for use in generating intrinsic images from the pre-processed image. The solver 30 is also coupled to a post-processing block 36 (executed by the CPU 12) for certain post-processing operations. The post-processing operations can include, for example, monotonicity maintenance. In monotonicity maintenance, if two large regions exhibit a linear transition in the input image 32, the transition should remain a linear transition in the output intrinsic image 34. Post-processing can also include illumination propagation, that serves to fill in holes left by the solver 30, illumination-map based white balancing and other filtering, smoothing processes. The post-processing block 36 outputs intrinsic images 34.

Figure 5:
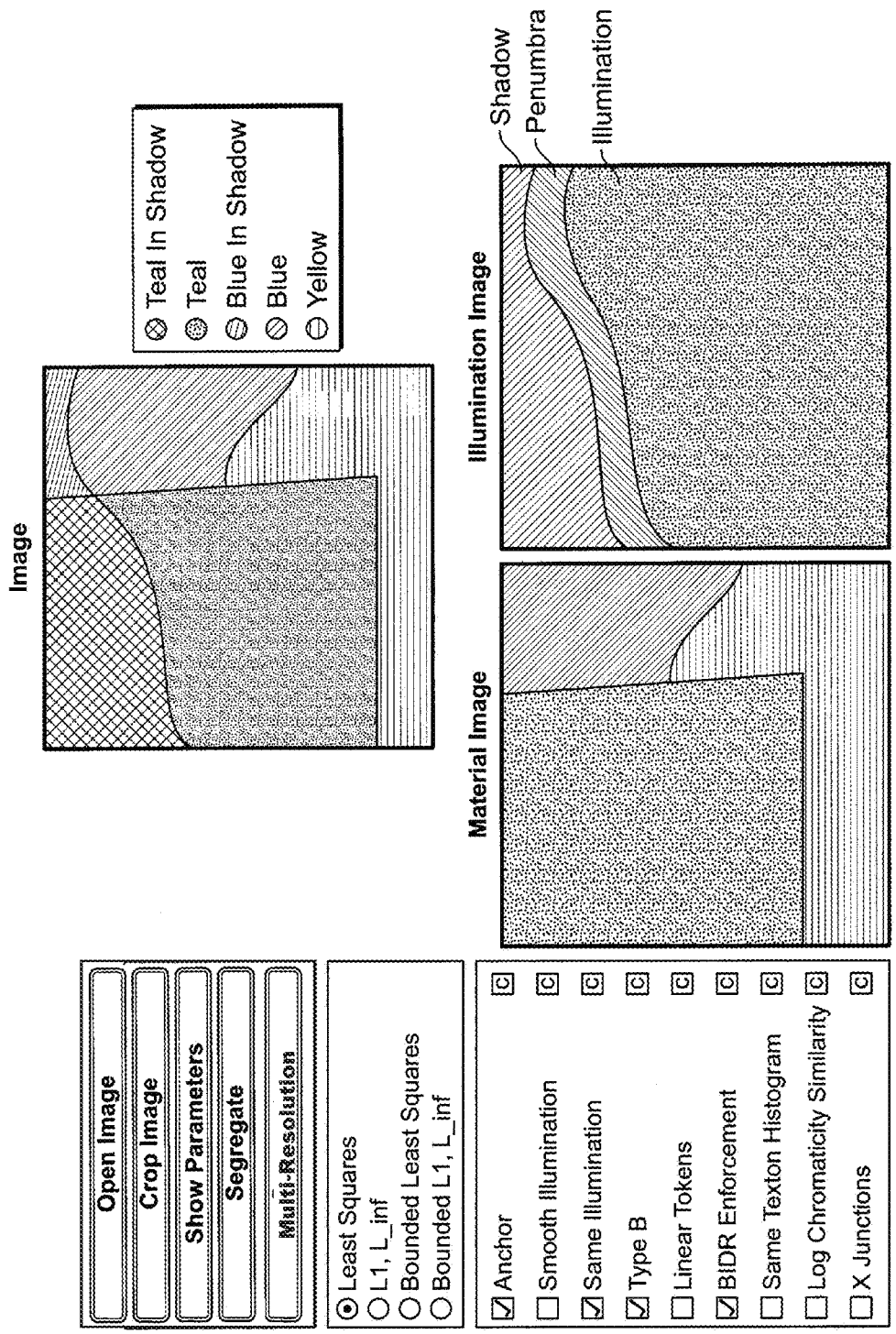
FIG. 5 shows a graphical user interface for use in connection with an implementation of the image segregation system architecture feature of the present invention.

Referring now to FIG. 5, there is shown a graphical user interface (GUI) for use in connection with an exemplary implementation of the image segregation system architecture feature of the present invention. The GUI of FIG. 5 is displayed on the monitor 20 of the computer system 10 by the service provider 24 for a user to select a desired image segregation operation. The upper left hand corner of the GUI indicates Open Image, Crop Image, Show Parameters, Segregate and Multi-Resolution selection indicators. A user can move and click a cursor on a desired selector indicator. The Open Image indicator lists all image files 18 currently stored in the memory 16 and enables the user to select an image for processing. The selected image is input 32 (see FIG. 4) to the service provider 24 (via the preprocessing block 33 and the Type C tokenization block 35) which operates to display the selected image at the upper center of the monitor 20 (FIG. 5).

A material image derived by operation of the exemplary segregation system from the selected image is output 34 (see FIG. 4) after execution of the image segregation processing by the solver 30 and displayed at the lower right hand of the monitor 20 (FIG. 5). The derived illumination image is displayed at the lower right hand of the monitor 20 (FIG. 5).

According to a feature of the present invention, the Crop Image selector permits a user to crop a selected image so as to process a portion of the overall image. The Show Parameter selector displays parameters related to the selected image file 18. Parameters for each image file 18 can be stored in a parameter data file associated with a corresponding image file 18, and include any parameters relevant to the processing of the image depicted in the associated image file 18, for example the global features extraction input 29. Parameters can include any data relevant to image processing such as, for example, any variable for pixel analysis by the CPU 12, as for example, in the generation of spatio-spectral operators, and domain knowledge, such as information relevant to the nature of the image, such as interior, exterior, buildings, lawns with green grass, trees with leaves in bloom, etc.

A multi-resolution selector can display a drop down menu that provides options such as either a Gaussian or Laplacian pyramid generation, with specification of the number of scales, and the resolution of each scale. The drop down menu can also include selections for a computer operation for illumination and material image segregation, to be performed at a relatively coarse scale representation of the image, and then used to constrain a solution at a relatively finer scale resolution. In another selection option, a segregation of illumination and material aspects of the image is selectively divided among representations at differing scales of image resolution, as described above.

Below the selection indicators is a list of each of the optimizing functions that can be used as the solver 30, and a further list of each of the constraint generators contained in the constraint generator library of the constraint builder 26. A user selects a desired mathematical operation and one or more of the constraints to be imposed upon the selected image. After selection of the image to be processed, the constraints to be imposed and the mathematical operation to be executed, the user can click on the Segregate indicator to commence image segregation processing.

Upon commencement of the image segregation processing, the service provider 24 generates a scale-spaced pyramid, if a multi-resolution operation is selected, and retrieves the constraint generator software modules for the selected constraints to identify the spatio-spectral operators utilized by the selected constraints. Any spatio-spectral operators not already stored by the service provider 24 are generated by the operators block 28, for the image being segregated, and the service provider 24 caches the results. The cached results can be reused in any subsequent operation for a selected image, with the same set of associated parameters.

In a multi-resolution operation, the service provider 24 can sequence operations, such as perform the segregation at the relatively coarse representation of image file 18a, store the results, then proceed to a segregation of image file 18, enforcing the color constraint described above. The service provider 24 (operating via the CPU 12) can also be operated to execute a standard edge detector, then define regions of the relatively fine resolution image of image file 18 around each identified edge. An image segregation is then performed in respect of the identified edge regions of the image file 18. A subsequent image segregation is performed on relatively coarse image file 18a for regions corresponding to all non-edge regions of image file 18.

In an example of an implementation of the spatio-spectral operator/constraint/solver model of the present invention, when the selected constraint is a same illumination constraint, the service provider 24 identifies Type C tokens, Type B tokens and a token map for the selected image. The Type C tokens were generated by the Type C tokenization block 35. The service provider 24 operates the operators block 28 to generate the remaining operators specified by the same illumination constraint.

Figure 6A:
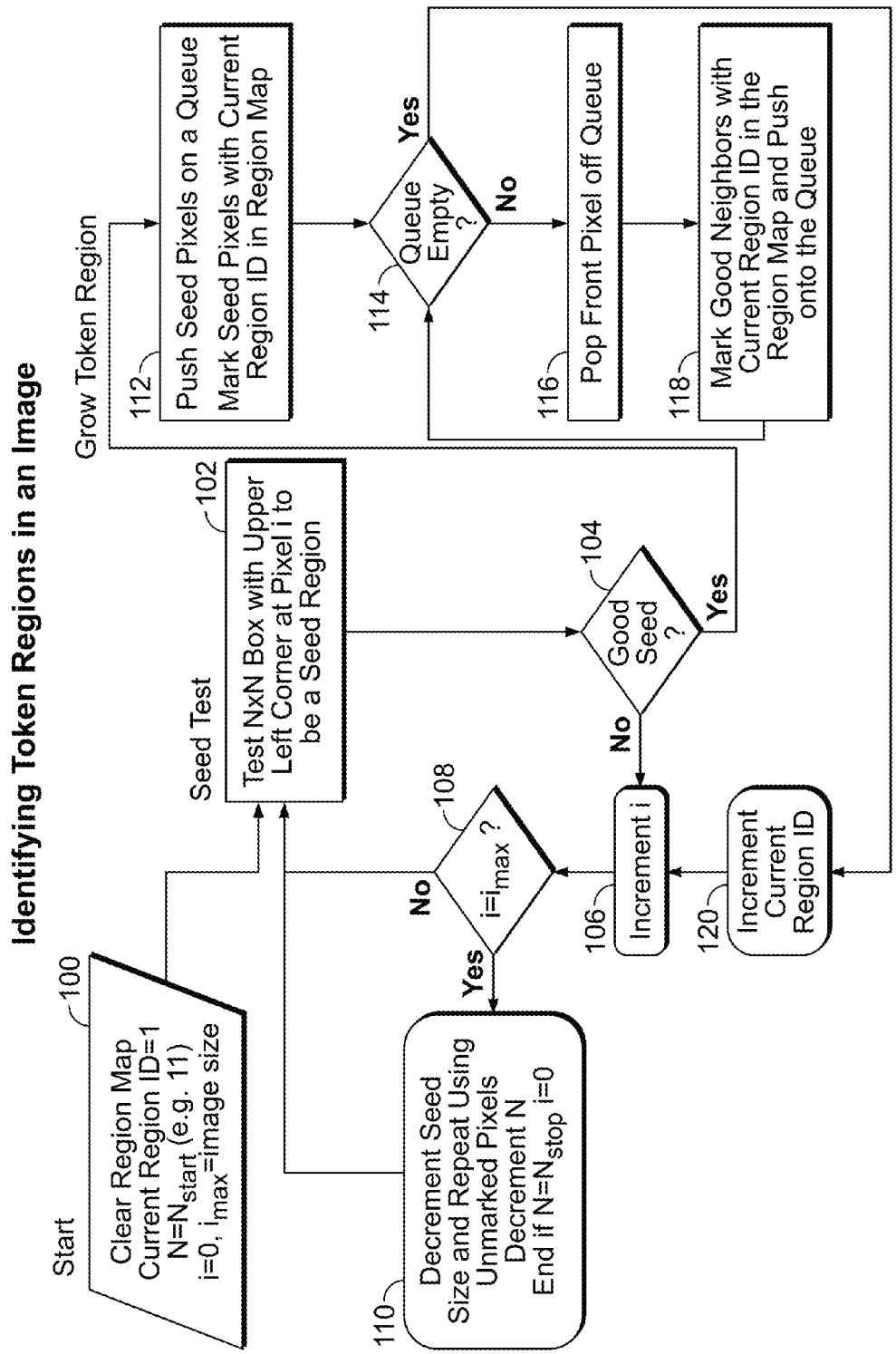
FIG. 6a is a flow chart for identifying Type C token regions in the image file of FIG. 2a, according to a feature of the present invention.

Referring now to FIG. 6a, there is shown a flow chart for generating Type C token regions in the image file of FIG. 2, (as depicted in one or more or each of image file 18, and image files 18a, . . . n), according to a feature of the present invention. Type C tokens can be readily identified in an image by the Type C tokenization block 35, utilizing the steps of FIG. 6a. The operators block 28 can then analyze and process the Type C tokens to construct Type B tokens when specified by a selected constraint, as will appear.

A $1^{st}$ order uniform, homogeneous Type C token comprises a single robust color measurement among contiguous pixels of the image. At the start of the identification routine of FIG. 6a, the CPU 12 (executing as the Type C tokenization block 35) sets up a region map in memory. In step 100, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, N=$N_{start}$. $N_{start}$ can be any integer >0, for example it can be set at set at 11 or 15 pixels.

At step 102, a seed test is begun. The CPU 12 selects a first pixel, i=(1, 1) for example (see FIG. 2), the pixel at the upper left corner of a first N×N sample of the image file 18. The pixel is then tested in decision block 104 to determine if the selected pixel is part of a good seed. The test can comprise a comparison of the color value of the selected pixel to the color values of a preselected number of its neighboring pixels as the seed, for example, the N×N array. The color values comparison can be with respect to multiple color band values (RGB in our example) of the pixel or the filter output intensity histogram representation of the pixel, in the event the image was filtered for texture regions, as described above. If the comparison does not result in approximately equal values (for example, within the noise levels of the recording device for RGB values) for the pixels in the seed, the CPU 12 increments the value of i (step 106), for example, i=(1, 2), for a next N×N seed sample, and then tests to determine if i=$i_{max}$ (decision block 108).

If the pixel value is at $i_{max}$, a value selected as a threshold for deciding to reduce the seed size for improved results, the seed size, N, is reduced (step 110), for example, from N=15 to N=12. In an exemplary embodiment of the present invention, $i_{max}$ can be set at i=(n, m). In this manner, the routine of FIG. 5a parses the entire image at a first value of N before repeating the routine for a reduced value of N.

After reduction of the seed size, the routine returns to step 102, and continues to test for token seeds. An $N_{stop}$ value (for example, N=2) is also checked in step 110 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 102, and continues to test for token seeds.

When a good seed (an N×N array with approximately equal pixel values) is found (block 104), the token is grown from the seed. In step 112, the CPU 12 pushes the pixels from the seed onto a queue. All of the pixels in the queue are marked with the current region ID in the region map. The CPU 12 then inquires as to whether the queue is empty (decision block 114). If the queue is not empty, the routine proceeds to step 116.

In step 116, the CPU 12 pops the front pixel off the queue and proceeds to step 118. In step 118, the CPU 12 marks "good" neighbors around the subject pixel, that is neighbors approximately equal in color value to the subject pixel, with the current region ID. All of the marked good neighbors are placed in the region map and also pushed onto the queue. The CPU 12 then returns to the decision block 114. The routine of steps 114, 116, 118 is repeated until the queue is empty. At that time, all of the pixels forming a token in the current region will have been identified and marked in the region map as a Type C token. In the event the pixels comprise intensity histogram representations, the token can be marked as Type C.

When the queue is empty, the CPU 12 proceeds to step 120. At step 120, the CPU 12 increments the region ID for use with identification of a next token. The CPU 12 then returns to step 106 to repeat the routine in respect of the new current token region.

Figure 6B:
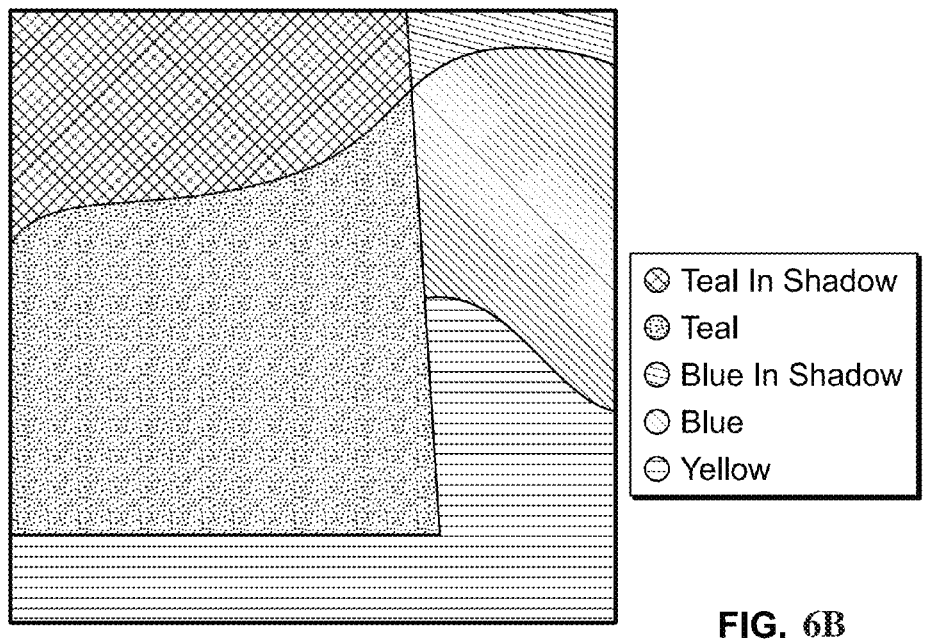
FIG. 6b is an original image used as an example in the identification of Type C tokens.
Figure 6C:
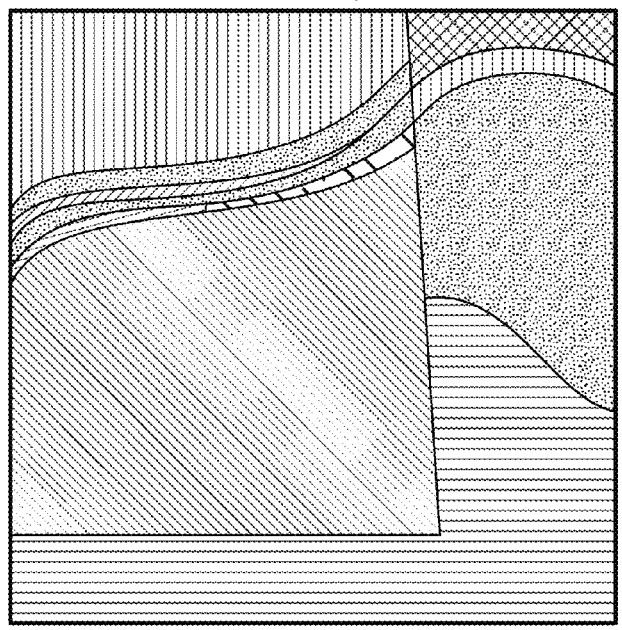
FIG. 6c shows Type C token regions in the image of FIG. 6b.

Upon arrival at N=Nstop, step 110 of the flow chart of FIG. 5a, or completion of a region map that coincides with the image, the routine will have completed the token building task. FIG. 6b is an original image used as an example in the identification of tokens. The image shows areas of the color blue and the blue in shadow, and of the color teal and the teal in shadow. FIG. 6c shows token regions corresponding to the region map, for example, as identified through execution of the routine of FIG. 6a (Type C tokens), in respect to the image of FIG. 6b. The token regions are color coded to illustrate the token makeup of the image of FIG. 6b, including penumbra regions between the full color blue and teal areas of the image and the shadow of the colored areas.

Upon completion of the routine of FIG. 6a by the Type C tokenization block 35, the service provider 24 stores the Type C token region information for the selected image. Prior to commencing any process to generate Type B tokens from the identified Type C tokens, the operators block 28 tests each identified Type C token to make certain that each Type C token encompasses a single material. While each Type C token comprises a region of the image having a single robust color measurement among contiguous pixels of the image, the token may grow across material boundaries.

Typically, different materials connect together in one Type C token via a neck region often located on shadow boundaries or in areas with varying illumination crossing different materials with similar hue but different intensities. A neck pixel can be identified by examining characteristics of adjacent pixels. When a pixel has two contiguous pixels on opposite sides that are not within the corresponding token, and two contiguous pixels on opposite sides that are within the corresponding token, the pixel is defined as a neck pixel.

Figure 6D:
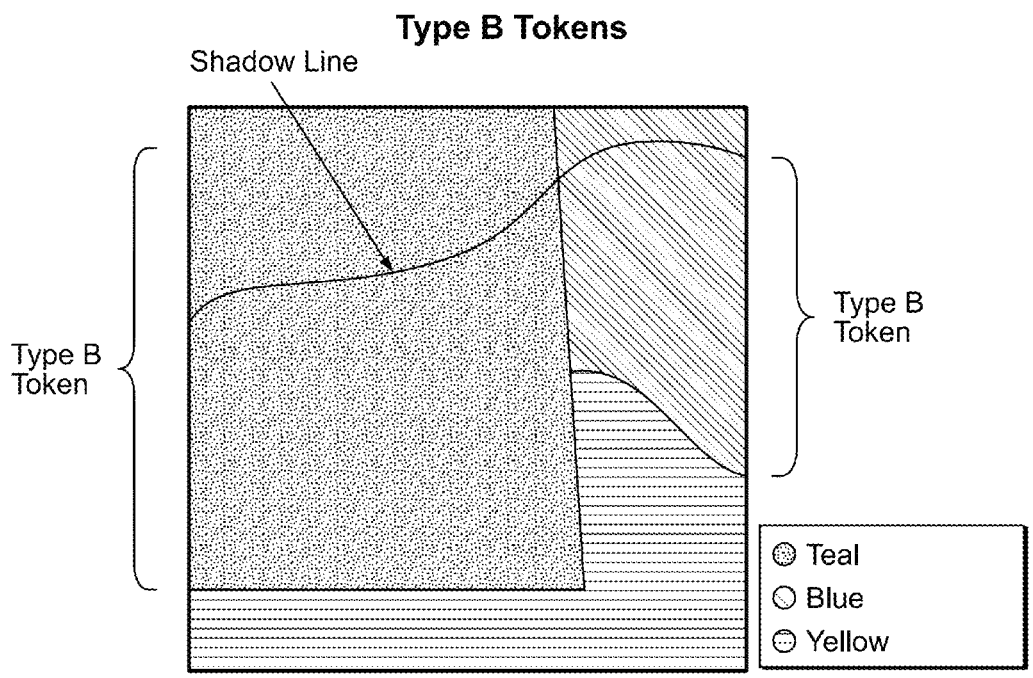
FIG. 6d shows Type B tokens, generated from the Type C tokens of FIG. 6c, according to a feature of the present invention.
Figure 7:
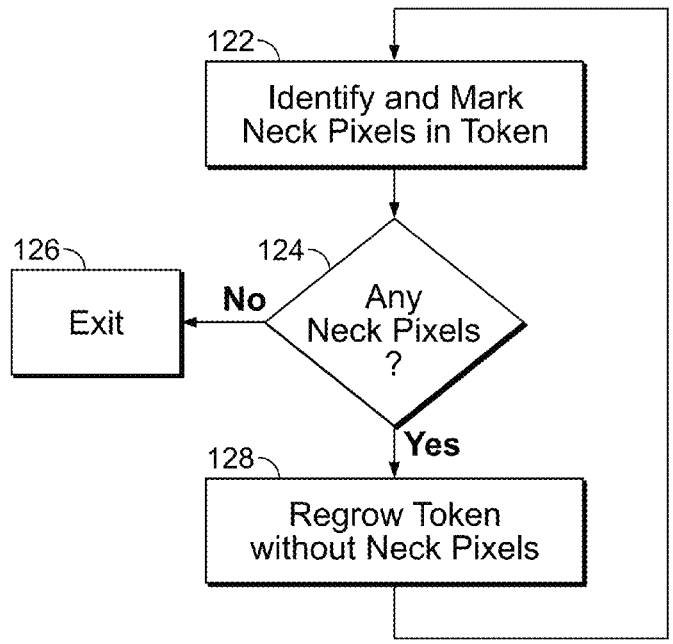
FIG. 7 is a flow chart for a routine to test Type C tokens identified by the routine of the flow chart of FIG. 6a, according to a feature of the present invention.

FIG. 7 shows a flow chart for a neck test for Type C tokens. In step 122, the CPU 12 examines each pixel of an identified token to determine whether any of the pixels under examination forms a neck. The routine of FIG. 6 can be executed as a subroutine directly after a particular token is identified during execution of the routine of FIG. 6a. All pixels identified as a neck are marked as "ungrowable." In decision block 124, the CPU 12 determines if any of the pixels were marked.

If no, the CPU 12 exits the routine of FIG. 7 and returns to the routine of FIG. 6a (step 126).

If yes, the CPU 12 proceeds to step 128 and operates to regrow the token from a seed location selected from among the unmarked pixels of the current token, as per the routine of FIG. 6a, without changing the counts for seed size and region ID. During the regrowth process, the CPU 12 does not include any pixel previously marked as ungrowable. After the token is regrown, the previously marked pixels are unmarked so that other tokens may grow into them.

Subsequent to the regrowth of the token without the previously marked pixels, the CPU 12 returns to step 122 to test the newly regrown token.

Neck testing identifies Type C tokens that cross material boundaries, and regrows the identified tokens to provide single material Type C tokens suitable for use in creating Type B tokens. FIG. 6d shows Type B tokens generated from the Type C tokens of FIG. 6c, according to a feature of the present invention. The present invention provides several exemplary techniques of pixel characteristic analysis for constructing Type B tokens from Type C tokens. One exemplary technique involves arbitrary boundary removal. The arbitrary boundary removal technique can be applied to Type C tokens whether they were generated using N color band values (RGB in our example) of the pixel or the filter output representation of the pixel, in the event the image was filtered. Actual boundaries of any particular Type C token will be a function of the seed location used to generate the token, and are thus, to some extent arbitrary. There are typically many potential seed locations for each particular token, with each potential seed location generating a token with slightly different boundaries and spatial extent because of differences among the color values of the pixels of the various seeds, within the noise ranges of the recording equipment.

Figure 8:
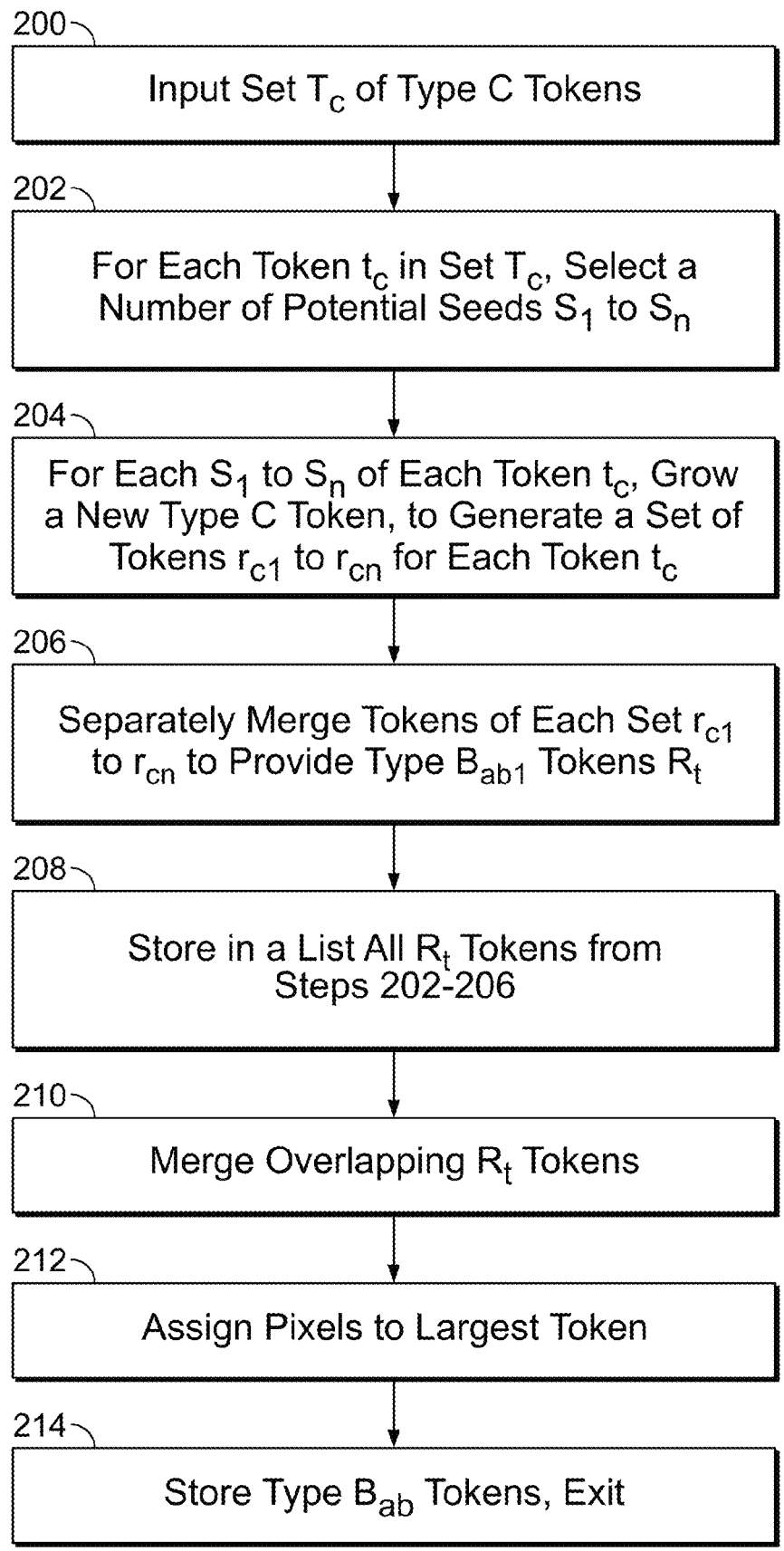
FIG. 8 is a flow chart for constructing Type B tokens via an arbitrary boundary removal technique, according to a feature of the present invention.

FIG. 8 is a flow chart for constructing Type B tokens via an arbitrary boundary removal technique, according to a feature of the present invention. In step 200, the CPU 12 is provided with a set ($T_c$) of Type C tokens generated with a seed size (S) via the routine of FIG. 6a, with neck removal via the routine of FIG. 7. The seed size $S=S_{max}$, for example, S=4 pixels. In step 202, for each Type C token, $t_c$ in the set $T_c$ the CPU 12 selects a number (for example 50) of potential seeds $s_1$ to $s_n$. In our example, each selected seed will be a 4×4 pixel array from within the token region, the pixels of the array being of approximately equal values (within the noise levels of the recording device).

In step 204, the CPU 12 grows a new Type C token, utilizing the routines of FIGS. 6a and 7, from each seed location, $s_1$ to $s_n$ of each token $t_c$ in the set $T_c$. The newly grown tokens for each token $t_c$ are designated as tokens $r_{c1}$ to $r_{cn}$. The newly grown tokens $r_{c1}$ to $r_{cn}$ for each token $t_c$ generally overlap the original Type C token $t_c$, as well as one another.

In step 206, the CPU 12 operates to merge the newly generated tokens $r_{c1}$ to $r_{cn}$ of each token $t_c$, respectively. The result is a new token $R_t$ corresponding to each original token $t_c$ in the set $T_c$. Each new token $R_t$ encompasses all of the regions of the respective overlapping tokens $r_{c1}$ to $r_{cn}$ generated from the corresponding original token $t_c$. The unions of the regions comprising the respective merged new tokens $R_t$ are each a more extensive token than the original Type C tokens of the set. The resulting merged new tokens $R_t$ result in regions of the image file 18, each of a much broader range of variation between the pixels of the respective token $R_t$ than the original Type C token, yet the range of variation among the constituent pixels will still be relatively smooth. $R_t$ is defined as a limited form of Type B token, Type $B_{ab1}$, to indicate a token generated by the first stage (steps 200-206) of the arbitrary boundary removal technique according to a feature of the present invention.

In step 208, the CPU 12 stores each of the Type $B_{ab1}$ tokens generated in steps 202-206 from the set of tokens $T_c$, and proceeds to step 210. Type $B_{ab1}$ tokens generated via execution of steps 202-206 may overlap significantly. In step 210, the CPU 12 operates to merge the $R_t$ tokens stored in step 208 that overlap each other by a certain percentage of their respective sizes. For example, a 30% overlap is generally sufficient to provide few, if any, false positive merges that combine regions containing different materials. The new set of merged tokens still may have overlapping tokens, for example, previously overlapping tokens that had a less than 30% overlap. After all merges are complete, the CPU 12 proceeds to step 212.

In step 212, the CPU 12 identifies all pixels that are in more than one token (that is in an overlapping portion of two or more tokens). Each identified pixel is assigned to the token occupying the largest region of the image. Thus, all overlapping tokens are modified to eliminate all overlaps.

In step 214, the CPU 12 (as the Type C tokenization block 35 or the operators block 28) stores the final set of merged and modified tokens, now designated as Type $B_{ab2}$ tokens, and then exits the routine. As noted above, the Type $B_{ab2}$ tokens were generated from Type C tokens whether the Type C tokens were generated using N color band values (RGB in our example) of the pixel or the filter output representation of the pixel, in the event the image was filtered.

Figure 9:
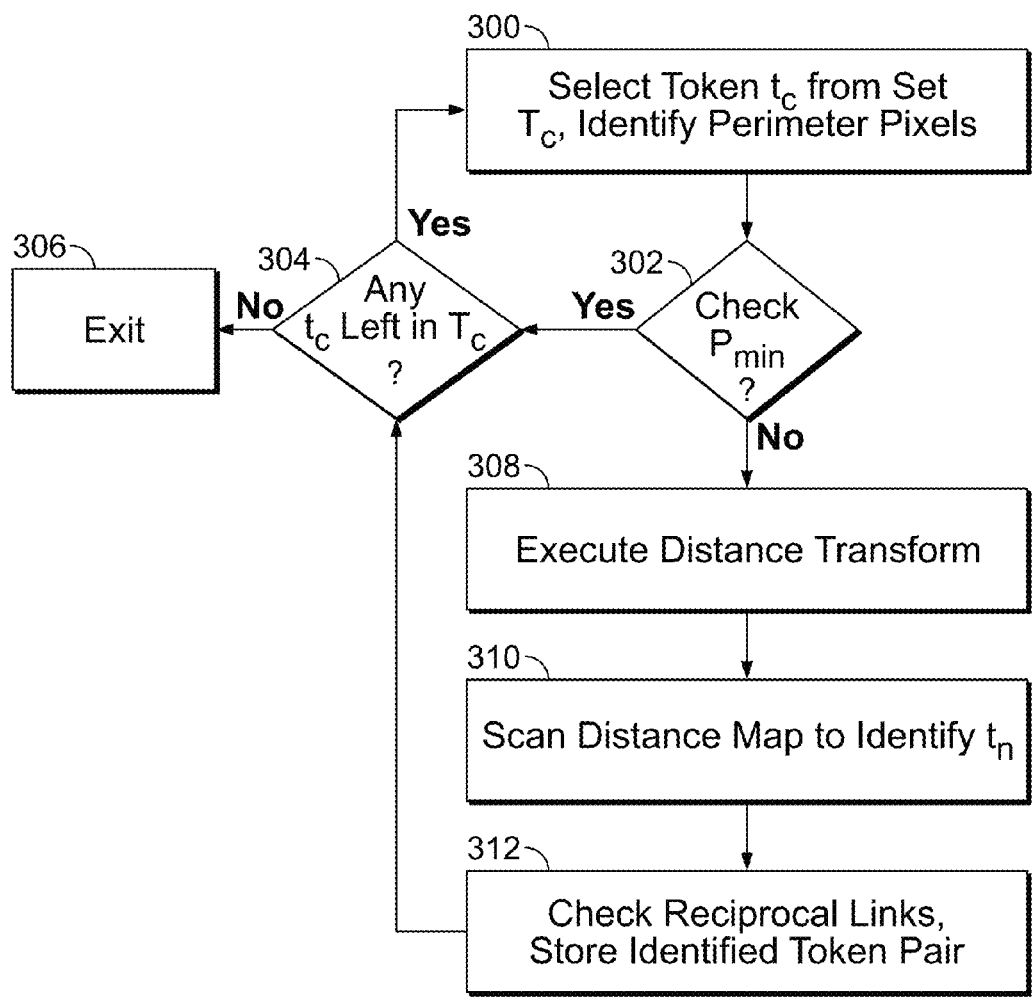
FIG. 9 is a flow chart for creating a token graph, containing token map information, according to a feature of the present invention.

A second exemplary technique according to the present invention, for using Type C tokens to create Type B tokens, is adjacent planar token merging. The adjacent planar token merging can be implemented when an image depicts areas of uniform color, that is for non-textured regions of an image. Initially, a token graph is used to identify tokens that are near to one another. FIG. 9 shows a flow chart for creating a token graph, containing token map information, according to a feature of the present invention. Each token $t_c$ in the set of Type C tokens $T_c$, generated through execution of the routines of FIGS. 6a and 7, is evaluated in terms of a maximum distance $D_{max}$ between tokens defining a neighboring pair of tokens, $t_c$, $t_n$, of the set $T_c$, a minimum number of token perimeter pixels, $P_{min}$, in each token of the neighboring pair of tokens, and a minimum fraction of perimeter pixels, $F_{min}$, of each token of a neighboring pair of tokens, required to be within $D_{max}$.

In step 300, the CPU 12 selects a Type C token $t_c$ in the set of Type C tokens $T_c$, and identifies the pixels of the selected token $t_c$ forming the perimeter of the token. In a decision block 302, the CPU 12 determines whether the number of perimeter pixels is less than $P_{min}$, for example 10 pixels.

If yes, the CPU 12 proceeds to decision block 304 to determine whether there are any remaining tokens $t_c$ in the set of Type C tokens $T_c$. If yes, the CPU 12 returns to step 300, if no, the CPU 12 exits the routine 306.

If no, the CPU 12 proceeds to step 308. In step 308, the CPU 12 generates a bounding box used as a mask to surround the selected token $t_c$. The bounding box is dimensioned to be at least $D_{max}$ larger than the selected token $t_c$ in all directions. A known distance transform (for example, as described in P. Felzenszwalb and D. Huttenlocher, Distance Transforms of Sampled Functions, Cornell Computing and Information Science Technical Report TR2004-1963, September 2004), is executed to find the distance from each perimeter pixel of the selected token $t_c$ to all the pixels in the surrounding bounding box. The output of the distance transform comprises two maps, each of the same size as the bounding box, a distance map and a closest pixel map. The distance map includes the Euclidean distance from each pixel of the bounding box to the nearest perimeter pixel of the selected token $t_c$. The closest pixel map identifies, for each pixel in the distance map, which perimeter pixel is the closest to it.

In step 310, the CPU 12 scans the distance map generated in step 308 to identify tokens corresponding to pixels of the bounding box (from the region map generated via the routine of FIG. 6a), to identify a token from among all tokens represented by pixels in the bounding box, that has a number $N_{cn}$ of pixels within the distance $D_{max}$, wherein $N_{cn}$ is greater than $P_{min}$, and greater than $F_{min}$*perimeter pixels of the respective token and the average distance between the respective token and $t_c$ is the lowest of the tokens corresponding to the pixels in the bounding box. If these conditions are satisfied, the respective token is designated $t_n$ of a possible token pair $t_c$, $t_n$, and a link $L_{cn}$ is marked active.

In step 312, the CPU 12 checks to determine whether a reciprocal link $L_{cn}$ is also marked active, and when it is marked active, the CPU 12 marks and stores in the token graph, an indication that the token pair $t_c$, $t_n$ is a neighboring token pair. The reciprocal link refers to the link status in the evaluation of the token designated as $t_n$ in the current evaluation. If that token has yet to be evaluated, the pair is not designated as a neighboring token pair until the link $L_{cn}$ is verified as active in the subsequent evaluation of the token $t_n$. The CPU 12 then returns to decision block 304 to determine whether there are any further tokens in the set $T_c$.

Figure 10:
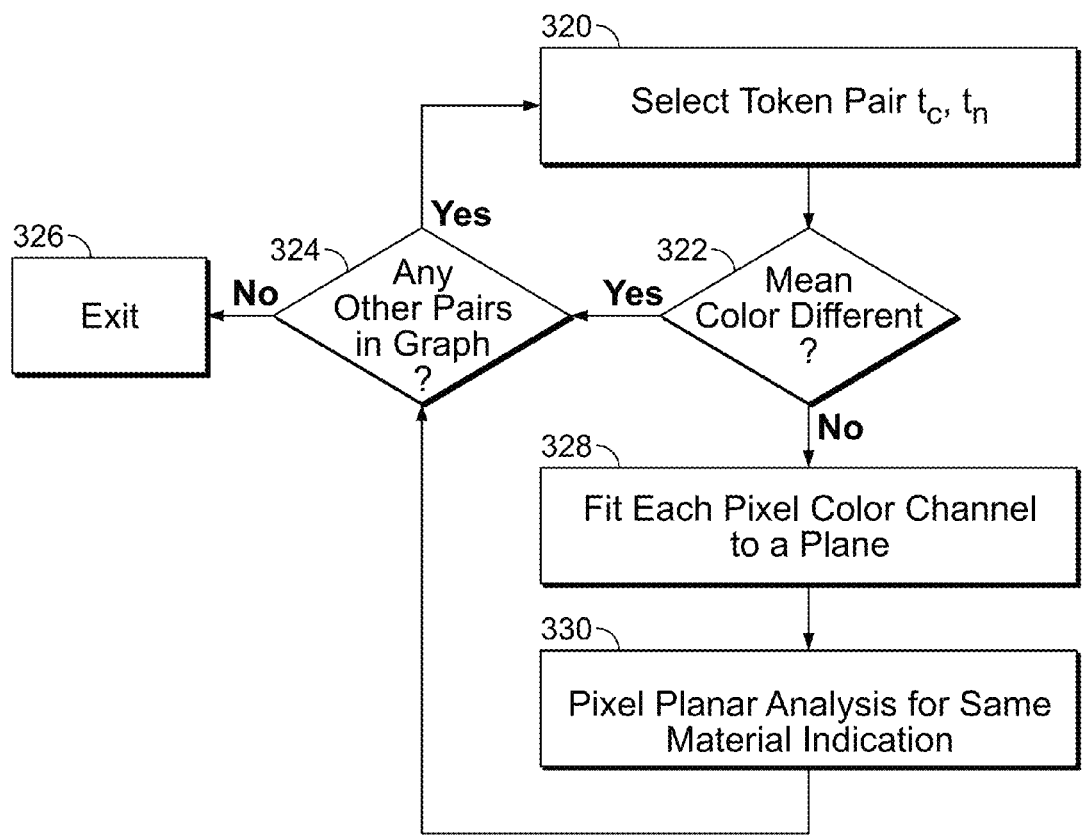
FIG. 10 is a flow chart for constructing Type B tokens via an adjacent planar token merging technique, according to a feature of the present invention.

Upon completion of the token graph, the CPU 12 utilizes token pair information stored in the graph in the execution of the routine of FIG. 10. FIG. 10 shows a flow chart for constructing Type B tokens via the adjacent planar token merging technique, according to a feature of the present invention. In the adjacent planer merging technique, pairs of tokens are examined to determine whether there is a smooth and coherent change in color values, in a two dimensional measure, between the tokens of the pair. The color change is examined in terms of a planar representation of each channel of the color, for example the RGB components of the pixels according to the exemplary embodiments of the present invention. A smooth change is defined as the condition when a set of planes (one plane per color component) is a good fit for the pixel values of two neighboring tokens. In summary, neighboring tokens are considered the same material and a Type B token when the color change in a two-dimensional sense is approximately planar.

In step 320, the CPU 12 selects a token pair $t_c$, $t_n$ from the token graph. In decision block 322, the CPU 12 determines whether the mean color in token $t_c$ is significantly different from the mean color in the token $t_c$. The difference can be a function of a z-score, a known statistical measurement (see, for example, Abdi, H. (2007), Z-scores, in N. J. Salkind (Ed.), Encyclopedia of Measurement and Statistics, Thousand Oaks, Calif.: Sage), for example, a z-score greater than 3.0.

If the mean colors of the token pair are different, the CPU 12 proceeds to decision block 324 to determine whether there are any additional token pairs in the token graph. If yes, the CPU 12 returns to step 320. If no, the CPU 12 exits the routine (step 326).

If the mean colors are within the z-score parameter, the CPU 12 proceeds to step 328. In step 328, the CPU 12 performs a mathematical operation such as, for example, a least median of squares regression (see, for example, Peter J. Rousseeuw, Least Median of Squares Regression, Journal of the American Statistical Association, Vol. 79, No. 388 (December 1984), pp. 871-880) to fit a plane to each color channel of the pixels (in our example RGB) of the token pair $t_c$, $t_n$, as a function of row n and column m (see FIG. 2), the planes being defined by the equations:

$$R = X_{Rn} + Y_{Rm} + Z_R \ G = X_{Gn} + Y_{Gm} Z_G \ B = X_{Bn} + Y_{Bm} + Z_B$$

wherein parameter values X, Y and C are determined by the least median of squares regression operation of the CPU 12.

Upon completion of the plane fitting operation, the CPU 12 proceeds to step 330. In step 330, the CPU 12 examines each pixel of each of the tokens of the token pair $t_c$, $t_n$ to calculate the z-score between each pixel of the tokens and the planar fit expressed by the equation of the least median of squares regression operation. When at least a threshold percentage of the pixels of each token of the pair (for example, 80%), are within a maximum z-score (for example, 0.75), then the neighboring token pair is marked in the token graph as indicating the same material in the image. After completion of step 330, the CPU 12 returns to decision block 324.

Upon exiting the routine of FIG. 10, the CPU 12 examines the token graph for all token pairs indicating the same material. The CPU 12 can achieve the examination through performance of a known technique such as, for example, a union find algorithm. (See, for example, Zvi Galil and Giuseppe F. Italiano. Data structures and algorithms for disjoint set union problems, ACM Computing Surveys, Volume 23, Issue 3 (September 1991), pages 319-344). As a simple example, assume a set of seven Type C tokens $T_1, T_2, T_3, T_4, T_5, T_6, T_7$. Assume that the result of the execution of FIG. 9, (performance of the adjacent planar analysis), indicates that tokens $T_1$ and $T_2$ are marked as the same material, and tokens $T_1$ and $T_3$ are also marked as the same material. Moreover, the results further indicate that tokens $T_4$ and $T_5$ are marked as the same material, and tokens $T_5$ and $T_6$ are also marked as the same material. The result of execution of the union find algorithm would therefore indicate that tokens $\{T_1, T_2, T_3\}$ form a first group within the image consisting of a single material, tokens $\{T_4, T_5, T_6\}$ form a second group within the image consisting of a single material, and token $\{T_7\}$ forms a third group within the image consisting of a single material. The groups $\{T_1, T_2, T_3\}$, $\{T_4, T_5, T_6\}$ and $\{T_7\}$ form three Type B tokens.

Figure 11:
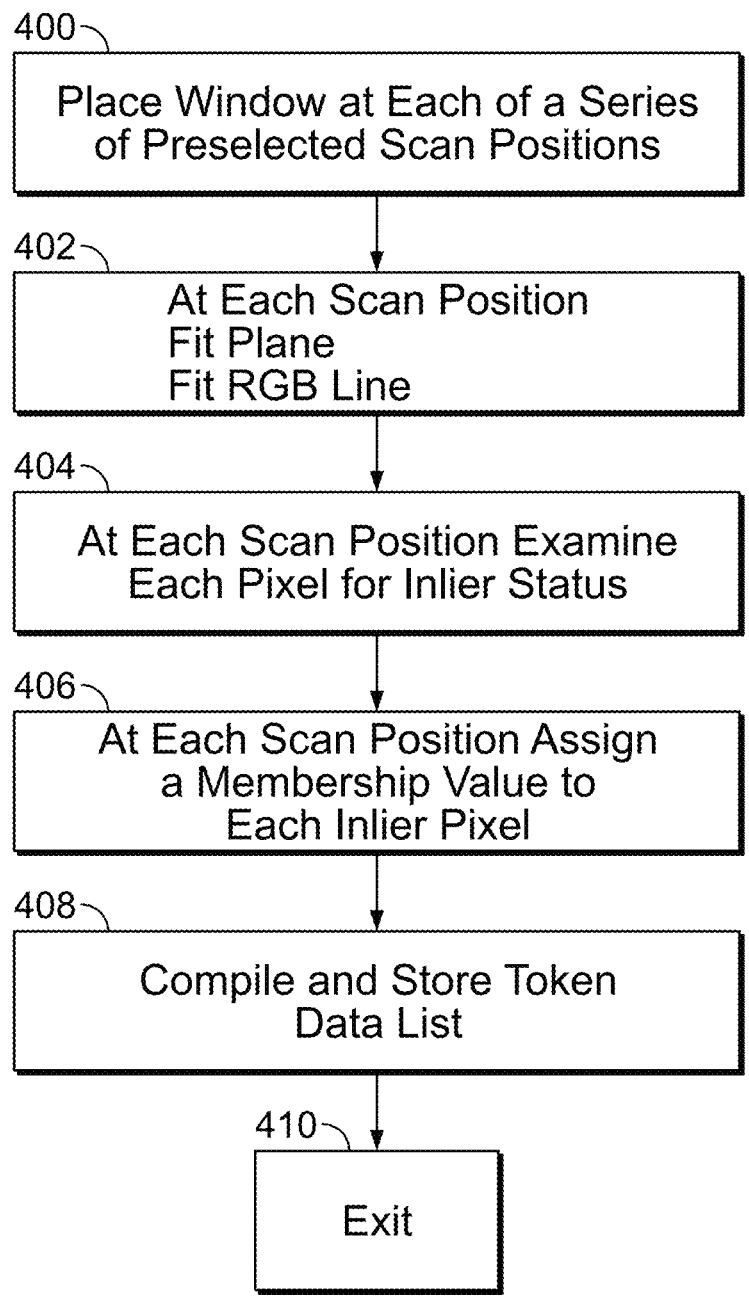
FIG. 11 is a flow chart for generating Type C tokens via a local token analysis technique, according to a feature of the present invention.

A third exemplary technique according to the present invention, for using Type C tokens to create Type B tokens, is a local token analysis. A local token approach generates Type C tokens using a window analysis of a scene depicted in an image file 18. Such tokens are designated as Type $C_w$ tokens. FIG. 11 is a flow chart for generating Type $C_w$ tokens via the local token analysis technique, according to a feature of the present invention.

In step 400, the CPU 12 places a window of fixed size, for example, a 33×33 pixel array mask, over a preselected series of scan positions over the image. The window can be a shape other than a square. The scan positions are offset from one another by a fixed amount, for example ½ window size, and are arranged, in total, to fully cover the image. The window area of pixels at each scan position generates a Type $C_w$ token, though not every pixel within the window at the respective scan position is in the Type $C_w$ token generated at the respective scan position.

At each scan position (step 402), the CPU 12 operates, as a function of the pixels within the window, to fit each of a set of planes, one corresponding to the intensity of each color channel (for example, RGB), and an RGB line in RGB space, characterized by a start point $I_0$ and an end point $I_1$ of the colors within the window. The planar fit provides a spatial representation of the pixel intensity within the window, and the line fit provides a spectral representation of the pixels within the window.

For the planar fit, the planes are defined by the equations:

$$R = X_{Rn} + Y_{Rm} + Z_R \ G = X_{Gn} + Y_{Gm} + Z_G \ B = X_{Bn} + Y_{Bm} + Z_B$$

wherein parameter values X, Y and C are determined by CPU 12 by executing a mathematical operation such as the least median of squares regression discussed above, a least-squares estimator, such as singular value decomposition, or a robust estimator such as RANSAC (see, for example, M. A. Fischler, R. C. Bolles. Random Sample Consensus: A Paradigm for Model Fitting with Applications to Image Analysis and Automated Cartography. Comm. of the ACM, Vol 24, pp 381-395, 1981).

For the RGB line fit, the line is defined by: $I(r,g,b) = I_0(r,g,b) + t(I_1(r,g,b) - I_0(r,g,b))$ wherein the parameter t has a value between 0 and 1, and can be determined by the CPU 12 utilizing any of the mathematical techniques used to find the planar fit.

At each scan position, after completion of step 402, the CPU 12 operates in step 404 to examine each pixel in the window in respect of each of the planar fit representation and RGB line representation corresponding to the respective window scan position. For each pixel, the CPU 12 determines an error factor for the pixel relative to each of the established planes and RGB line. The error factor is related to the absolute distance of the pixel to its projection on either from either the planar fit or the RGB line fit. The error factor can be a function of the noise present in the recording equipment or be a percentage of the maximum RGB value within the window, for example 1%. Any pixel distance within the error factor relative to either the spatial planar fit or the spectral line fit is labeled an inlier for the Type $C_w$ token being generated at the respective scan position. The CPU 12 also records for the Type $C_w$ token being generated at the respective scan position, a list of all inlier pixels.

At each scan position, after completion of step 404, the CPU 12 operates in step 406 to assign a membership value to each inlier pixel in the window. The membership value can be based upon the distance of the inlier pixel from either the planar fit or the RGB line fit. In one exemplary embodiment of the present invention, the membership value is the inverse of the distance used to determine inlier status for the pixel. In a second exemplary embodiment, a zero-centered Gaussian distribution with a standard deviation is executed to calculate membership values for the inlier pixels.

After all of the scan positions are processed to generate the Type $C_w$ tokens, one per scan position, the CPU 12 operates to compile and store a token data list (step 408). The token data list contains two lists. A first list lists all of the pixels in the image file 18, and for each pixel, an indication of each Type $C_w$ token to which it labeled as an inlier pixel, and the corresponding membership value. A second list lists all of the generated Type $C_w$ tokens, and for each token an indication of the inlier pixels of the respective token, and the corresponding membership value. After compiling and storing the token data list, the CPU 12 exits the routine (step 410).

Figure 12:
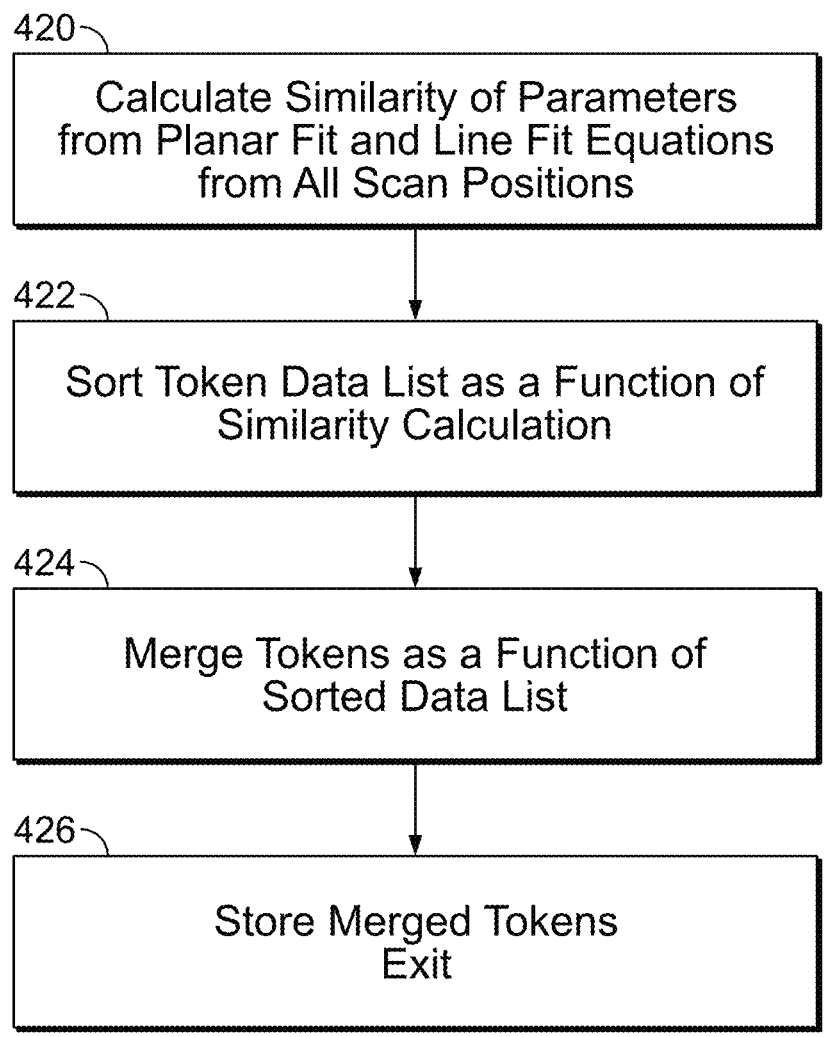
FIG. 12 is a flow chart for constructing Type B tokens from Type C tokens generated via the local token analysis technique of FIG. 11, according to a feature of the present invention.

FIG. 12 is a flow chart for constructing Type B tokens from the Type $C_w$ tokens generated via the local token analysis technique, according to a feature of the present invention. In step 420, the CPU 12 calculates a similarity of parameters of the spatial planer dimensions and spectral RGB lines of adjacent or overlapping Type $C_w$ tokens generated through execution of the routine of FIG. 108. Overlapping and adjacent Type $C_w$ tokens can be defined as tokens corresponding to scan positions that overlap or are contiguous. A similarity threshold can be set as a percentage of difference between each of the spatial planer dimensions and spectral RGB lines of two overlapping or adjacent Type $C_w$ tokens being compared. The percentage can be a function of the noise of, for example, the camera 14 used to record the scene of the image file 18. All overlapping or adjacent Type $C_w$ token pairs having a calculated similarity within the similarity threshold are placed on a list.

In step 422, the CPU 12 sorts the list of overlapping or adjacent Type $C_w$ token pairs having a calculated similarity within the similarity threshold, in the order of most similar to least similar pairs. In step 424, the CPU 12 merges similar token pairs, in the order of the sort, and labeling pairs as per degree of similarity. Each merged token pair will be considered a $Type_B$ token. In step 426, the CPU 12 stores the list of $Type_B$ tokens, and exits the routine.

A fourth exemplary technique according to the present invention, for creating Type B tokens, is a technique using log chromaticity clustering. for constructing Type B tokens for an image file 18. Log chromaticity is a technique for developing an illumination invariant chromaticity space. As noted above, a method and system for separating illumination and reflectance using a log chromaticity representation is disclosed in U.S. Pat. No. 7,596,266. The techniques taught in U.S. Pat. No. 7,596,266 can be used to provide illumination invariant log chromaticity representation values for each color of an image, for example, as represented by Type C tokens. Logarithmic values of the color band values of the image pixels are plotted on a log-color space graph. The logarithmic values are then projected to a log-chromaticity projection plane oriented as a function of the bi-illuminant dichromatic reflection model (a BIDR normal), to provide a log chromaticity value for each pixel.

Figure 13:
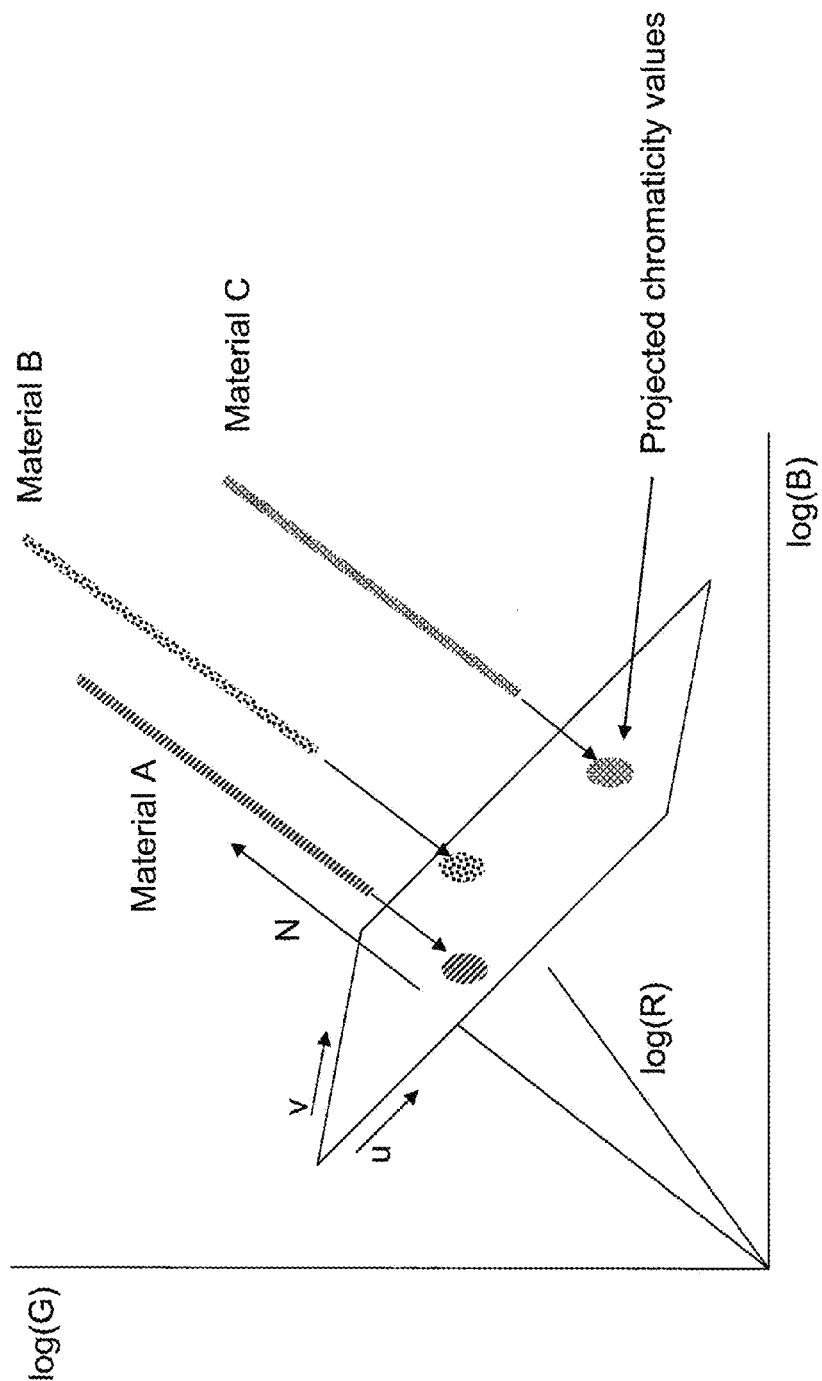
FIG. 13 is a graphic representation of a log color space chromaticity plane according to a feature of the present invention.

FIG. 13 is a graphic representation of a log color space, bi-illuminant chromaticity plane according to a feature of the invention disclosed in U.S. Pat. No. 7,596,266. The alignment of the chromaticity plane is determined by a vector N, normal to the chromaticity plane, and defined as N= $\log(\text{Bright}_{vector})-\log(\text{Dark}_{vector})=\log(1+1/S_{vector})$. The co-ordinates of the plane, u, v can be defined by a projection of the green axis onto the chromaticity plane as the u axis, and the cross product of u and N being defined as the v axis. In our example, each log value for the materials A, B, C is projected onto the chromaticity plane, and will therefore have a corresponding u, v co-ordinate value in the plane that is a chromaticity value, as shown in FIG. 5.

Thus, according to the technique disclosed in U.S. Pat. No. 7,596,266, the RGB values of each pixel in an image file 18 can be mapped by the CPU 12 from the image file value p(n, m, R, G, B) to a log value, then, through a projection to the chromaticity plane, to the corresponding u, v value, as shown in FIG. 13. Each pixel p(n, m, R, G, B) in the image file 18 is then replaced by the CPU 12 by a two dimensional chromaticity value: p(n, m, u, v), to provide a chromaticity representation of the original RGB image. In general, for an N band image, the N color values are replaced by N−1 chromaticity values. The chromaticity representation is a truly accurate illumination invariant representation because the BIDR model upon which the representation is based, accurately and correctly represents the illumination flux that caused the original image.

According to a feature of the present invention, log chromaticity values are calculated for each color depicted in an image file 18 input to the CPU 12 for identification of regions of the uniform reflectance (Type B tokens). For example, each pixel of a Type C token will be of approximately the same color value, for example, in terms of RGB values, as all the other constituent pixels of the same Type C token, within the noise level of the equipment used to record the image. Thus, an average of the color values for the constituent pixels of each particular Type C token can be used to represent the color value for the respective Type C token in the log chromaticity analysis.

Figure 14:
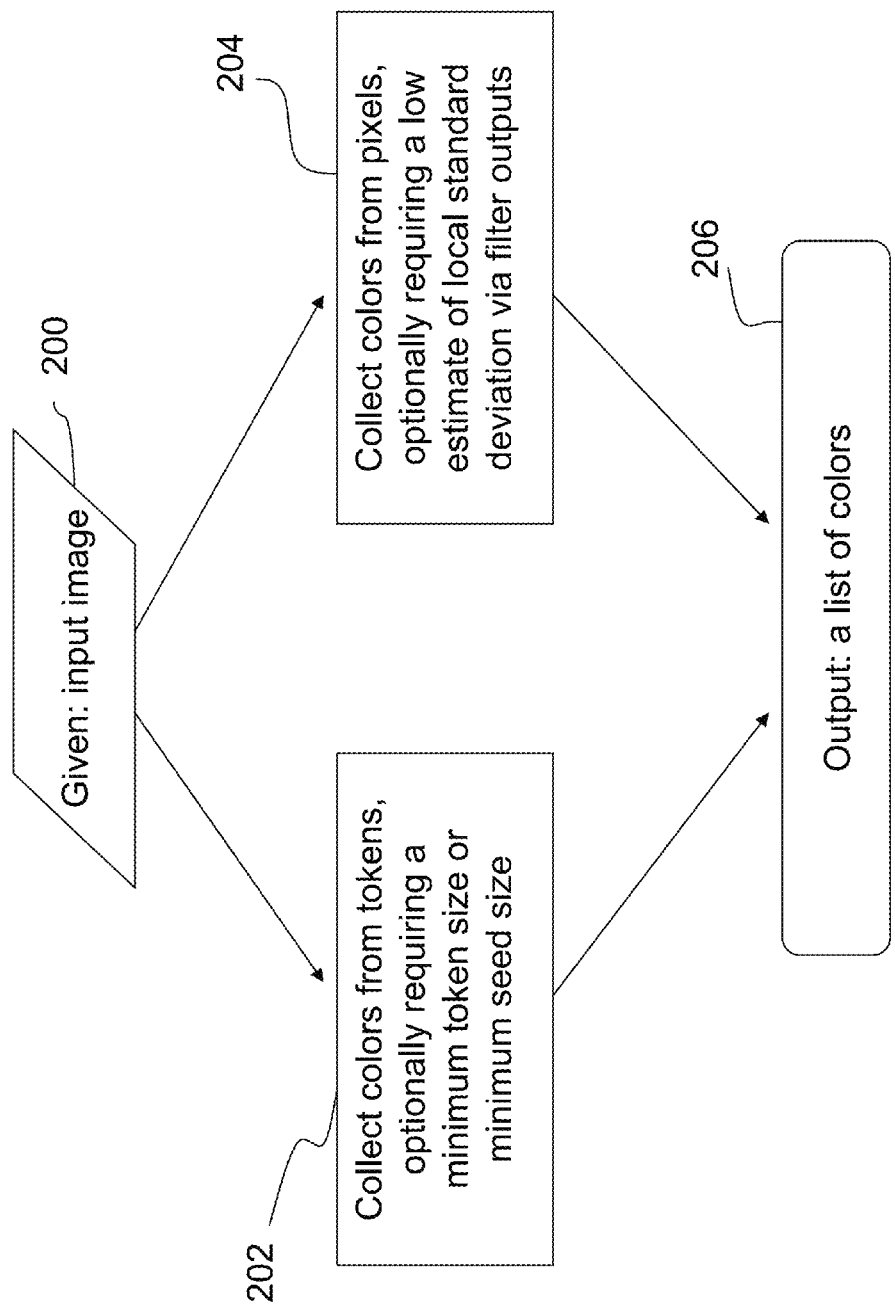
FIG. 14 is a flow chart for determining a list of colors depicted in an input image.

FIG. 14 is a flow chart for determining a list of colors depicted in an input image, for example, an image file 18. In step 500, an input image file 18 is input to the CPU 12 for processing. In steps 502 and 504, the CPU 12 determines the colors depicted in the input image file 18. In step 502, the CPU 12 calculates an average color for each Type C token determined by the CPU 12 through execution of the routine of FIG. 6*a*, as described above, for a list of colors. The CPU 12 can be operated to optionally require a minimum token size, in terms of the number of constituent pixels of the token, or a minimum seed size (the N×N array) used to determine Type C tokens according to the routine of FIG. 6*a*, for the analysis. The minimum size requirements are implemented to assure that color measurements in the list of colors for the image are an accurate depiction of color in a scene depicted in the input image, and not an artifact of blend pixels.

Blend pixels are pixels between two differently colored regions of an image, as noted above. If the colors between the two regions are plotted in RGB space, there is a linear transition between the colors, with each blend pixel, moving from one region to the next, being a weighted average of the colors of the two regions. Thus, each blend pixel does not represent a true color of the image. The CPU 12 can eliminate tokens consisting of blend pixel from the analysis via the blend pixel image created in step 1018 of FIG. 3c.

In step 504, the CPU 12 can alternatively collect colors at the pixel level, that is, the RGB values of the pixels of the input image file 18, as shown in FIG. 2. The CPU 12 can be operated to optionally require each pixel of the image file 18 used in the analysis to have a minimum stability or local standard deviation via a filter output, for a more accurate list of colors. For example, second derivative energy can be used to indicate the stability of pixels of an image.

In this approach, the CPU 12 calculates a second derivative at each pixel, or a subset of pixels disbursed across the image to cover all illumination conditions of the image depicted in an input image file 18, using a Difference of Gaussians, Laplacian of Gaussian, or similar filter. The second derivative energy for each pixel examined can then be calculated by the CPU 12 as the average of the absolute value of the second derivative in each color band (or the absolute value of the single value in a grayscale image), the sum of squares of the values of the second derivatives in each color band (or the square of the single value in a grayscale image), the maximum squared second derivative value across the color bands (or the square of the single value in a grayscale image), or any similar method. Upon the calculation of the second derivative energy for each of the pixels, the CPU 12 analyzes the energy values of the pixels. There is an inverse relationship between second derivative energy and pixel stability, the higher the energy, the less stable the corresponding pixel.

In step 506, the CPU 12 outputs a list or lists of color (after executing one or both of steps 502 and/or 504). According to a feature of the present invention, all of the further processing can be executed using the list from either step 502 or 504, or vary the list used (one or the other of the lists from steps 502 or 504) at each subsequent step.

Figure 15:
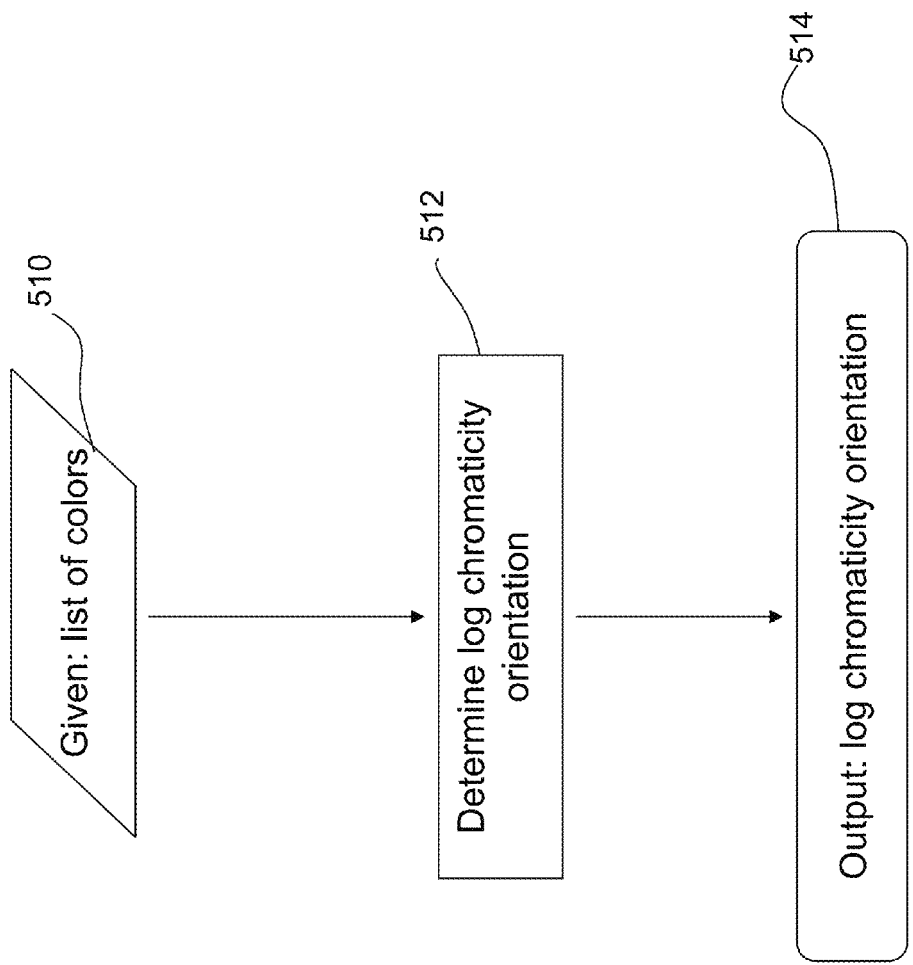
FIG. 15 is a flow chart for determining an orientation for a log chromaticity space, according to a feature of the present invention.

FIG. 15 is a flow chart for determining an orientation for a log chromaticity representation, according to a feature of the present invention. For example, the CPU 12 determines an orientation for the normal N, for a log chromaticity plane, as shown in FIG. 5. In step 210, the CPU 12 receives a list of colors for an input file 18, such as a list output in step 506 of the routine of FIG. 14. In step 512, the CPU 12 determines an orientation for a log chromaticity space.

As taught in U.S. Pat. No. 7,596,266, and as noted above, alignment of the chromaticity plane is represented by N, N being a vector normal to the chromaticity representation, for example, the chromaticity plane of FIG. 13. The orientation is estimated by the CPU 12 thorough execution of any one of several techniques. For example, the CPU 12 can determine estimates based upon entropy minimization, manual selection by a user or the use of a characteristic spectral ratio for an image of an input image file 18, as fully disclosed in U.S. Pat. No. 7,596,266.

For a higher dimensional set of colors, for example, an RYGB space (red, yellow, green, blue), the log chromaticity normal, N, defines a sub-space with one less dimension than the input space. Thus, in the four dimensional RYGB space, the normal N defines a three dimensional log chromaticity space. When the four dimensional RYGB values are projected into the three dimensional log chromaticity space, the projected values within the log chromaticity space are unaffected by illumination variation.

In step 514, the CPU 12 outputs an orientation for the normal N. As illustrated in the example of FIG. 13, the normal N defines an orientation for a u, v plane in a three dimensional RGB space.

Figure 16:
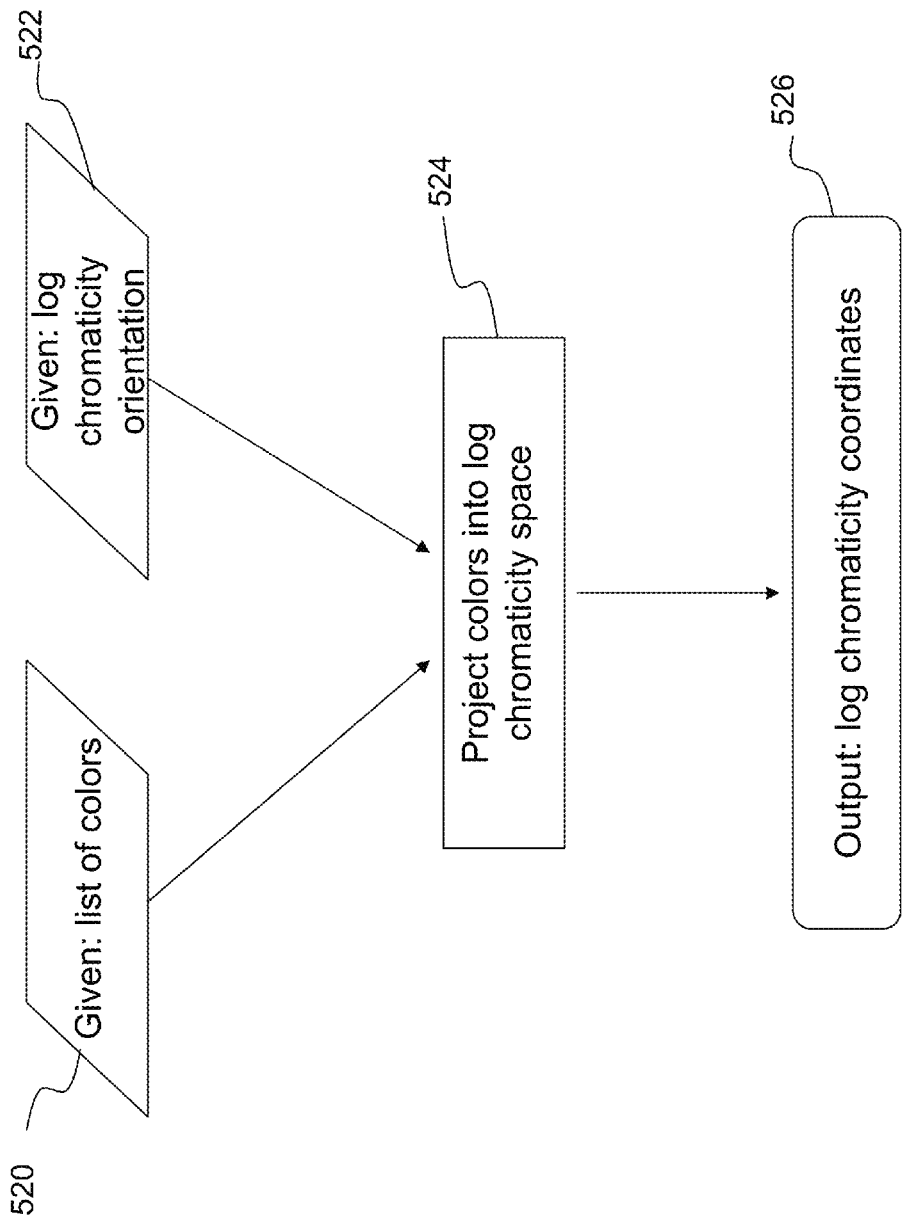
FIG. 16 is a flow chart for determining log chromaticity coordinates for the colors of an input image, as determined through execution of the routine of FIG. 14, according to a feature of the present invention.

FIG. 16 is a flow chart for determining log chromaticity coordinates for the colors of an input image, as identified in steps 502 or 504 of the routine of FIG. 14, according to a feature of the present invention. In step 520, a list of colors is input to the CPU 12. The list of colors can comprise either the list generated through execution of step 502 of the routine of FIG. 14, or the list generated through execution of step 504. In step 522, the log chromaticity orientation for the normal, N, determined through execution of the routine of FIG. 15, is also input to the CPU 12.

In step 524, the CPU 12 operates to calculate a log value for each color in the list of colors and plots the log values in a three dimensional log space at respective (log R, log G, log B) coordinates, as illustrated in FIG. 13. Materials A, B and C denote log values for specific colors from the list of colors input to the CPU 12 in step 520. A log chromaticity plane is also calculated by the CPU 12, in the three dimensional log space, with u, v coordinates and an orientation set by N, input to the CPU 12 in step 522. Each u, v coordinate in the log chromaticity plane can also be designated by a corresponding (log R, log G, log B) coordinate in the three dimensional log space.

According to a feature of the present invention, the CPU 12 then projects the log values for the colors A, B and C onto the log chromaticity plane to determine a u, v log chromaticity coordinate for each color. Each u, v log chromaticity coordinate can be expressed by the corresponding (log R, log G, log B) coordinate in the three dimensional log space. The CPU 12 outputs a list of the log chromaticity coordinates in step 526. The list cross-references each color to a u, v log chromaticity coordinate and to the pixels (or a Type C tokens) having the respective color (depending upon the list of colors used in the analysis (either step 502 (tokens) or 504 (pixels))).

Figure 17:
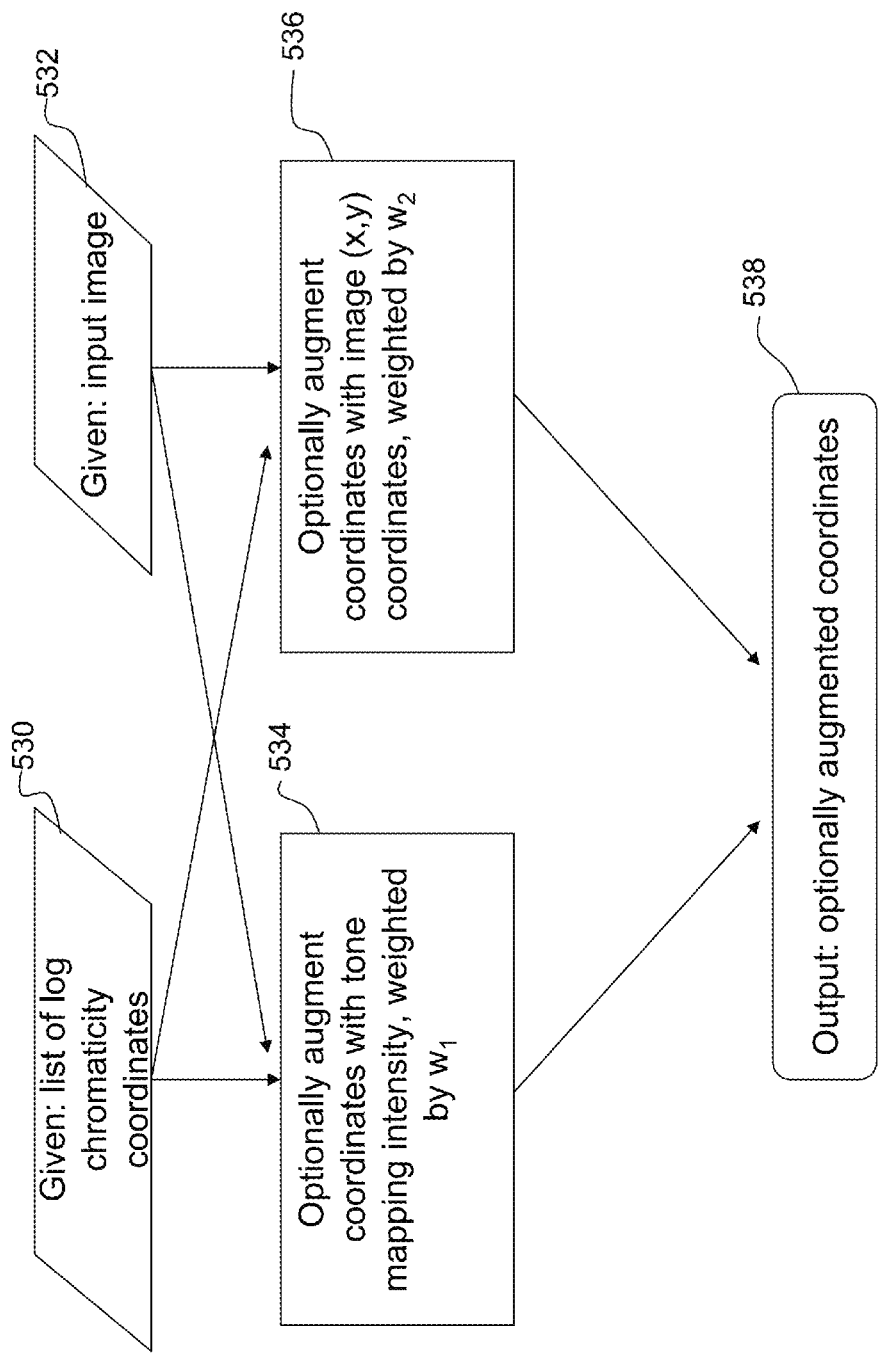
FIG. 17 is a flow chart for augmenting the log chromaticity coordinates, as determined through execution of the routine of FIG. 16, according to a feature of the present invention.

FIG. 17 is a flow chart for optionally augmenting the log chromaticity coordinates for pixels or Type C tokens with extra dimensions, according to a feature of the present invention. In step 530, the list of log chromaticity coordinates, determined for the colors of the input image through execution of the routine of FIG. 16, is input to the CPU 12. In step 532, the CPU 12 accesses the input image file 18, for use in the augmentation.

In step 534, the CPU 12 optionally operates to augment each log chromaticity coordinate with a tone mapping intensity for each corresponding pixel (or Type C token). The tone mapping intensity is determined using any known tone mapping technique. An augmentation with tone mapping intensity information provides a basis for clustering pixels or tokens that are grouped according to both similar log chromaticity coordinates and similar tone mapping intensities. This improves the accuracy of a clustering step.

In step 536, the CPU 12 optionally operates to augment each log chromaticity coordinate with x, y coordinates for the corresponding pixel (or an average of the x, y coordinates for the constituent pixels of a Type C token) (see FIG. 2 showing a P (1,1) to P (N, M) pixel arrangement). Thus, a clustering step with x, y coordinate information will provide groups in a spatially limited arrangement, when that characteristic is desired.

In each of steps 534 and 536, the augmented information can, in each case, be weighted by a factor $w_1$ and $w_2$, $w_3$ respectively, to specify the relative importance and scale of the different dimensions in the augmented coordinates. The weight factors $w_1$ and $w_2$, $w_3$ are user-specified. Accordingly, the (log R, log G, log B) coordinates for a pixel or Type C token is augmented to (log R, log G, log B, $T^*w_1$, $x^*w_2$, $y^*w_3$) where T, x and y are the tone mapped intensity, the x coordinate and the y coordinate, respectively.

In step 538, the CPU 12 outputs a list of the augmented coordinates. The augmented log chromaticity coordinates provide accurate illumination invariant representations of the pixels, or for a specified regional arrangement of an input image, such as, for example, Type C tokens. According to a feature of the present invention, the illumination invariant characteristic of the log chromaticity coordinates is relied upon as a basis to identify regions of an image of a single material or reflectance, such as, for example, Type B tokens.

Figure 18:
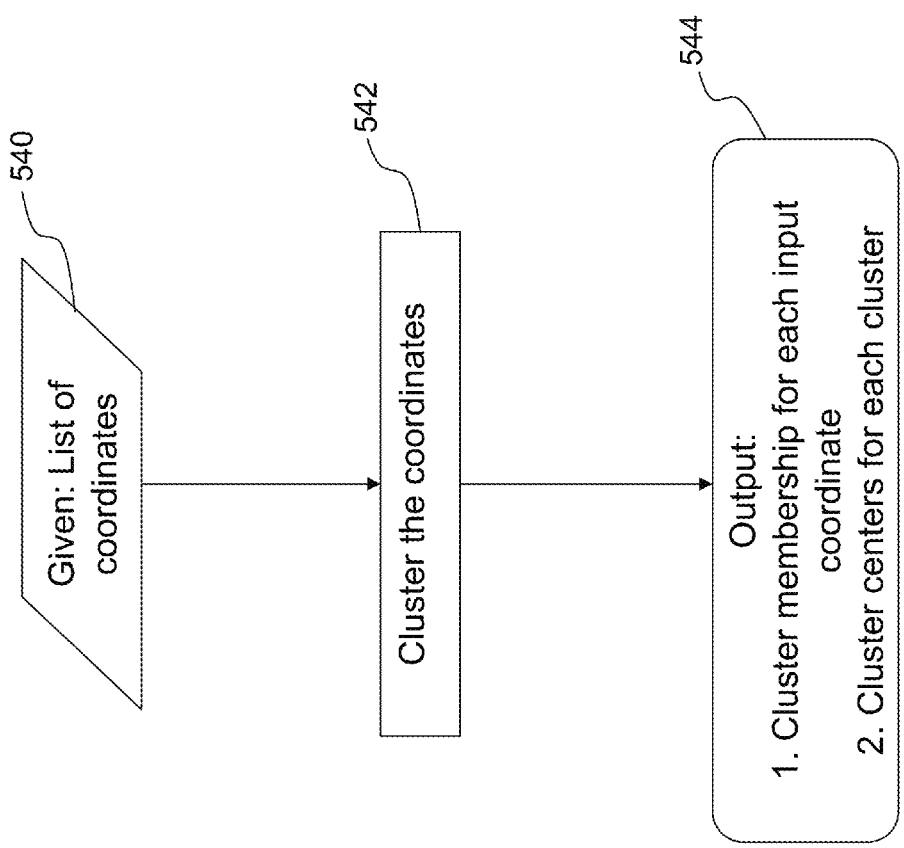
FIG. 18 is a flow chart for clustering the log chromaticity coordinates, according to a feature of the present invention.

FIG. 18 is a flow chart for clustering the log chromaticity coordinates, according to a feature of the present invention. In step 540, the list of augmented log chromaticity coordinates is input the CPU 12. In step 542, the CPU 12 operates to cluster the log chromaticity coordinates. The clustering step can be implemented via, for example, a known k-means clustering. Any known clustering technique can be used to cluster the log chromaticity coordinates to determine groups of similar log chromaticity coordinate values. The CPU 12 correlates each log chromaticity coordinate to the group to which the respective coordinate belongs. The CPU 12 also operates to calculate a center for each group identified in the clustering step. For example, the CPU 12 can determine a center for each group relative to a (log R, log G, log B, log T) space.

In step 544, the CPU 12 outputs a list of the cluster group memberships for the log chromaticity coordinates (cross referenced to either the corresponding pixels or Type C tokens) and/or a list of cluster group centers.

As noted above, in the execution of the clustering method, the CPU 12 can use the list of colors from either the list generated through execution of step 502 of the routine of FIG. 14, or the list generated through execution of step 504. In applying the identified cluster groups to an input image, the CPU 12 can be operated to use the same set of colors as used in the clustering method (one of the list of colors corresponding to step 502 or to the list of colors corresponding to step 504), or apply a different set of colors (the other of the list of colors corresponding to step 502 or the list of colors corresponding to step 504). If a different set of colors is used, the CPU 12 proceeds to execute the routine of FIG. 19.

Figure 19:
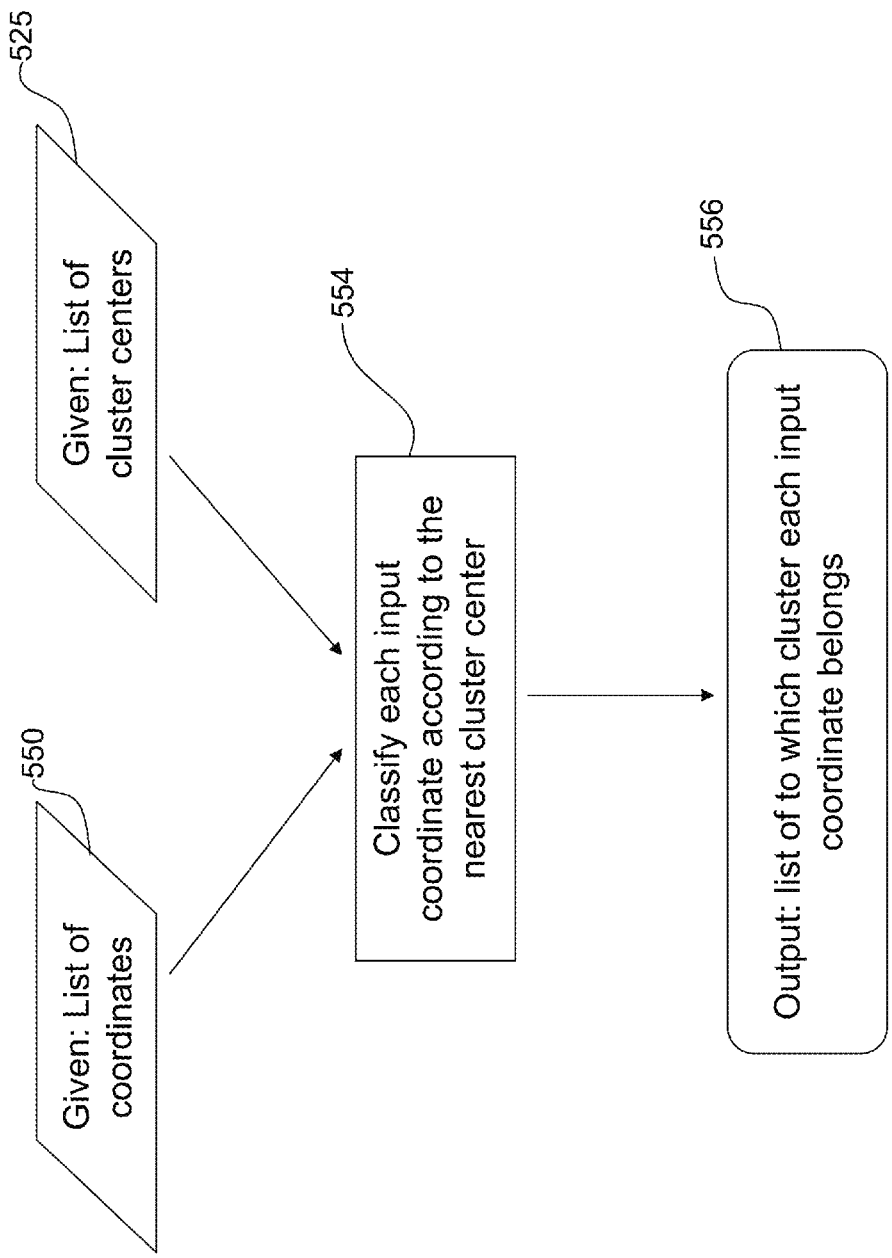
FIG. 19 is a flow chart for assigning the log chromaticity coordinates to clusters determined through execution of the routine of FIG. 18, according to a feature of the present invention.

FIG. 19 is a flow chart for assigning the log chromaticity coordinates to clusters determined through execution of the routine of FIG. 18, when a different list of colors is used after the identification of the cluster groups, according to a feature of the present invention. In step 550, the CPU 12 once again executes the routine of FIG. 8, this time in respect to the new list of colors. For example, if the list of colors generated in step 502 (colors based upon Type C tokens) was used to identify the cluster groups, and the CPU 12 then operates to classify log chromaticity coordinates relative to cluster groups based upon the list of colors generated in step 504 (colors based upon pixels), step 550 of the routine of FIG. 19 is executed to determine the log chromaticity coordinates for the colors of the pixels in the input image file 18.

In step 552, the list of cluster centers is input to the CPU 12. In step 554, the CPU 12 operates to classify each of the log chromaticity coordinates identified in step 550, according to the nearest cluster group center. In step 556, the CPU 12 outputs a list of the cluster group memberships for the log chromaticity coordinates based upon the new list of colors, with a cross reference to either corresponding pixels or Type C tokens, depending upon the list of colors used in step 550 (the list of colors generated in step 502 or the list of colors generated in step 504).

Figure 20:
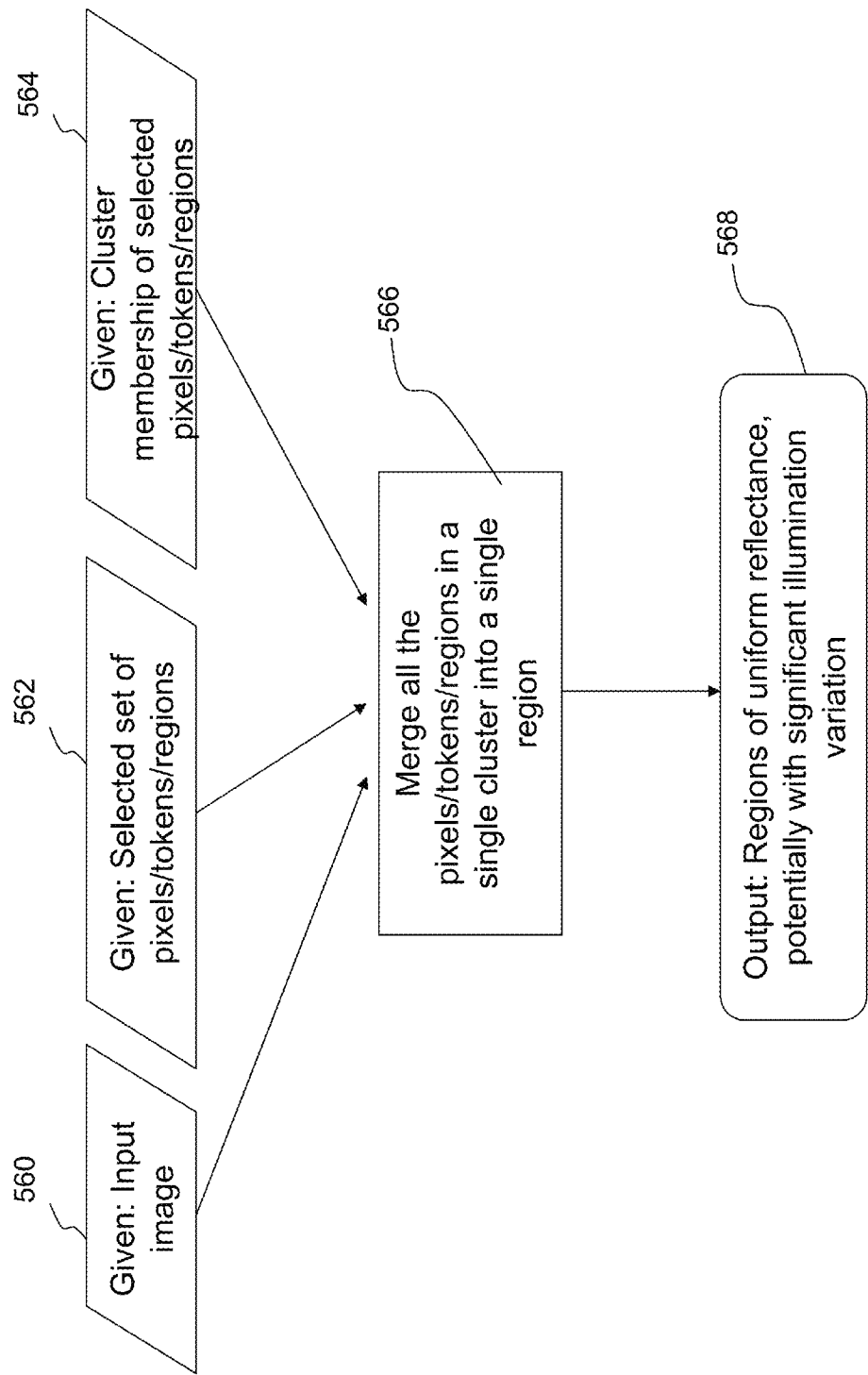
FIG. 20 is a flow chart for detecting regions of uniform reflectance based on the log chromaticity clustering according to a feature of the present invention.

FIG. 20 is a flow chart for detecting regions of uniform reflectance based on the log chromaticity clustering according to a feature of the present invention. In step 560, the input image file 18 is once again provided to the CPU 12. In step 562, one of the pixels or Type C tokens, depending upon the list of colors used in step 550, is input to the CPU 12. In step 564, the cluster membership information, from either steps 544 or 556, is input to the CPU 12.

In step 566, the CPU 12 operates to merge each of the pixels, or specified regions of an input image, such as, for example, Type C tokens, having a same cluster group membership into a single region of the image to represent a region of uniform reflectance (Type B token). The CPU 12 performs such a merge operation for all of the pixels or tokens, as the case may be, for the input image file 18. In step 568, the CPU 12 outputs a list of all regions of uniform reflectance (and also of similar tone mapping intensities and x, y coordinates, if the log chromaticity coordinates were augmented in steps 234 and/or 236). It should be noted that each region of uniform reflectance (Type B token) determined according to the features of the present invention, potentially has significant illumination variation across the region.

In a further exemplary embodiment of the present invention, the CPU 12 (executing as the operators block 28) compiles lists of Type B tokens separately generated through each of and/or a combination of one or more of the arbitrary boundary removal, adjacent planar token merging, local token analysis and log chromaticity clustering techniques. The determination of the combination of techniques used depends in part on whether a particular region of the image was filtered because of texturing of the image. Since each Type B token generated through the described techniques likely represents a single material under varying illumination conditions, merging sufficiently overlapping Type B tokens generated through the use of varying and different techniques, provides a resulting, merged Type B token that represents a more extensive area of the image comprising a single material, and approaches the extent of a Type A token.

Sufficiently overlapping can be defined by satisfaction of certain pixel characteristic criteria, such as, for example:
A) The two Type B tokens have at least n of the original Type C tokens in common, for example, n=1
B) The two Type B tokens have at least n pixels in common, for example, n=20
C) The two Type B tokens have at least n % overlap, that is at least n % of the pixels in a first one of the two Type B tokens are also found in the second one of the two Type B tokens or vice versa, wherein, for example n %=10%.
D) The percentage of pixels in a smaller one of the two Type B tokens, also found in the larger one of the two Type B tokens is above a preselected threshold, for example 15%.
E) A preselected combination of criteria A-D.

Merging of two sufficiently overlapping Type B tokens can be accomplished via a mathematical operation such as execution of the union find algorithm discussed above. In the case of two overlapping Type B tokens that do not satisfy the above discussed criteria, the overlapping pixels of the two tokens can be assigned to the larger one of the two Type B tokens.

Referring once again to FIG. 4, as a result of execution by the Type C tokenization block 35 and/or the operators block 28 (via the CPU 12) of the token generation and merging techniques according to features of the present invention, an image can be accurately segmented into tokens representing discrete materials depicted in the scene (Type B tokens) and tokens representing regions of robust similar color (Type C tokens), thus providing a basis for computational efficiencies, as the token representations capture spatio-spectral information of a significant number of constituent pixels. The service provider 24 stores all of the Type C and Type B tokens generated through execution of the above described token generation techniques, along with the relevant token map information, for example, as determined during execution of the adjacent planar token merging technique, and cross-references the stored operator results to the associated selected image file 18, for use in any segregation processing of the selected image. The cross reference information also includes information on the various selectively varied representations (image files 18a ... 18n) that may have been subject to a tokenization operation.

In our example of a same illumination constraint, the service provider 24 identifies Type C and Type B tokens as the operators required by the selected constraint. The Type C tokenization block 35 generated the Type C tokens. The service provider 24 operates the operators block 28 to execute the above described techniques, to generate the relevant Type B tokens for the image 32, as well as a token map. The constraint builder 26 organizes the generated token operators according to the exemplary matrix equation, [A] [x]=[b], for input to the solver 30. In the same illumination constraint, the constraining relationship of the relevant constraint generator software module is that adjacent Type C tokens, as indicated by the token map information, are lit by the same illumination, unless the adjacent Type C tokens are part of the same Type B token.

According to the multi-resolution exemplary embodiment of the present invention, the tokenization processes can be executed by the CPU 12 in respect to the original image file 18 or any of the selectively varied representations, image files 18a ... 18n, and constraints applied at any level.

Each Type C token stored by the service provider 24 is identified by a region ID, and includes a listing of each constituent pixel by row and column number (and a cross reference to the associated image file wherein the token was identified (image files 18, 18a ... 18n)). Each pixel of a Type C token will be of approximately the same color value, for example, in terms of RGB values, as all the other constituent pixels of the same Type C token, within the noise level of the equipment used to record the image. An average of the color values for the constituent pixels of each particular Type C token can be used to represent the color value for the respective Type C token. Each Type B token is identified by constituent Type C tokens, and thus can be processed to identify all of its constituent pixels via the respective constituent Type C tokens.

Pursuant to a feature of the present invention, a model for image formation reflects the basic concept of an image as comprising two components, material and illumination. This relationship can be expressed as: I=ML, where I is the image color, as recorded and stored in the respective image file 18 and/or convolved in representations 18a ... 18n, M the material component of the recorded image color and L the illumination component of the recorded image color. The I value for each Type C token is therefore the average color value for the recorded color values of the constituent pixels of the token.

Thus: $\log(I)=\log(ML)=\log(M)+\log(L)$. This can be restated as $i=m+l$, where i represents $\log(I)$, m represents $\log(M)$ and l represents $\log(L)$. In the constraining relationship of the same illumination constraint, in an example where three Type C tokens, a, b and c, (see FIG. 21) are adjacent (and not within the same Type B token, (as can be shown by a comparison of row and column numbers for all constituent pixels)), $l_a=l_b=l_c$. Since: $l_a=i_a-m_a$, $l_b=i_b-m_b$, and $l_c=i_c-m_c$, these mathematical relationships can be expressed as $(1)m_a+(-1)m_b+(0)m_c=(i_a-i_b)$, $(1)m_a+(0)m_b+(-1)m_c=(i_a-i_c)$ and $(0)m_a+(1)m_b+(-1)m_c=(i_b-i_c)$.

Figure 21:
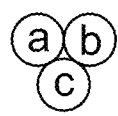
FIG. 21 is a representation of an [A] [x]=[b] matrix relationship according to an exemplary embodiment of the present invention.

FIG. 21 shows a representation of an [A] [x]=[b] matrix equation for the mathematical relationships of the example of the three adjacent Type C tokens a, b and c described above, as constrained by the same illumination constraint: the adjacent Type C tokens a, b and c are at the same illumination. In the matrix equation of FIG. 15, the various values for the log (I), in the [b] matrix, are known from the average recorded pixel color values for the constituent pixels of the adjacent Type C tokens a, b and c, generated by the Type C tokenization block 35 from the image selected for segregation. The [A] matrix of 0's, 1's and −1's, is defined by the set of equations expressing the selected same illumination constraint, as described above. The number of rows in the [A] matrix, from top to bottom, corresponds to the number of actual constraints imposed on the tokens, in this case three, the same illumination between three adjacent Type C tokens. The number of columns in the [A] matrix, from left to right, corresponds to the number of unknowns to be solved for, again, in this case, three. Therefore, the values for the material components of each Type C token a, b and c, in the [x] matrix, can be solved for in the matrix equation. It should be noted that each value is actually a vector of three values corresponding to the RGB color bands of our example.

Accordingly, the matrix equation of FIG. 21, as arranged by the constraint builder 26, is input by the constraint builder 26 to the solver 30 for an optimized solution for the values of the material components of the adjacent Type C tokens a, b and c of the selected image. As noted above, in the exemplary GUI embodiment of the present invention, a user selects one of several mathematical techniques for finding the optimal solution to the system of constraint equations, [A] [x]=[b]. The CPU 12 configures the solver 30 according to the mathematical operation selected by the user.

For example, in a standard least squares solver, the matrix equation is restated as $\underset{x}{\min}(Ax-b)^2$. The solver 30 then executes the least squares operation to determine optimized values for each of $m_a$, $m_b$ and $m_c$. The solver 30 can then proceed to generate and display a material image based upon the optimal $m_a$, $m_b$ and $m_c$ values. In the material image, the $m_a$, $m_b$ and $m_c$ values are substituted for the originally recorded RGB values, for each pixel of the respective tokens. The solver 30 can proceed to also generate an illumination image from the known recorded image values $i_a$, $i_b$, $i_c$, and the determined $m_a$, $m_b$ and $m_c$ values, utilizing the model expressed by $i=m+l$.

Each of the material and illumination images are displayed on the monitor 20, via, for example, the GUI (see FIG. 5) and can be stored by the service provider 24, and cross-referenced to the original image file 18. According to a feature of the present invention, intrinsic images generated from the representations image files 18a ... 18n by performance of the above described spatio-spectral operator/constraint/solver process, are also stored by the service provider 24.

As noted above, the spatio-spectral operator/constraint/solver process can be efficiently executed by the CPU 12 first in respect of the relatively coarse representation depicted in image file 18a. Thereafter, the solver (executing via the CPU 12) is constrained by the weighted average for color equation described above, when solving for an illumination image and/or material image for the fine scale original image file 18. Moreover, according to a further exemplary embodiment of the present invention, the spatio-spectral operator/constraint/solver process can be executed by the CPU 12 selectively relative to the various representations of the image. For example, only regions of the image file 18 having edges, are tokenized, while all regions of uniform color within the relatively coarse image file 18a are tokenized, for a division of processing, as described above.

FIG. 22 shows a representation of an [A] [x]=[b] matrix equation for three adjacent Type C tokens a, b and c, as constrained according to a further exemplary embodiment of the present invention. The same illumination constraint discussed above, with reference to FIG. 21, enforces a strict solution between the tokens a, b and c, according to the same illumination constraint imposed upon the tokens in the illustrated example. In the further exemplary embodiment of the present invention, a soft, weighted constraint can be used to provide a more accurate segregation of an image into the intrinsic material reflectance and illumination components. The constraint of the further exemplary embodiment is based upon the BIDR model and constrains all color band variations into one integral constraining relationship.

According to the further exemplary embodiment of the present invention, each constraint between any two image locations, for example, Type C tokens i and j, is expressed by the log color space equation: $w_{ij}*(Mi-Mj)=w_{ij}*(\alpha_{ij}V_{ij}+(1-\alpha_{ij})B_{ij})$, where Mi and Mj are log color space values for the material reflectance component of the tokens i and j, respectively, $V_{ij}$ is a difference vector to provide a gradient magnitude defined by $V_{ij}=I_i-I_j$, where $I_i$ and $I_j$ are the recorded log color space values for the color and intensity of the tokens i and j, respectively, $B_{ij}$ is the component of $V_{ij}$ that is not aligned with illumination change and is a vector defined by $B_{ij}=V_{ij}-(V_{ij}\cdot N)$, where N is the BIDR normal, as described above, $\alpha_{ij}$ is a scalar value based upon a smooth scalar function $\alpha$ that varies from 0 to 1, as a function of the degree that the change expressed by $I_i-I_j$ corresponds to an illumination change or a material reflectance change, and $w_{ij}$ is a constraint confidence weight that specifies the importance of the constraint in the solve of the [A] [x]=[b] matrix equation.

Thus, the $w_{ij}*(Mi-Mj)=w_{ij}*(\alpha_{ij}V_{ij}+(1-\alpha_{ij})B_{ij})$ constraint equation, according to the present invention, provides a flexible, weighted constraint relationship that accurately reflects the nature of color change, as a function of spatio-spectral information represented by the BIDR model, between any image locations, for example, between the locations of tokens i and j, and expresses color change as caused by an illumination change, or a material reflectance change or a combination of both. The constraint relationship therefore can be implemented in a solve that results in a more precise and accurate segregation of an image into the intrinsic material reflectance and illumination components. The image locations selected for inclusion in the constraint equation can be adjacent locations, or locations separated by a fixed amount, for example, 2, 3 or 4 pixels apart. A group of locations can also be selected, for example, all tokens that are 2 to 10 pixels apart from the ith token.

For example, assuming a constraint confidence weight of 1, then when $\alpha_{ij}=1$, the equation reduces to a same illumination constraint, $Mi-Mj=V_{ij}$. In this form, the difference between the material reflectance components of the two tokens i and j equals all of the color change expressed by the vector $V_{ij}$, due to the same illumination across the two tokens.

Again assuming a constraint confidence weight of 1, when $\alpha_{ij}=0$, the equation reduces to a same material constraint, $Mi-Mj=B_{ij}$. In this form, the difference between the two tokens is almost the same, except for the value of $B_{ij}$, the component of color change that is not aligned with the BIDR normal, and therefore expresses some difference in material reflectance.

In addition, the equation can be expressed in terms of an anchor constraint, when material reflectance difference, or the material reflectance itself, is constrained to a pre-determined value x. In that case, the equation is expressed as $Mi-Mj=x$, when the difference in material reflectance between two image locations is anchored to a pre-determined amount, and $Mi=x$, when a single location, for example, a token, is constrained to a pre-determined amount.

The $w_{ij}*(Mi-Mj)=w_{ij}*(\alpha_{ij}V_{ij}+(1-\alpha_{ij})B_{ij})$ constraint equation, according to the present invention, relies upon purity of color values for an accurate measure of color change due to illumination. In that connection, the known Gaussian and Laplacian techniques for creating the pyramids, as described above, tend to average or blur colors from a high resolution to the next, lower resolution level. A pyramid arrangement that preserves the purity of color from scale to scale is needed to insure the accuracy of solve results.

Thus, according to a feature of the present invention, to increase accuracy in a solve based upon constraints, a simple mean method to create the pyramid is used to assure color purity at each of and between the pyramid levels.

Figure 28:
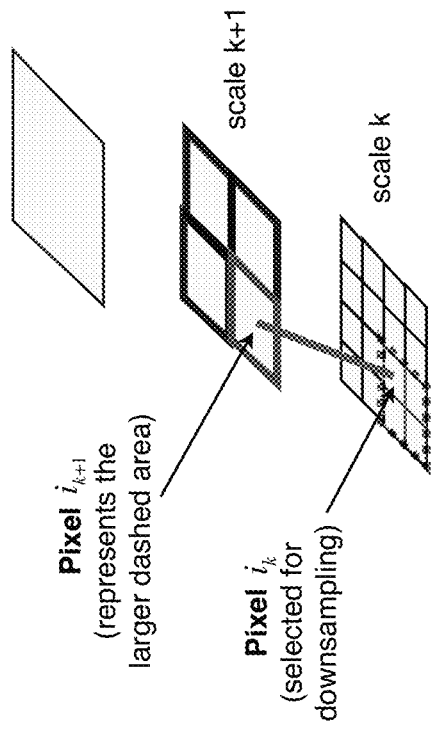
FIG. 28 is a graphic representation of pixel locations at different scales of a scale-spaced pyramid, as shown in FIG. 3b.

Referring now to FIG. 27, there is shown a flow chart for a simple mean method for color pure down sampling according to a feature of the present invention. The routine of FIG. 27 provides a downsampling correspondence map, as illustrated in FIG. 28. FIG. 28 is a graphic representation of pixel locations at different scales of a scale-spaced pyramid, as shown in FIG. 3b. The area designated as pixel $i_{k+1}$ in the lower resolution level scale k+1, when downsampling to the higher resolution level k, will be assigned the color of the pixel $i_k$ of the corresponding 2×2 pixel region of the higher resolution level k.

According to a feature of the present invention, the selection of the pixel $i_k$ in the corresponding 2×2 pixel region, for color accurate downsampling mapping, is executed by the CPU 12 via the routine of FIG. 27. The inputs for the CPU 12 to execute the routine of FIG. 27 include the original image file 18, and the downsampling scale D (1600). In the example of FIG. 28, the downsampling scale is 2, as a 2×2 pixel neighborhood of the high resolution level k is represented by a single location, pixel $i_{k+1}$ of the k+1 level.

In step 1602, the CPU 12 operates to select the D×D neighborhood corresponding to an image location for a low resolution, higher scale, for example, as shown in FIG. 28. In step 1604, the CPU 12 calculates the mean color for the pixels in the D×D neighborhood. In step 1606, the CPU 12 operates to select the pixel in the D×D neighborhood that most closely matches the mean color value calculated in step 1604. In the example of FIG. 28, the CPU 12 selects pixel $i_k$. In step 1608, the CPU 12 maps the color of the selected pixel from the D×D neighborhood of the high resolution level to the current location of the low level resolution, links pixels $i_k$ and $i_{k+1}$, and then stores the map indication (step 1610).

In step 1612, the CPU 12 repeats steps 1602-1610, for all of the other locations of the current level of the pyramid. When the map for the current level is complete, the CPU 12 proceeds to decision block 1614. In decision block 1614, the CPU 12 checks the current level to determine if it is less than the resolution of the lowest resolution level of the pyramid. If no, the CPU proceeds back to step 1602, and begins the routine again, up the pyramid, at the next, lower resolution level of the pyramid. If yes, the CPU 12 proceeds to step 1616, and exits the routine.

Referring now back to FIG. 3c, step 1038b is executed by the CPU 12 by selecting locations, for example three tokens a, b, c, at a scale, for example, depicted at one of the levels of the token pyramid, created according to the simple mean method, input from block 1016 (as shown in FIG. 3b). The CPU 12 also accesses the corresponding locations of the blend pixel pyramid, input from block 1020, to verify that the selected tokens are not blend pixel tokens. In the event that the selected tokens are blend pixel tokens, the CPU 12 can operate to take an action relative to the blend pixel tokens. For example, the CPU 12 can eliminate the selected tokens from any constraint, or limit the inclusion to certain types of constraints, for example, only same material constraints. Moreover, the CPU 12 accesses the normal image pyramid, input from block 1026, to obtain BIDR normal information for the selected tokens a, b, c.

As shown in the example of FIG. 22, the CPU 12 completes step 1038b by organizing the constraints relative to the tokens a, b, c in the [A] [x]=[b] matrix equation, according to the $w_{ij}*(M_i-M_j)=w_{ij}*(\alpha_{ij}+(1-\alpha_{ij})B_{ij})$ weighted constraint equation. The CPU 12 also calculates the values for $w_{ij}$ and $\alpha_{ij}$ as well as the values for $V_{ij}$ and $B_{ij}$.

Figure 23:
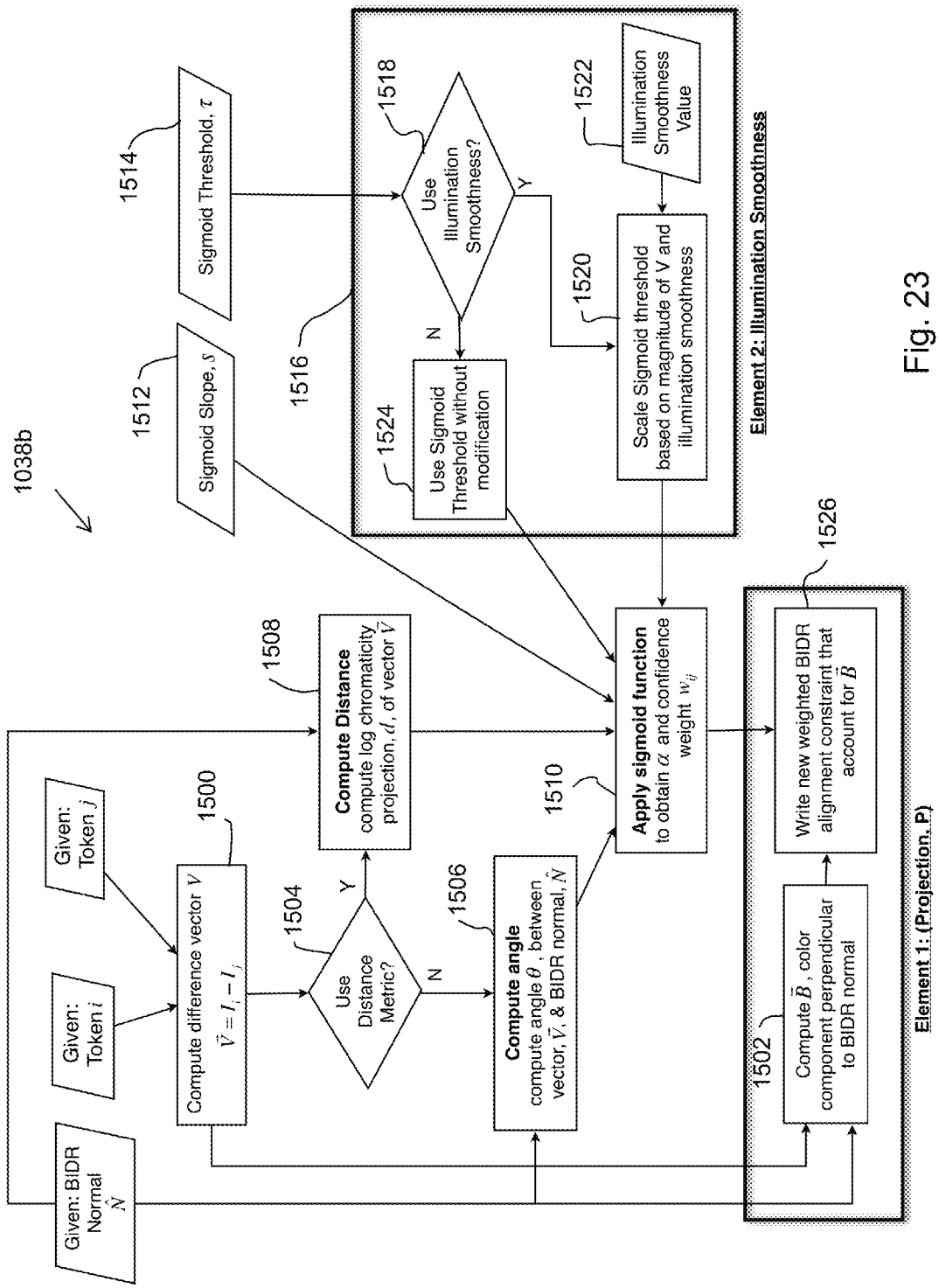
FIG. 23 is a flow chart for a weighted constraint according to a feature of the present invention.
Figure 25A:
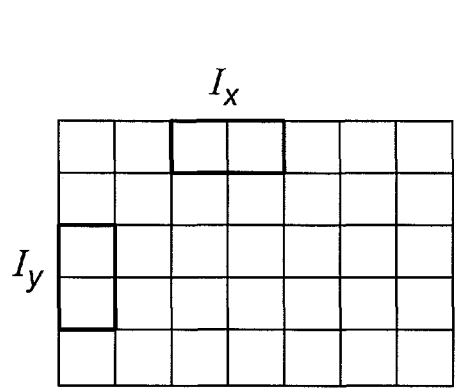
FIG. 25a shows spaced locations in one level of the pyramid of FIG. 3b.

Referring now to FIG. 23, there is shown a flow chart for executing the weighted constraint equation as a BIDR alignment constraint according to a feature of the present invention. The flow chart depicts operation by the CPU 12 for calculating the values for $w_{ij}$ and $\alpha_{ij}$ and $V_{ij}$ and $B_{ij}$, for example, to complete step 1038b, in spatial constraints between locations of one level of the image pyramid, as shown in FIG. 25a. In step 1500, the CPU 12 receives as input the average recorded color value ($I_i$ and $I_j$) for the constituent pixels of each of tokens i and j, where i and j are one of the ab, ac, or bc pairs from the a, b, c tokens of the example of FIG. 22.

In step 1500, the CPU 12 operates to compute the difference vector V by executing the equation $V_{ij}=I_i-I_j$, as described above. The result of step 1500 is input to block 1502. The BIDR normal N accessed by the CPU 12 from corresponding locations of the normal pyramid is also input to block 1502. In block 1502, the CPU 12 applies the inputs ($V_{ij}$ and N) to compute the vector $B_{ij}$ by executing the equation $B_{ij}=V_{ij}-(V_{ij}\cdot N)$. The result of step 1500 is also input to decision block 1504.

In decision block 1504, a user sets a selection to one of two different modes corresponding to two different metrics for calculating $w_{ij}$ and $\alpha_{ij}$, an angle metric and a distance metric. In the event the angle metric is selected by a user, the CPU 12 proceeds to step 1506.

In step 1506, the CPU 12 computes the angle metric, a BIDR alignment angle θ, the angle between the vector V and the BIDR normal N, $\theta=\cos^{-1}(V\cdot N)$.

In the event the distance metric is selected by a user, the CPU 12 proceeds to step 1508. In step 1508, the CPU 12 computes the distance metric d, measured as the distance between the projections on the log chromaticity plane (the u, v plane perpendicular to the BIDR normal, as shown in FIG. 13) of the log color space values $I_i$ and $I_j$.

In step 1510, the CPU 12 receives either the angle metric θ (step 1506) or the distance metric d (step 1506), depending on the user selection (step 1504). In step 1510, the CPU 12 applies a sigmoid function to obtain values for $w_{ij}$ and $\alpha_{ij}$.

To that end, a user selects a sigmoid slope s (1512) and a sigmoid threshold τ (1514). These parameters set the rate and the point of transition of the sigmoid function. The sigmoid slope s is input to step 1510. In one exemplary embodiment of the present invention, the sigmoid threshold τ, set by the user, can be scaled, based upon the magnitude of the vector V (block 1516).

In the scaled threshold embodiment (block 1516), the sigmoid threshold τ set by the user is input to a decision block 1518. A user sets an indication whether to use illumination smoothness in the constraints concatenated in the [A] [x]=[b] matrix. If no, the CPU 12 proceeds to step 1524, for input to step 1510, and the threshold τ is applied as a fixed value, without modification.

Figure 26A:
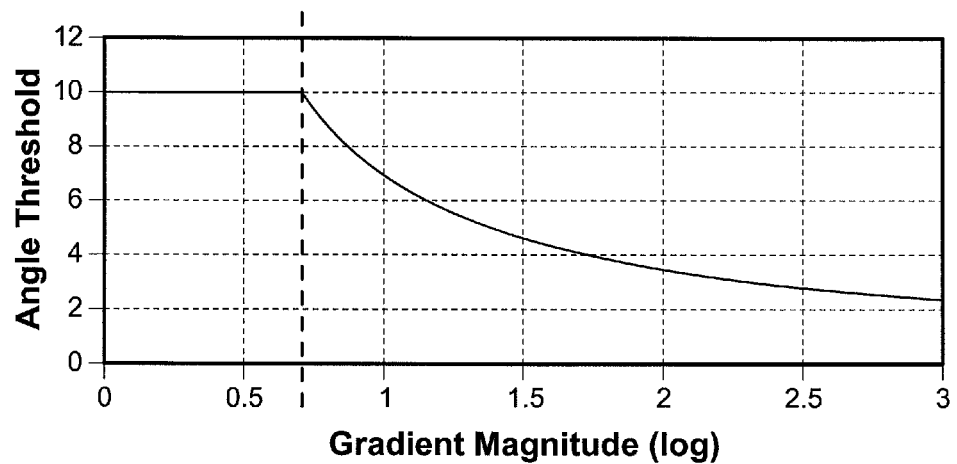
FIGS. 26a and b show graphs for scaled threshold values in each of angle metric and distance metric modes, respectively.
Figure 26B:
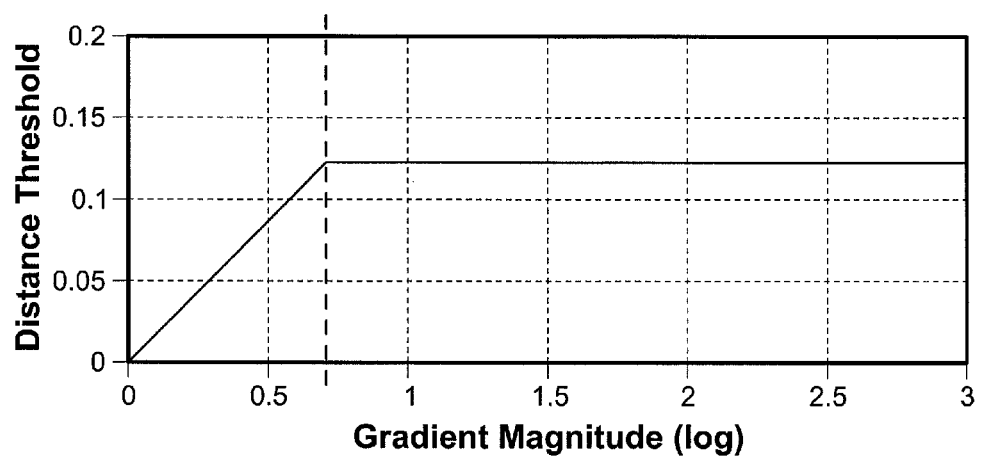

If yes, the sigmoid threshold τ is input to step 1520. In step 1520, the CPU 12 references step 1504 to determine the mode selected by a user, the angle metric mode or the distance metric mode. Depending on the selected mode, the CPU 12 then references a threshold scale graph, for example, as shown in FIGS. 26a and b. The threshold graphs shown in FIGS. 26a and b can be adjusted according to an illumination smoothness value input from block 1522. FIG. 26a shows the scale adjustment for the threshold τ for different values of the vector V when the angle metric is used and FIG. 26b shows the scale adjustment for the threshold τ for different values of the vector V when the distance metric is used. The CPU 12 operates to output the appropriate threshold value to step 1510.

In step 1510, the CPU 12 applies a sigmoid function, as noted above, in either the angle metric mode or distance metric mode, using the values for s and τ input from steps 1512 and 1516, respectively, and either the angle or distance value from one or the other of steps 1506 and 1508.

Figure 24:
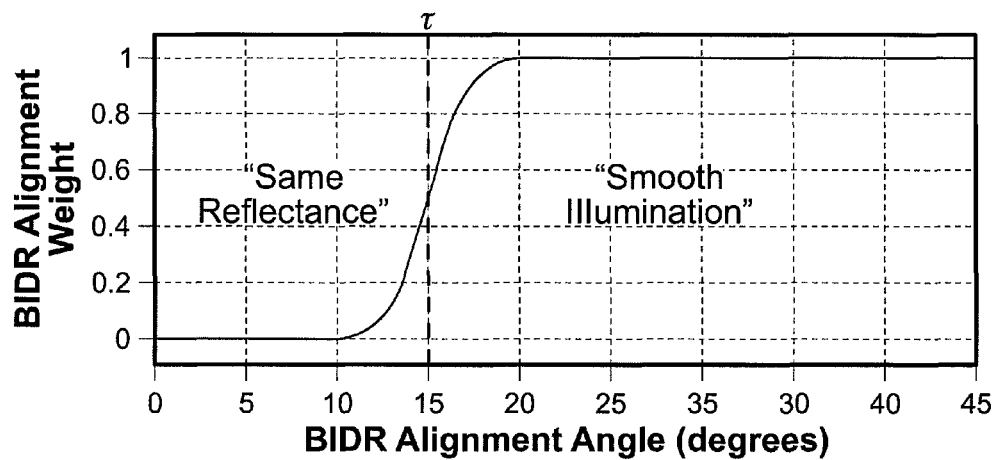
FIG. 24 shows a graph for a sigmoid function indication of a weight, according to a feature of the present invention.

In the angle metric mode, the CPU 12 executes a sigmoid function to compute $\alpha_{ij}$ as a function of θ: $\alpha_{ij}=1/1+e^{-s*(\theta-\tau)}$. FIG. 24 shows a plot of the sigmoid function for the angle metric mode, for values of θ from 0° to 45°. As shown in FIG. 24, for low values of θ, for example 10° and lower, the value of $\alpha_{ij}$ is 0. As noted above, when $\alpha_{ij}$ is 0, the constraint equation reduces to a same material constraint, as shown on the graph of FIG. 24. At low angles, the vector V is nearly aligned with the BIDR normal, and thus, all color change is due to illumination. For values higher than approximately 20°, the value of $\alpha_{ij}$ is 1. As also noted above, when $\alpha_{ij}$ is 1, the constraint equation reduces to a same illumination constraint (or a smooth illumination, if set by a user in step 1518), as shown on the graph of FIG. 24. Again, a large angle indicates only a small color difference due to illumination, since the vector V is not closely aligned with the BIDR normal.

In the distance metric mode, the CPU 12 executes a sigmoid function to compute $\alpha_{ij}$ as a function of d: $\alpha_{ij}=1/1+e^{-s*(d-\tau)}$. A sigmoid slope similar to the slope shown in FIG. 24 will plot the BIDR alignment weight, $\alpha_{ij}$, against the distance metric d. For low values of d, the distance between the image locations in the log chromaticity plane is small, indicating similar material reflectance values for the locations, and thus, corresponding to a same material constraint. Likewise, for high values of d, the distance between the image locations in the log chromaticity plane is large, indicating different material reflectance values for the locations, and thus, corresponding to a same illumination constraint.

In step 1510, the CPU 12 also operates to calculate the confidence weight, by executing the equation $w_{ij}=1-4*\alpha_{ij}*(1-\alpha_{ij})$. According to the confidence weight equation, the confidence value is low in the area of the sigmoid curve at the transition from $\alpha_{ij}=0$ to $\alpha_{ij}=1$. Thus, when $\alpha_{ij}=0$ or $\alpha_{ij}=1$, the confidence weight $w_{ij}$ is 1, and when $\alpha_{ij}=0.5$, the confidence weight $w_{ij}$ is 0.

In one exemplary embodiment of the present invention, when there is a strong same material constraint, for example with $\alpha_{ij}<0.1$, the constraint is scaled to a higher weight confidence level. The BIDR model is accurate at predicting a situation when two locations of an image, for example, tokens i and j, are of the same material reflectance. Accordingly, instances when the scalar value $\alpha_{ij}$ is low, indicating a same material constraint, the confidence weight $w_{ij}$ of the constraint is biased by a pre-selected scaling factor, for example, 50.

As illustrated in FIG. 3c, an image pyramid is created in step 1012. In another exemplary embodiment of the present invention, the value for $w_{ij}$ is scaled as a function of the pyramid level where the spatial constraints are written. Inasmuch as higher levels of the pyramid each have $1/D^2$ pixels less than the next lower level, constraints at each higher level have less impact on the solution. To counteract the $1/D^2$ effect, constraint weights $w^k_{ij}$ between image locations, for example, between tokens i and j, at each level k of the pyramid, are scaled, as follows: $w^k_{ij}=F^k*w_{ij}$, where the scaling factor $F=P*D^2$, P being the processing scale, for example 1. The processing scale specifies the relative strength of constraints written at different levels of the pyramid.

Upon completion of the execution of step 1510 by the CPU 12 to obtain values for $\alpha_{ij}$ and $w_{ij}$, the CPU 12 proceeds to step 1526. In step 1526, the CPU 12 operates to write the BIDR alignment constraints shown in FIG. 22 with the values computed in steps 1500, 1502 and 1510, for $V_{ij}$, $B_{ij}$, $\alpha_{ij}$ and $w_{ij}$, relative to each of the ab, ac, and bc pairs from the a, b, c tokens of the example of FIG. 22.

Referring once again to FIG. 3c, step 1038a is executed by the CPU 12 by selecting locations from different scales of the scale-spaced image pyramid shown in FIG. 3b. By writing constraints between pyramid-spaced locations, the constraints can be applied to a larger range of the image by writing spatial constraints on higher levels (lower resolution) of the pyramid, and also writing downsampling constraints that connect, for example, tokens at a higher level, to the base level.

Constraints between locations at different levels of the image pyramid, using the color maps created by execution of the routine of FIG. 27, can be written as anchor constraints. As discussed above, the weighted constraint, when stated in the context of an anchor constraint, is expressed as: Mi-Mj=x. In this case, inasmuch as the map created via execution of the routine of FIG. 27 results in the same color value for each of the locations of the different levels forming a constraint, x=0.

In addition, a weight $w_{ij}$ can be assigned to each anchor constraint. Due to the known equality for color values for the two locations of each anchor constraint, the anchor constraints are strong, and the weight assigned to each constraint is set at a high value to insure that higher levels of the pyramid have a significant effect on the results at the lower levels.

Figure 25B:
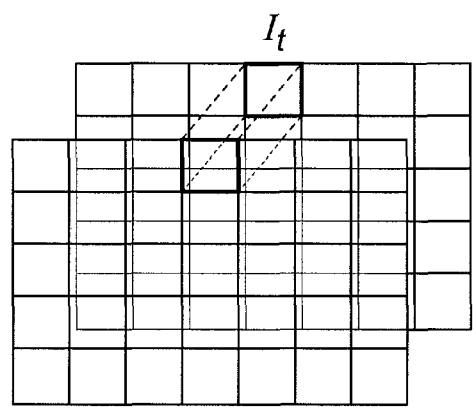
FIG. 25b shows spaced locations between temporally spaced frames of a video.

Referring once again to FIG. 3c, step 1038d is executed by the CPU 12, in the event the image processing is relative to a video recording, by selecting locations from temporally spaced frames of the video, as shown in FIG. 25b. In a video, each frame can be processed independently from one another, however, adjacent frames often have a significant amount of redundancy, and temporal constraints can be used to provide more coherent and flicker-free videos for corresponding intrinsic material reflectance and illumination videos. A sliding temporal window is used relative to each frame k of the video, and a fixed number of previous frames.

According to a feature of the present invention, temporal constraints can be implemented according to a color similarity constraint concept, including, in one exemplary embodiment of the present invention, the anchor constraint variation, expressed as follows: $w''_{ij}*(Mi-Mj)=w''_{ij}*(\alpha_{ij}V_{ij}+(1-\alpha_{ij})B_{ij})$, the same basic equation as discussed above, however where the tokens i and j are from different video frames, token i is from frame k and token j is from temporally spaced frame k-n, where n is an integer indicating the number of frames between k and previous frame k-n, n being greater than or equal to 1, and further, where the temporal constraint weight $w''_{ij}$ is scaled as a function of the distance n between a temporally spaced frame and frame k.

Figure 29:
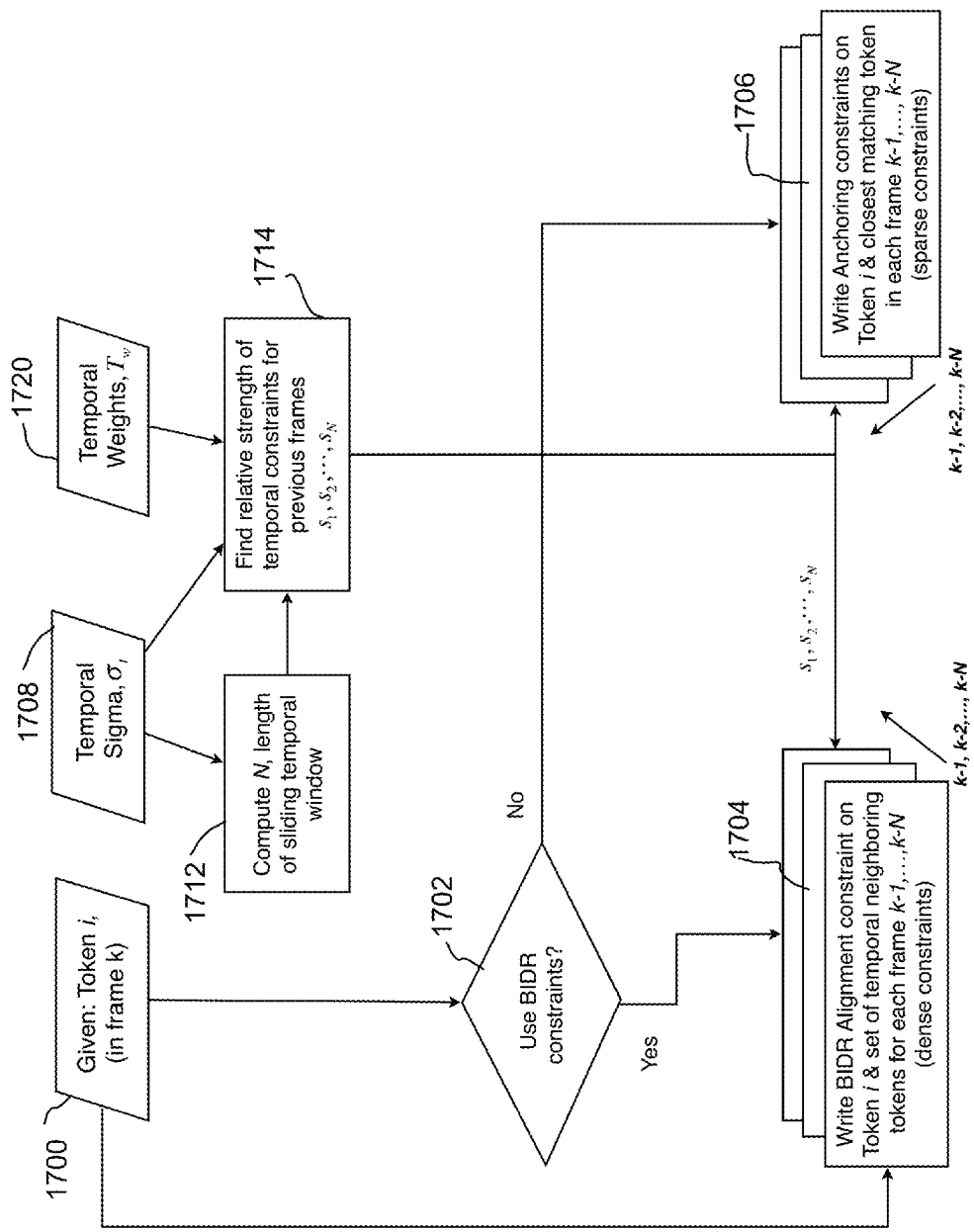
FIG. 29 is a flow chart for a temporal constraint.

Referring now to FIG. 29, there is shown a flow chart for a temporal constraint. In step 1700, the CPU 12 receives as an input token i from the image file 18 depicting frame k of a video. The CPU 12 then proceeds to the decision block 1702. In decision block 1702, the CPU 12 checks a user setting as to a mode for temporal constraints. If the mode is set to use BIDR alignment constraints, the CPU 12 proceeds to step 1704, and writes BIDR alignments constraints. If the mode is not set to use BIDR alignment constraints, the CPU 12 proceeds to step 1706, and writes anchor constraints.

In either mode, the CPU 12 writes the constraints using scaling factors $s_1, s_2, \ldots, s_N$. The scaling factors determine how much to scale the confidence weight of a constraint as a function of how many frames there are between the k frame and the k-n frame of a constraint. The scaling factors are calculated to insure that frames closer to the k frame have a stronger effect on results in a solve, than frames further away. To that end, each of a temporal sigma $\sigma_t$ (1708) and temporal weight $T_w$ (1710) is set by a user and input to the CPU 12. The temporal sigma is used to determine how many frames N there are from k-1 to k-n. The temporal weight indicates the strength temporal constraints have relative to spatial constraints.

In step 1712, the CPU 12 uses the temporal sigma to compute N. In an exemplary embodiment of the present invention, the N=round($3*\sigma_t$). In step 1714, the CPU 12 calculates the scaling factors $s_1, s_2, \ldots, s_N$, as follows: $s_n=T_w*\exp(-n^2/2\sigma_t^2)$.

Upon calculation of the scaling factors $s_1, s_2, \ldots s_N$, the CPU 12 outputs the results to each of steps 1704 and 1706.

When use BIDR alignment constraints is set, the CPU 12 proceeds to step 1704. In step 1704, the CPU writes a spatial BIDR alignment constraint for token i in frame k, and a set of temporal constraints for frames k-1, . . . k-N, as per the routine of FIG. 23, however with $w''_{ij}$ in each temporal constraint calculated as $w''_{ij}=s_n*w_{ij}$.

Figure 30:
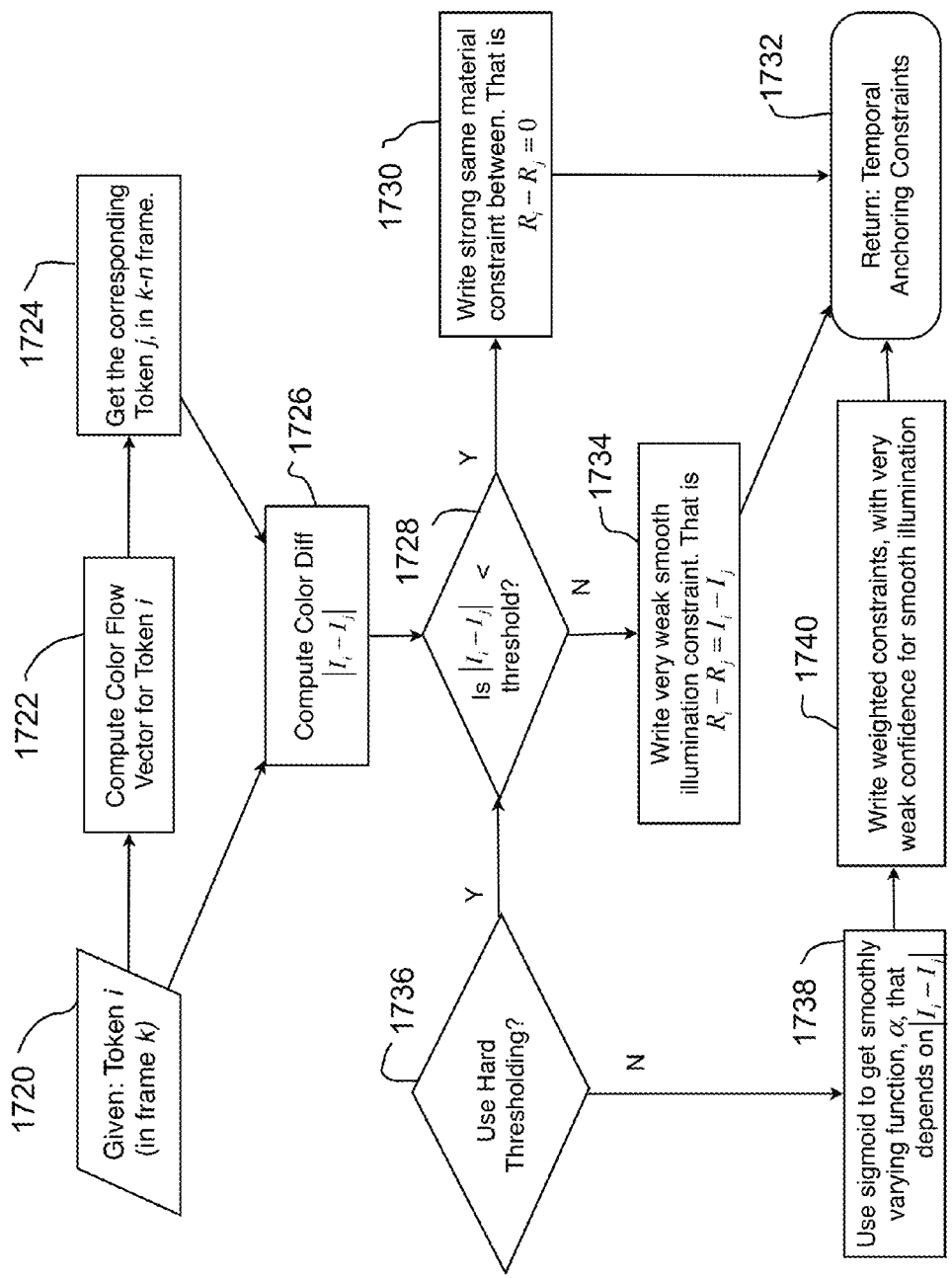
FIG. 30 is a flow chart for an anchor constraint.

When use BIDR alignment constraints is not set, the CPU 12 proceeds to step 1706. In step 1706, the CPU writes anchor constraints between token i in frame k and the closest matching token in each of frames k-1, k-2, . . . k-N, via execution of the routine of FIG. 30. Referring now to FIG. 30, in step 1720, token i is input to the CPU 12. In step 1722, the CPU 12 computes a color flow vector for token i. In an exemplary embodiment of the present invention, as shown in FIG. 3c, color flow vectors are computed and stored in a color flow vector pyramid (see steps 1028, 1030 of FIG. 3c, and FIG. 3g). Accordingly, step 1722 can be executed via a reference to the color flow pyramid to obtain the color flow vector for token i.

In step 1724, the CPU 12 uses the color flow vector to identify a corresponding token j in the k-n frame. In step 1726 the CPU 12 operates to compute the color difference between token i and token j: $|I_i-I_j|$, then proceeds to decision block 1728.

In decision block 1728, the CPU 12 determines if $|I_i-I_j|$ is less than a threshold, for example, a threshold indicating a color difference between token i and token j that corresponds to a color similarity weight, a, that is less than 0.1. If yes, the CPU 12 proceeds to step 1730.

In step 1730, the CPU 12 writes a strong same material constraint between token i and token j: Mi-Mj=0. The CPU 12 then returns the constraint for concatenation in the [A] [x]=[b] matrix (1732).

If $|I_i-I_j|$ is greater than the threshold, the CPU 12 then proceeds to step 1734. In step 1734, the CPU 12 writes weakly weighted smooth illumination constraint between token i and token j: Mi-Mj=$I_i-I_j$. The CPU 12 then returns the constraint for concatenation in the [A] [x]=[b] matrix (1732).

In an alternative exemplary embodiment of the present invention, an internal control can be set to turn off the threshold process. In decision block 1736, if set to use a hard threshold, the CPU 12 executes from decision block 1728. If not set to use a hard threshold, the CPU 12 proceeds to step 1738.

In step 1738, the CPU 12 applies a sigmoid function to obtain a as a function of $|I_i-I_j|$, as follows: $\alpha=1/1+e^{-s*(|Ii-Ij|-\tau)}$, where s and τ are sigmoid slope and threshold parameters set by a user.

In step 1740, the CPU 12 writes a constraint between token i and token j, using the a determined from the sigmoid curve.

In this case, for example, in a weighted constraint, when α<0.1, a same material constraint is written, with $w_{ij}=1$ or higher, and in the case when α>0.1, a weak, same illumination constraint is written, with, for example, $w_{ij}=1e^{-5}$. The CPU 12 then returns the constraint for concatenation in the [A] [x]=[b] matrix (1732).

Moreover, the sigmoid threshold τ can be varied as a function of color saturation. A scaling factor is used to vary the sigmoid threshold, with the scaling factor being set to increase the threshold as color saturation increases.

Referring once again to FIG. 3c, step 1038c is executed by the CPU 12 to write constraints based upon user applied scribbles. The CPU 12 writes a constraint for each scribble, based upon the type of scribble. For example, in the case of a same reflectance scribble (all pixels constituting the scribble are of the same material reflectance), a same material constraint is written.

Upon completion of each of steps 1038a-1038d, the CPU 12 proceeds to step 1040. In step 1040, the CPU 12 concatenates all of the constraints in the [A] [x]=[b] matrix, as shown in the example of FIG. 22. In step 1042, the CPU 12 solves the matrix equation, for example, executing the routine described for the solve of the matrix equation shown in the example of FIG. 21.

Figure 31:
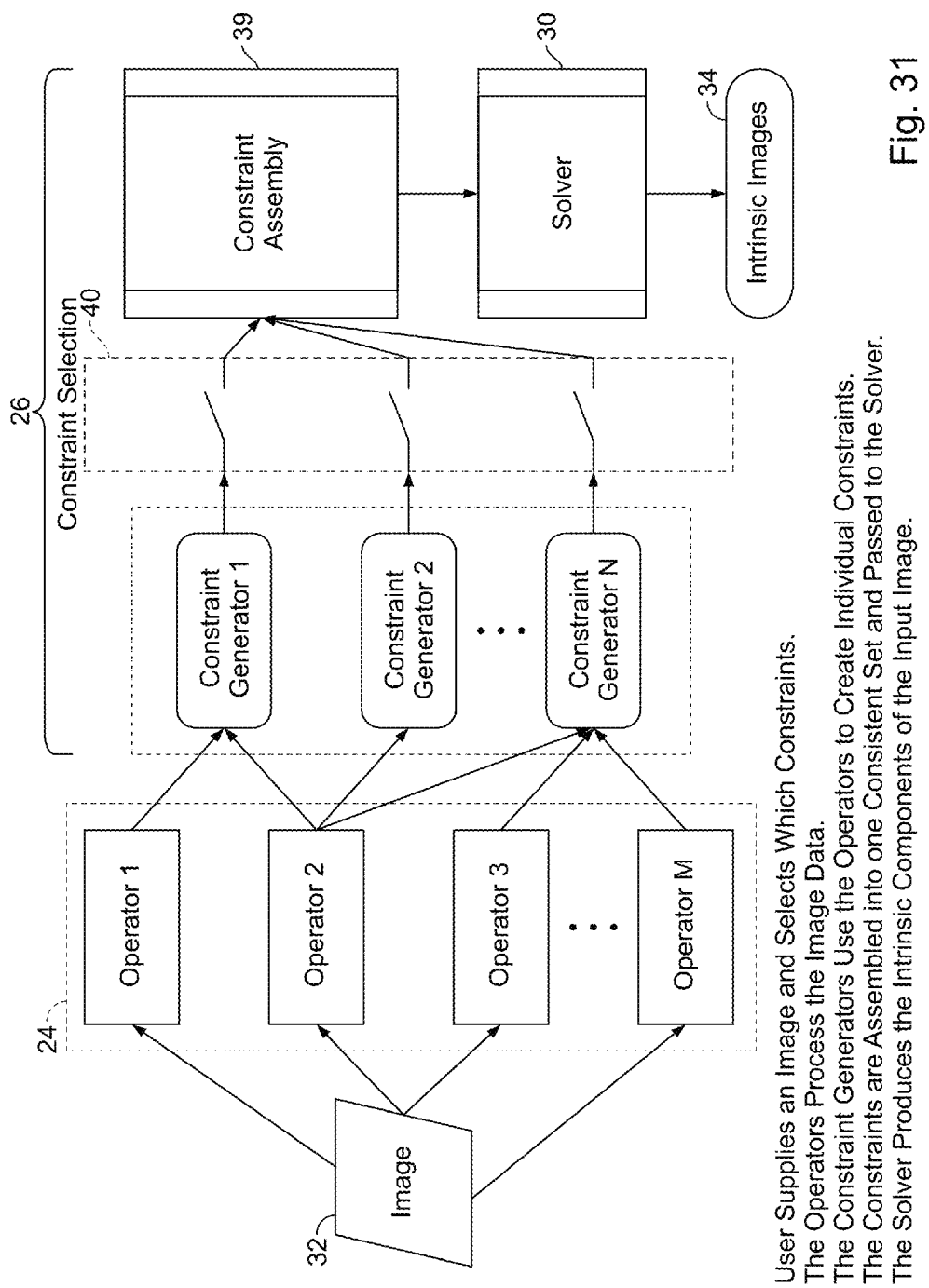
FIG. 31 is a functional block diagram for a service provider component for use in the image segregation system architecture of FIG. 4.

FIG. 31 is a generalized functional block diagram for the service provider 24 constraint builder 26 and solver 30 of FIG. 4. To summarize the above described constraint examples in a general scheme, a selection is made of an image 32, (one or more of image file 18, 18a, . . . 18n) and, for each selected image 32, a number of constraint generators from a set of constraint generators 1, 2, . . . N, (the constraint generator software modules) for example, by a user, via the GUI. The set of constraint generators 1-N includes the constraints described above, and any additional constraining relationships developed as a function of spatio-spectral information for an image. The above described set of constraints is provided as an example. The present invention contemplates any constraining relationship based upon spatio-spectral operators, that provides a logical deduction regarding material and illumination aspects of an image, and thus a basis for constructing matrices [A] and [b] to define a set of equations whose optimal solution captures intrinsic illumination and material components of a given image.

Likewise, a set of operators 1-M, generated by the Type C tokenization block 35 or the operators block 28, includes all operators defined in the constraint generator modules 1-N. As shown in FIG. 31, the service provider 24 provides all of the operators 1-M, as required by the selected constraint generators 1-N and further couples the selected constraint generators 1-N to a constraint assembly 39 via a logical switch 40 (both configured within the constraint builder 26). In the event any of the operators 1-M for a selected image 32 are not already stored by the service provider 24, the service provider 24 utilizes the operators block 28 to compute such operators on demand, in the manner described above. The constraint assembly 39 constructs a separate [A] [x]=[b] matrix for each one of the selected constraint generators, as a function of the operators and the constraining relationships defined in the respective constraint generators 1-N. In each case, the [A] [x]=[b] matrix is constructed in a similar manner as described above for the same illumination and BIDR alignment examples.

Upon completion of the construction of the system of equations $[A]_i [x]=[b]_i$, for each of the selected constraint generators, i={1, 2, . . . N}, the constraint assembly 39 concatenates the constituent matrices $[A]_i [b]_i$, from each constraint generator. Since each of the concatenated equations may contain a different subset of the unknowns, [x], the assembly is performed such that corresponding columns of individual matrices $[A]_i$, that constrain particular unknowns in [x], are aligned. The concatenated matrices, [A] [x]=[b], are then input to the solver 30, for solution of the unknowns in the complete [x] vector, pursuant to the selected optimization procedure, for output of intrinsic images 34. The individual constraints within the concatenated matrices, [A] [x]=[b], can be weighted relative to one another as a function of factors such as perceived importance of the respective constraint, strength or empirically determined confidence level, as, for example, the BIDR alignment and confidence weights described above.

The above described example of a same illumination constraint utilizes Type C token and Type B token spatio-spectral operators. These token operators provide an excellent representation of images that include large surface areas of a single material, such as are often depicted in images including manmade objects. As such, processing of the image at a coarse scale of resolution, for example, at the level of image file 18a, is possible. However, in many natural scenes there are often large areas of highly textured regions, such as sand, grass, stones, foliage, and so on. Each texture has an intrinsic scale, which can be correlated to one of the scale representations of image files 18a, . . . 18n. As noted above, identification of Type B tokens using Type C tokens, can be difficult in an image texture, particularly at a fine scale of resolution. According to a further feature of the present invention, a texton histogram operator provides a mechanism for capturing statistically uniform spatial variations of textured regions in a manner that is useful in a constraint based optimization, for example, as expressed by the [A] [x]=[b] matrix equation.

Thus, according to this feature of the present invention, rather than generating Type C tokens in textured regions of an image, from intensity histograms, for use in identifying Type B tokens, as described above, texture tokens are generated as a species of Type B tokens, for use in a constraint. Such a texture token analysis can be performed, for example, at a preselected scale suitable to the scale of the texture, for a more efficient and accurate analysis. In an exemplary embodiment of the texton histogram operator, the operators block 28 converts each pixel of the image (or pixels of those regions of an image identified as comprising a texture) from the recorded color band representation of the respective image file 18, such as, for example, RGB color band values, to a two band representation wherein the two bands comprise a texton label and a texton histogram label. The two band representations for the pixels are then used to identify texture tokens, as will appear.

A texton label for each pixel is generated through execution of a clustering process. A texture can be characterized by a texture primitive (for example, in a grass texture, a single blade of grass), and the spatial distribution of the primitive. A texton analysis is an analytical method for characterizing a texture primitive, for example via a clustering algorithm. Clustering is a process for locating centers of natural groups or clusters in data. In an exemplary embodiment of the present invention, the data comprises pixel patches selected from among the pixels of an image being segregated into material and illumination components. For example, 3×3 pixel patches are clustered into K different groups, with each group being assigned a designating number (1, 2, 3, . . . K). The texton label for each pixel of the 3×3 array is the group number of the group to which the respective patch was assigned during the clustering process.

To expedite execution of a clustering algorithm, random samples of 3×3 patches can be selected throughout the image, or region of the image identified as comprising a texture, for processing in a clustering algorithm. After execution of the clustering algorithm by the CPU 12 (operating as the operators block 28), each 3×3 patch of the image is assigned the texton label of the closest one of the K group centers identified in the clustering process, as executed in respect of the selected random samples.

To advantage, prior to execution of a clustering algorithm, the pixels of the image are subject to an image intensity normalization. In a clustering process utilizing an intensity-based distance matrix, dark areas of an image may be placed in a single group, resulting in an under representation of groups for shadowed areas of a textured region of an image. A normalization of the image provides a more accurate texton representation for texture regions under varying illumination. A normalized intensity for a pixel can be expressed by:

$$i_{norm}(n,m) = \log(i(n,m)/i_b(n,m)),$$

where $i_{norm}(n,m)$ is the normalized intensity for a pixel p(n, m), i(n,m) is the intensity for the pixel p(n,m), as recorded in the image file 18, and $i_b(n,m)$ is a blurred or low passed filtered version of the pixel p(n,m). For example, a 10 pixel blur radius can be used in any standard blurring function.

Clustering can be executed according to any known clustering algorithm, such as, for example, K means clustering where there are K clusters or groups $S_i$, i=1, 2, . . . K, and $\mu_i$ is the mean point or center point of all the data points $x_j \epsilon S_i$. In our example, each $x_j$ comprises a selected 3×3 pixel patch arranged as a 9×1 vector of the nine pixels in the patch (27 elements total, including the RGB values of each of the nine pixels of the vector). As noted above, each mean point $\mu_i$ is assigned a texton label, 1, 2, 3 . . . K, that becomes the texton label for any pixel of a 3×3 patch clustered into the group for which the respective mean point is the center.

According to an exemplary embodiment of the present invention, the CPU 12 executes the algorithm by initially partitioning the selected 9×1 vectors, representing 3×3 pixel patches of the image, into K initial groups $S_i$. The CPU 12 then calculates a center point $\mu_i$, for each group $S_i$, utilizing an intensity-based distance matrix. After determining a center point $\mu_i$, for each group $S_i$, the CPU 12 associates each 9×1 vector to the closest center point $\mu_i$, changing groups if necessary. Then the CPU 12 recalculates the center points $\mu_i$. The CPU 12 executes iterations of the steps of associating each 9×1 vector to the closest center point $\mu_i$, and recalculating the center points $\mu_i$, until convergence. Convergence is when there is no need to change the group for any of the 9×1 vectors. At that point, the CPU 12 assigns the group number for the respective center point $\mu_i$, as the texton label for the pixels of each vector in that group.

As noted above, pixels of 3×3 patches not selected as samples for clustering are assigned the texton label of the closest one of the K group centers $\mu_i$, identified in the clustering process, as executed in respect of the selected random samples. A texton label map is stored by the service provider 24, and is coextensive with the pixel array of FIG. 2. In the texton label map, for each pixel location, there is an indication of the respective texton label.

Upon completion of the texton label assignment for pixels of the image, the CPU 12 operates to generate a texton histogram for each pixel to provide a representation of the spatial variation of texton representations within a textured region of the image. To that end, the CPU 12 accesses the texton label map. At each pixel location within the texton label map, a pixel patch of, for example, 21×21 pixels, is set up around the current location. The 21×21 patch size is far greater than the 3×3 patch sized used to generate the texton representations, so as to capture the spatial variations of the texture. A texton histogram is then generated for the pixel location at the center of the 21×21 patch, in a similar manner as the intensity histogram described above. However, rather than bins based upon color band values, in the texton histogram, there is a bin for each texton label value, 1, 2, 3 . . . K. The count for each bin corresponds to the number of pixels in the 21×21 patch having the texton label value for the respective bin.

When a texton histogram is generated for each pixel of the texton label map, the CPU 12 executes a second clustering step. In the second clustering step, the texton histograms are clustered using spectral clustering. Spectral clustering techniques use a spectrum of a similarity matrix of data of interest, (in our example, the texton histograms) to reduce the dimensionality for clustering in fewer dimensions. A similarity matrix for a given set of data points A can be defined as a matrix S where $S_{ij}$ represents a measure of the similarity between points i, j $\epsilon$A. In our example, eigenvectors of the Laplacian are clustered using a mean shift. The distance metric is a chi-squared distance of the histograms.

A texton histogram label (1, 2 . . . ) is assigned to each cluster group defined by the clustering procedure. For each pixel of the texton label map, the texton histogram label for the cluster group corresponding to a texton histogram that is nearest the texton histogram for the respective pixel, is assigned to that pixel. Distance is defined as the chi-squared histogram distance. Upon completion of the assignment of a texton histogram label to each pixel, each pixel is now represented by a two band, texton label, texton histogram label representation.

According to a feature of the present invention, the two band, texton label, texton histogram label representations for pixels of an image file 18 (or any of the selectively varied representations 18a, . . . 18n) can be utilized in a constraint for construction of an $[A]_i [x]=[b]_i$ constituent within the concatenated matrices, $[A] [x]=[b]$. For example, it can be assumed that a region of an image wherein contiguous pixels within the region all have the same two band, texton label, texton histogram label representation, comprises a region of the same mean material of a texture depicted in the image. Such a region can be referred to as a texture token, a species of a Type B token. Thus, a constraint can be imposed that all Type C tokens within the same texture token are of the same mean material. In this constraint, the Type C tokens are the Type C tokens generated from the color band values of the constituent pixels by the Type C tokenization block 35.

While the above exemplary embodiment of the present invention has been described with a user selecting constraint generators and mathematical operations via a GUI, the image segregation processing can be done in other operating modes, such as automatically, with images, constraint generators and mathematical operations being automatically selected, for example, as a function of image parameters.

Referring once again to FIG. 3a, in block 1006, the CPU 12 outputs the intrinsic images generated in the image segregation block 1004. Such intrinsic images can be advantageously used in such diverse applications as object recognition, data compression or for improved results in an image modification. For example, a color correct gamma correction can be achieved by performing an intensity adjustment on the illumination image, and merging the intensity adjusted illumination image with the corresponding material image, for a color correct, intensity adjusted output image.

In summary, the selectively varied representation embodiment of the present invention provides modes of operation that permit spatio-spectral operators to be computed and applied at any one of several different representations of the image, for example, a representation at a scale of resolution that matches the intrinsic scale of an image feature. Also, different areas of the image can be processed at different scales, such as edge regions at a fine scale, and non-edge regions at a coarse scale. Moreover, a constraint can be applied over a limited extent of one representation of the image and projected to a more coarse scale to extend the range of the constraint. All of the various modes afforded by the selectively varied representation embodiment of the present invention improve the accuracy of an image segregation operation, while providing efficiencies that speed up the performance of the computer system 10. Moreover, the weighted constraint provides a flexible, weighted constraint arrangement that insures accurate results by efficiently accounting for color change due to material reflectance, illumination or a combination of both.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for processing an image, comprising the steps of:
    providing an image file depicting an image having image locations, in a computer memory;
    selecting image locations i and j;
    setting a constraint between the image locations according to a log color space equation: $w_{ij}*(Mi-Mj)=w_{ij}*(\alpha_{ij}V_{ij}+(1-\alpha_{ij})B_{ij})$,
    wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal for a log chromaticity plane oriented as a function of a bi-illuminant, dichromatic reflection (BIDR) model, $\alpha_{ij}$ is a scalar value based upon a smooth scalar function $\alpha$ that varies from 0 to 1, as a function of a degree of change expressed by $I_i-I_j$, corresponding to one of an illumination change or a material reflectance change, and $w_{ij}$ is a constraint confidence weight; and
    solving the log color space equation to identify an intrinsic component of the selected image locations.

2. The method of claim 1 including the further steps of selecting multiple sets of image locations i and j, setting the constraints for the selected multiple sets of image locations according to the log color space equation in an [A] [x]=[b] matrix equation, wherein [A] expresses values determined by a constraining relationship imposed by the log color space equation, [b] expresses information based upon the color values recorded in the image file for the image locations, and [x] expresses an unknown material/illumination component of the image, performing an optimization operation to determine a solution for the matrix equation, and utilizing the solution to generate an intrinsic image corresponding to the image.

3. The method of claim 1 wherein a sigmoid function is executed to compute $\alpha_{ij}$.

4. The method of claim 3 wherein the sigmoid function is based upon an angle metric, the angle being set as $\theta=\cos^{-1}(V_{ij}\cdot N)$.

5. The method of claim 3 wherein the sigmoid function is based upon a distance metric, the distance being set as a distance between projections on a log chromaticity plane of the log color space values $I_i$ and $I_j$.

6. The method of claim 1 wherein $w_{ij}$ is computed as a function of $\alpha_{ij}$.

7. A device which comprises:
    a computer; and
    a memory storing an image file containing an image having image locations;
    the computer is arranged and configured to execute a routine to select image locations i and j, set a constraint between the image locations according to a log color space equation: $w_{ij}*(Mi-Mj)=w_{ij}*(\alpha_{ij}V_{ij}+(1-\alpha_{ij})B_{ij})$, wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal for a log chromaticity plane oriented as a function of a bi-illuminant, dichromatic reflection (BIDR) model, $\alpha_{ij}$ is a scalar value based upon a smooth scalar function $\alpha$ that varies from 0 to 1, as a function of a degree of change expressed by $I_i-I_j$ corresponding to one of an illumination change or a material reflectance change, and $w_{ij}$ is a constraint confidence weight and solve the log color space equation to identify an intrinsic component of the selected image locations.

8. A computer program product, disposed on a non-transitory computer readable media, the product including computer executable process steps operable to control a computer to: receive an image file depicting an image having image locations, select image locations i and j, set a constraint between the image locations according to a log color space equation: $w_{ij}*(Mi-Mj)=w_{ij}*(\alpha_{ij}V_{ij}+(1-\alpha_{ij})B_{ij})$, wherein Mi and Mj are log color space values for the material reflectance component of the image locations i and j, respectively, $V_{ij}$ is a difference vector to provide a gradient magnitude defined by $V_{ij}=I_i-I_j$, where $I_i$ and $I_j$ are log color space values corresponding to color values recorded in the image file, for the color and intensity of the selected image locations i and j, respectively, $B_{ij}$ is a component of $V_{ij}$ not aligned with illumination change between the selected image locations and is a vector defined by $B_{ij}=V_{ij}-(V_{ij}\cdot N)$, where N is a BIDR normal for a log chromaticity plane oriented as a function of a bi-illuminant, dichromatic reflection (BIDR) model, $\alpha_{ij}$ is a scalar value based upon a smooth scalar function $\alpha$ that varies from 0 to 1, as a function of a degree of change expressed by $I_i-I_j$ corresponding to one of an illumination change or a material reflectance change, and $w_{ij}$ is a constraint confidence weight and solve the log color space equation to identify an intrinsic component of the selected image locations.

9. The computer program product of claim 8 including the further process steps of selecting multiple sets of image locations i and j, setting the constraints for the selected multiple sets of image locations according to the log color space equation in an [A][x]=[b] matrix equation, wherein [A] expresses values determined by a constraining relationship imposed by the log color space equation, [b] expresses information based upon the color values recorded in the image file for the image locations, and [x] expresses an unknown material/illumination component of the image, performing an optimization operation to determine a solution for the matrix equation, and utilizing the solution to generate an intrinsic image corresponding to the image.

10. The computer program product of claim 8 wherein a sigmoid function is executed to compute $\alpha_{ij}$.

11. The computer program product of claim 10 wherein the sigmoid function is based upon an angle metric, the angle being set as $\theta = \cos^{-1}(Vij \cdot N)$.

12. The computer program product of claim 10 wherein the sigmoid function is based upon a distance metric, the distance being set as a distance between projections on a log chromaticity plane of the log color space values $I_i$ and $I_j$.

13. The computer program product of claim 8 wherein is computed as a function of $\alpha_{ij}$.

14. A computer program product, disposed on a non-transitory computer readable media, the product including computer executable process steps operable to control a computer to: receive an image file depicting an image having image locations, select image locations i and j, set a constraint between the image locations, the constraint being a function of $\alpha_{ij}$, a scalar value based upon a smooth scalar function $\alpha$ varying from 0 to 1, as a function of a degree of change expressed by $I_i - I_j$ corresponding to one of an illumination change or a material reflectance change according to a bi-illuminant, dichromatic reflection (BIDR) model, wherein $I_i$ and $I_j$ are color space values corresponding to color values recorded in the image file, for the color and intensity of the selected image locations i and j and utilize the constraint to identify an intrinsic component of the selected image locations.

* * * * *